United States Patent
Fasching et al.

(10) Patent No.: US 12,556,017 B2
(45) Date of Patent: Feb. 17, 2026

(54) ADVANCED BATTERY CHARGING ON MODULAR LEVELS OF ENERGY STORAGE SYSTEMS

(71) Applicant: TAE Technologies, Inc., Foothill Ranch, CA (US)

(72) Inventors: Rainer Fasching, Mill Valley, CA (US); Roozbeh Naderi, Foothill Ranch, CA (US); Mikhail Slepchenkov, Lake Forest, CA (US); Ghyrn Loveness, Mountain View, CA (US)

(73) Assignee: TAE Technologies, Inc., Foothill Ranch (CA)

( * ) Notice: Subject to any disclaimer, the term of this patent is extended or adjusted under 35 U.S.C. 154(b) by 884 days.

(21) Appl. No.: 17/615,400

(22) PCT Filed: May 29, 2020

(86) PCT No.: PCT/US2020/035437
§ 371 (c)(1),
(2) Date: Nov. 30, 2021

(87) PCT Pub. No.: WO2020/243655
PCT Pub. Date: Dec. 3, 2020

(65) Prior Publication Data
US 2022/0239136 A1    Jul. 28, 2022

Related U.S. Application Data

(60) Provisional application No. 62/854,861, filed on May 30, 2019.

(51) Int. Cl.
*H02J 7/00* (2006.01)
*H02J 7/06* (2006.01)
(Continued)

(52) U.S. Cl.
CPC ......... *H02J 7/00711* (2020.01); *H02J 7/0019* (2013.01); *H02J 7/0049* (2020.01);
(Continued)

(58) Field of Classification Search
CPC ....................................................... H02J 7/00
See application file for complete search history.

(56) References Cited

U.S. PATENT DOCUMENTS

| | | |
|---|---|---|
| 3,963,976 A | 6/1976 | Clark |
| 5,204,548 A | 4/1993 | Daehler et al. |

(Continued)

FOREIGN PATENT DOCUMENTS

| | | |
|---|---|---|
| CA | 2810369 | 3/2012 |
| CN | 201789411 | 4/2011 |

(Continued)

OTHER PUBLICATIONS

"Capacitor Voltage Control Technique For A Modular Converter", An IP.com Prior Art Database Technical Disclosure, Jun. 10, 2015, pp. 1-7.

(Continued)

*Primary Examiner* — Robert Grant
(74) *Attorney, Agent, or Firm* — Alston & Bird LLP

(57) ABSTRACT

Embodiments that provide advanced charging of energy source arrangements for energy storage applications are disclosed. The embodiments can be used within energy storage systems having a cascaded arrangement of converter modules. The embodiments can include the application of pulses to an energy source of each module of the system. The pulses can be applied for a duration sufficient to initiate an electrochemical reaction. Feedback based pulse control embodiments are also disclosed.

28 Claims, 29 Drawing Sheets

(51) Int. Cl.
    *H02M 1/00*           (2006.01)
    *H02M 3/158*         (2006.01)
    *H02M 7/49*           (2007.01)

(52) U.S. Cl.
    CPC .............. *H02J 7/06* (2013.01); *H02M 1/007* (2021.05); *H02M 3/158* (2013.01); *H02M 7/49* (2013.01)

(56) References Cited

U.S. PATENT DOCUMENTS

| | | |
|---|---|---|
| 5,428,522 A | 6/1995 | Millner et al. |
| 5,642,275 A | 6/1997 | Peng et al. |
| 5,808,447 A * | 9/1998 | Hagino ............ H02J 7/007182 320/155 |
| 5,905,371 A | 5/1999 | Limpaecher |
| 5,933,339 A | 8/1999 | Duba et al. |
| 5,949,664 A | 9/1999 | Bernet et al. |
| 6,051,961 A | 4/2000 | Jang et al. |
| 6,058,032 A | 5/2000 | Yamanaka et al. |
| 6,064,180 A | 5/2000 | Sullivan et al. |
| 6,124,698 A | 9/2000 | Sakakibara |
| 6,236,580 B1 | 5/2001 | Aiello et al. |
| 6,373,734 B1 | 4/2002 | Martinelli |
| 6,392,387 B1 | 5/2002 | Sage et al. |
| 6,441,588 B1 | 8/2002 | Yagi et al. |
| 7,091,701 B2 | 8/2006 | Turner et al. |
| 7,485,987 B2 | 2/2009 | Mori et al. |
| 8,334,675 B2 | 12/2012 | Wang et al. |
| 8,395,280 B2 | 3/2013 | Graovac et al. |
| 8,476,888 B1 | 7/2013 | Chen et al. |
| 8,503,202 B2 | 8/2013 | Chimento et al. |
| 8,614,525 B2 | 12/2013 | Teichmann et al. |
| 8,751,079 B2 | 6/2014 | Lederer et al. |
| 8,829,723 B2 | 9/2014 | Graovac et al. |
| 9,083,065 B2 | 7/2015 | Carkner |
| 9,172,254 B2 | 10/2015 | Ganor |
| 9,444,275 B2 | 9/2016 | Huang et al. |
| 9,461,474 B2 | 10/2016 | Deboy et al. |
| 9,647,472 B2 | 5/2017 | Berkowitz et al. |
| 9,673,732 B2 | 6/2017 | Deboy et al. |
| 10,008,865 B2 | 6/2018 | Hempel |
| 10,014,611 B2 | 7/2018 | Götz |
| 10,020,608 B2 | 7/2018 | Cousineau et al. |
| 10,069,313 B2 | 9/2018 | Tkachenko et al. |
| 10,074,995 B2 | 9/2018 | Smedley et al. |
| 10,084,331 B2 | 9/2018 | Sherstyuk et al. |
| 10,135,279 B2 | 11/2018 | Luo et al. |
| 10,135,281 B2 | 11/2018 | Tkachenko et al. |
| 10,164,456 B2 | 12/2018 | Luo et al. |
| 10,166,882 B2 | 1/2019 | Yang et al. |
| 10,193,359 B2 | 1/2019 | Ganor |
| 10,193,369 B2 | 1/2019 | Sherstyuk et al. |
| 10,193,371 B2 | 1/2019 | Chiang |
| 10,218,189 B2 | 2/2019 | Goetz |
| 10,218,200 B2 | 2/2019 | Sherstyuk et al. |
| 10,250,045 B2 | 4/2019 | Sherstyuk et al. |
| 10,291,037 B2 | 5/2019 | Birkl et al. |
| 10,291,048 B2 | 5/2019 | Tkachenko et al. |
| 10,293,704 B2 | 5/2019 | Aronov |
| 10,391,870 B2 | 8/2019 | Götz et al. |
| 10,396,682 B2 | 8/2019 | Götz et al. |
| 10,439,506 B2 | 10/2019 | Götz |
| 10,442,309 B2 | 10/2019 | Götz |
| 10,454,331 B2 | 10/2019 | Götz |
| 10,473,728 B2 | 11/2019 | Goetz |
| 10,522,886 B2 | 12/2019 | Li et al. |
| 10,566,817 B2 | 2/2020 | Tkachenko et al. |
| 10,601,070 B2 | 3/2020 | Krasovitsky et al. |
| 10,608,298 B2 | 3/2020 | Qiu et al. |
| 10,630,201 B2 | 4/2020 | Götz et al. |
| 10,644,587 B2 | 5/2020 | Spindler et al. |
| 10,700,587 B2 | 6/2020 | Götz |
| 10,714,948 B2 | 7/2020 | Meyer et al. |
| 10,759,284 B2 | 9/2020 | Jaensch et al. |
| 10,784,698 B2 | 9/2020 | Jaensch et al. |
| 10,790,513 B2 | 9/2020 | Jiang et al. |
| 10,833,375 B2 | 11/2020 | Ikeno |
| 10,840,714 B2 | 11/2020 | Götz et al. |
| 10,840,725 B2 | 11/2020 | Tkachenko et al. |
| 10,903,673 B2 | 1/2021 | Jung |
| 10,980,103 B2 | 4/2021 | Götz et al. |
| 10,985,551 B2 | 4/2021 | Götz |
| 10,998,739 B2 | 5/2021 | Hinterberger et al. |
| 11,038,435 B2 | 6/2021 | Götz |
| 11,050,281 B2 | 6/2021 | Sherstyuk et al. |
| 2003/0102845 A1 | 6/2003 | Aker et al. |
| 2004/0008016 A1 | 1/2004 | Sutardja et al. |
| 2004/0037101 A1 | 2/2004 | Meynard et al. |
| 2005/0065684 A1 | 3/2005 | Larson et al. |
| 2006/0097782 A1 | 5/2006 | Ebner |
| 2006/0202636 A1 | 9/2006 | Schneider |
| 2007/0147098 A1 | 6/2007 | Mori et al. |
| 2007/0194627 A1 | 8/2007 | Mori et al. |
| 2007/0246635 A1 | 10/2007 | Nakajima et al. |
| 2008/0080212 A1 | 4/2008 | Grbovic |
| 2008/0245593 A1 | 10/2008 | Kim |
| 2008/0304296 A1 | 12/2008 | Nadimpalliraju et al. |
| 2009/0251212 A1 | 10/2009 | Pillonnet et al. |
| 2009/0311891 A1 | 12/2009 | Lawrence et al. |
| 2010/0060235 A1 | 3/2010 | Dommaschk et al. |
| 2010/0085789 A1 | 4/2010 | Ulrich et al. |
| 2010/0121511 A1 | 5/2010 | Onnerud et al. |
| 2010/0298957 A1 | 11/2010 | Sanchez Rocha et al. |
| 2010/0301827 A1 | 12/2010 | Chen et al. |
| 2011/0012562 A1 | 1/2011 | Paryani |
| 2011/0133573 A1 | 6/2011 | Ratnaparkhi et al. |
| 2011/0140533 A1 | 6/2011 | Zeng et al. |
| 2011/0148198 A1 | 6/2011 | Tripathi et al. |
| 2011/0187184 A1 | 8/2011 | Ichikawa |
| 2011/0198936 A1 | 8/2011 | Graovac et al. |
| 2012/0053871 A1 | 3/2012 | Sirard |
| 2012/0074949 A1 | 3/2012 | Kepley et al. |
| 2012/0092018 A1 | 4/2012 | Scheucher |
| 2012/0112693 A1 | 5/2012 | Kusch et al. |
| 2012/0155140 A1 | 6/2012 | Chen et al. |
| 2012/0161858 A1 | 6/2012 | Permuy et al. |
| 2012/0195084 A1 | 8/2012 | Norrga |
| 2012/0262967 A1 | 10/2012 | Cuk |
| 2013/0027126 A1 | 1/2013 | Jayaraman et al. |
| 2013/0083563 A1 | 4/2013 | Wang et al. |
| 2013/0088254 A1 | 4/2013 | Hoang et al. |
| 2013/0088903 A1 | 4/2013 | Sagona et al. |
| 2013/0090872 A1 | 4/2013 | Kurimoto |
| 2013/0154379 A1 | 6/2013 | Tiefenbach |
| 2013/0154521 A1 | 6/2013 | Butzmann et al. |
| 2013/0187473 A1 * | 7/2013 | Deboy .................... H02M 7/49 307/82 |
| 2013/0234669 A1 | 9/2013 | Huang et al. |
| 2013/0260188 A1 | 10/2013 | Coates |
| 2013/0285457 A1 | 10/2013 | Kepley |
| 2013/0302652 A1 | 11/2013 | Wolff et al. |
| 2014/0042815 A1 | 2/2014 | Maksimovic et al. |
| 2014/0042827 A1 | 2/2014 | Wolff |
| 2014/0104899 A1 | 4/2014 | Fischer et al. |
| 2014/0152109 A1 | 6/2014 | Kanakasabai et al. |
| 2014/0226379 A1 | 8/2014 | Harrison |
| 2014/0239927 A1 | 8/2014 | Nascimento et al. |
| 2014/0254219 A1 | 9/2014 | Davies |
| 2014/0285135 A1 | 9/2014 | Ji et al. |
| 2014/0333267 A1 | 11/2014 | Crawley |
| 2014/0340052 A1 | 11/2014 | Dwertmann et al. |
| 2014/0354212 A1 | 12/2014 | Sugeno et al. |
| 2015/0002099 A1 | 1/2015 | Smedley et al. |
| 2015/0008747 A1 | 1/2015 | Salcone |
| 2015/0009594 A1 | 1/2015 | Okaeme et al. |
| 2015/0049532 A1 | 2/2015 | Bernet et al. |
| 2015/0124506 A1 | 5/2015 | Sahoo et al. |
| 2015/0171644 A1 | 6/2015 | Paryani et al. |
| 2015/0188430 A1 * | 7/2015 | Yuan .................... H02M 3/156 323/271 |
| 2015/0229227 A1 | 8/2015 | Aeloiza et al. |
| 2015/0249351 A1 | 9/2015 | Wolff et al. |
| 2015/0270801 A1 | 9/2015 | Kessler et al. |

(56) References Cited

U.S. PATENT DOCUMENTS

| | | |
|---|---|---|
| 2015/0280604 A1 | 10/2015 | Hassanpoor |
| 2015/0288287 A1 | 10/2015 | Madawala et al. |
| 2015/0296292 A1 | 10/2015 | Hogan et al. |
| 2015/0303820 A1 | 10/2015 | Cubaines |
| 2015/0340964 A1 | 11/2015 | Modeer |
| 2015/0364935 A1 | 12/2015 | Fetzer et al. |
| 2016/0023563 A1 | 1/2016 | Wang et al. |
| 2016/0072396 A1 | 3/2016 | Deboy et al. |
| 2016/0111898 A1 | 4/2016 | Luo et al. |
| 2016/0183451 A1 | 6/2016 | Conrad et al. |
| 2016/0240894 A1 | 8/2016 | Wartenberg et al. |
| 2016/0254682 A1 | 9/2016 | Yip et al. |
| 2016/0308466 A1 | 10/2016 | Oates |
| 2017/0054306 A1 | 2/2017 | Vo et al. |
| 2017/0099007 A1 | 4/2017 | Oates et al. |
| 2017/0163171 A1 | 6/2017 | Park |
| 2017/0179745 A1 | 6/2017 | Tritschler et al. |
| 2017/0207651 A1 | 7/2017 | Geng et al. |
| 2017/0244255 A1 | 8/2017 | Luo et al. |
| 2017/0302088 A1 | 10/2017 | Tkachenko et al. |
| 2017/0302091 A1 | 10/2017 | Schaedlich et al. |
| 2017/0338654 A1 | 11/2017 | Subramanian |
| 2017/0366079 A1 | 12/2017 | Bhowmik et al. |
| 2018/0013306 A1 | 1/2018 | Tkachenko et al. |
| 2018/0043789 A1 | 2/2018 | Goetz |
| 2018/0097391 A1 | 4/2018 | Baby et al. |
| 2018/0175744 A1 | 6/2018 | Jasim et al. |
| 2018/0191176 A1 | 7/2018 | Sherstyuk et al. |
| 2018/0191187 A1 | 7/2018 | Sherstyuk et al. |
| 2018/0241239 A1 | 8/2018 | Frost et al. |
| 2019/0031042 A1 | 1/2019 | Müller |
| 2019/0103641 A1 | 4/2019 | O'Hora |
| 2019/0131851 A1 | 5/2019 | Herb |
| 2019/0148964 A1 | 5/2019 | Fasching et al. |
| 2019/0190028 A1 | 6/2019 | Wang et al. |
| 2019/0252742 A1 | 8/2019 | Liu et al. |
| 2019/0288522 A1 | 9/2019 | Hinterberger et al. |
| 2019/0288526 A1 | 9/2019 | Jaensch et al. |
| 2019/0288527 A1 | 9/2019 | Jaensch et al. |
| 2019/0288547 A1 | 9/2019 | Jaensch et al. |
| 2019/0288617 A1 | 9/2019 | Jaensch et al. |
| 2019/0312504 A1 | 10/2019 | Kim et al. |
| 2019/0319300 A1 | 10/2019 | Yi et al. |
| 2020/0006961 A1 | 1/2020 | Zhou et al. |
| 2020/0119410 A1 | 4/2020 | Tian |
| 2020/0185947 A1 | 6/2020 | Tkachenko et al. |
| 2020/0212687 A1 | 7/2020 | Hinterberger et al. |
| 2020/0235439 A1 | 7/2020 | Frost et al. |
| 2020/0244076 A1 | 7/2020 | Wang et al. |
| 2020/0278936 A1 | 9/2020 | Gopalakrishnan et al. |
| 2020/0280048 A1 | 9/2020 | Kang et al. |
| 2020/0303930 A1 | 9/2020 | Edelshtein et al. |
| 2020/0317086 A1 | 10/2020 | Goetz et al. |
| 2020/0328593 A1 | 10/2020 | Goetz |
| 2020/0338997 A1 | 10/2020 | Goetz et al. |
| 2020/0358370 A1 | 11/2020 | Goetz et al. |
| 2020/0381784 A1 | 12/2020 | Yamamoto et al. |
| 2020/0395840 A1 | 12/2020 | Goetz |
| 2021/0005855 A1 | 1/2021 | Götz et al. |
| 2021/0021003 A1 | 1/2021 | Chen et al. |
| 2021/0028507 A1 | 1/2021 | Su et al. |
| 2021/0028509 A1 | 1/2021 | Su et al. |
| 2021/0146791 A1 | 5/2021 | Hinterberger et al. |
| 2021/0151726 A1 | 5/2021 | Hinterberger et al. |
| 2021/0151727 A1 | 5/2021 | Hinterberger et al. |
| 2021/0151728 A1 | 5/2021 | Hinterberger et al. |
| 2021/0197676 A1 | 7/2021 | Goetz et al. |
| 2021/0316621 A1 | 10/2021 | Slepchenkov et al. |
| 2021/0399554 A1 | 12/2021 | Sherstyuk |

FOREIGN PATENT DOCUMENTS

| | | |
|---|---|---|
| CN | 203151115 | 8/2013 |
| CN | 103427128 A | 12/2013 |
| CN | 204156591 | 2/2015 |
| CN | 103812377 | 5/2016 |
| CN | 109643904 A | 4/2019 |
| DE | 102014008399 | 12/2015 |
| DE | 102016109077 | 11/2017 |
| DE | 102017220175 | 5/2019 |
| DE | 102018109921 | 8/2019 |
| DE | 102018109922 | 10/2019 |
| DE | 102018109925 | 10/2019 |
| DE | 102018109926 | 12/2019 |
| DE | 102018121403 | 3/2020 |
| DE | 102018121490 | 3/2020 |
| DE | 102018121547 | 3/2020 |
| DE | 102018126780 | 4/2020 |
| DE | 102018129111 | 5/2020 |
| DE | 102018126779 | 6/2020 |
| DE | 102019112826 | 6/2020 |
| DE | 102019102306 | 7/2020 |
| DE | 102019102311 | 7/2020 |
| DE | 102019103757 | 7/2020 |
| DE | 102019102615 | 8/2020 |
| DE | 102019112373 | 11/2020 |
| DE | 102019112823 | 11/2020 |
| DE | 102019120616 | 11/2020 |
| DE | 102019120947 | 11/2020 |
| DE | 102019125577 | 11/2020 |
| DE | 102019125578 | 11/2020 |
| DE | 102019120945 | 2/2021 |
| DE | 102019130736 | 5/2021 |
| DE | 102019130737 | 5/2021 |
| DE | 102019132685 | 6/2021 |
| DE | 102020117264 | 6/2021 |
| DE | 102020117435 | 6/2021 |
| DE | 102020118242 | 7/2021 |
| EP | 0907238 | 4/1999 |
| EP | 2290799 | 3/2011 |
| EP | 2658071 | 10/2013 |
| EP | 2693598 | 2/2014 |
| JP | H08-203563 | 8/1996 |
| JP | H10-243567 | 9/1998 |
| JP | 2004-104862 | 4/2004 |
| JP | 2006-174663 | 6/2006 |
| JP | 2010-508807 | 3/2010 |
| WO | WO 2009/044557 | 4/2009 |
| WO | WO 2011/009689 | 1/2011 |
| WO | WO 2011/082855 | 7/2011 |
| WO | WO 2011/082856 | 7/2011 |
| WO | WO 2011/128133 | 10/2011 |
| WO | WO 2012/016735 | 2/2012 |
| WO | WO 2012/038162 | 3/2012 |
| WO | WO 2013/056900 | 4/2013 |
| WO | WO 2013/128485 | 9/2013 |
| WO | WO 2014/151178 | 9/2014 |
| WO | WO 2014/193254 | 12/2014 |
| WO | WO 2016/018830 | 2/2016 |
| WO | WO 2016/030144 | 3/2016 |
| WO | WO 2018/072837 | 4/2018 |
| WO | WO 2018/095552 | 5/2018 |
| WO | WO 2018/154206 | 8/2018 |
| WO | WO 2018/193173 | 10/2018 |
| WO | WO 2018/204964 | 11/2018 |
| WO | WO 2018/210451 | 11/2018 |
| WO | WO 2018/210452 | 11/2018 |
| WO | WO 2018/231810 | 12/2018 |
| WO | WO 2018/232403 | 12/2018 |
| WO | WO 2018/233871 | 12/2018 |
| WO | WO 2019/020215 | 1/2019 |
| WO | WO 2019/161875 | 8/2019 |
| WO | WO 2019/166733 | 9/2019 |
| WO | WO 2019/180699 | 9/2019 |
| WO | WO 2019/183553 | 9/2019 |
| WO | WO 2020/078580 | 4/2020 |
| WO | WO 2020/205511 | 10/2020 |
| WO | WO 2020/205574 | 10/2020 |
| WO | WO 2020/243655 | 12/2020 |
| WO | WO 2021/056102 | 4/2021 |

(56) References Cited

FOREIGN PATENT DOCUMENTS

| WO | WO 2021/077213 | 4/2021 |
|---|---|---|
| WO | 2022/040034 A1 | 2/2022 |

OTHER PUBLICATIONS

"Lithium-Ion Battery Pulse Charger with Overcurrent Protection", Linear Technology, 2001, pp. 1-12.
Bode, G.H., et al., "Hysteresis Current Regulation For Single-Phase Multilevel Inverters Using Asynchronous State Machines", 29th Annual Conference of the IEEE Industrial Electronics Society, Piscataway, NJ, 2003, pp. 1203-4208.
Chang, F., et al., "Improving the Overall Efficiency of Automotive Inverters Using a Multilevel Converter Composed of Low Voltage Si MOSFETs", IEEE Transactions on Power Electronics, 2019, vol. 34, No. 4, pp. 3586-3602.
Chen, LR, et al., "Sinusoidal-Ripple-Current Charging Strategy and Optimal Charging Frequency Study for Li-Ion Batteries", IEEE Transactions on Industrial Electronics, 2013, vol. 60, No. 1, pp. 88-97.
Dai, H., et al., "Impedance Characterization and Modeling of Lithium-Ion Batteries Considering the Internal Temperature Gradient", Energies, 2018, vol. 11, No. 1, pp. 1-18.
Debnath, S., et al., "Operation, Control, and Applications of the Modular Multilevel Converter: A Review", IEEE Transactions on Power Electronics, 2015, vol. 30, No. 1, pp. 37-53.
EP 18816636.7 Extended Search Report, Feb. 19, 2021, 11 pages.
EP 18817541.8 Supplementary Search Report, Jan. 20, 2021, 5 pages.
EP 18817541.8 Written Opinion, Feb. 2, 2021, 6 pages.
Farr, E., et al., "A Sub-module Capacitor Voltage Balancing Scheme for the Alternate Arm Converter (AAC)", 15th European Conference on IEEE Power Electronics and Applications, 2013, pp. 1-10.
Gelman, V., "Energy Storage That May Be Too Good to Be True", IEEE Vehicular Technology Magazine, 2031, pp. 70-80.
Gupta, R., et al., "Cascaded Multilevel Control of DSTATCOM Using Multiband Hysteresis Modulation", IEEE Power Engineering Society General Meeting, Piscataway, NJ, 2006, pp. 1-7.
Hassanpoor, A., et al., "Tolerance Band Modulation Methods for Modular Multilevel Converters", IEEE Transactions on Power Electronics, 2015, vol. 30, No. 1, pp. 311-326.
Herrera, V. I., et al., "Optimal Energy Management and Sizing of a Battery—Supercapacitor-Based Light Rail Vehicle With a Multiobjective Approach", IEEE Transactions on Industry Applications, 2016, vol. 52, No. 4, pp. 3367-3377.
Kalker, S., et al., "Fast-Charging Technologies, Topologies, and Standards", E.ON Energy Research Center Series, 2018, vol. 10, No., 1, pp. 1-94.
Kersten, A., et al., "Battery Loss and Stress Mitigation in a Cascaded H-Bridge Multilevel Inverter for Vehicle Traction Applications by Filter Capacitors", IEEE Transactions on Transportation Electrification, 2019, pp. 1-13.
Khoshkbar-Sadigh, A., et al., "Thermal and Performance Comparison of Active Neutral-Point-Clamped (ANPC) and Dual Flying-Capacitor ANPC (DFC-ANPC) Inverters", IEEE Energy Conversion Congress and Exposition (ECCE), 2019, pp. 5522-5528.
Konstantinou, G., et al., "A Hybrid Modular Multilevel Converter with Partial Embedded Energy Storage", Energies, 2016, vol. 9, No. 12, pp. 1-18.
Li, N., et al., "SOH Balancing Control Method for the MMC Battery Energy Storage System", IEEE Transactions on Industrial Electronics, 2018, vol. 65, No. 8, pp. 6581-6591.
Loh, P. C., et al., "A Reduced Common Mode Hysteresis Current Regulation Strategy for Multilevel Inverters", 18th Annual IEEE Applied Power Electronics Conference and Exposition, Miami Beach, FL, 2003, vol. 1, pp. 576-582.
Loh, P. C., et al., "A Time-Based Double-Band Hysteresis Current Regulation Strategy for Single-Phase Multilevel Inverters", IEEE Transactions on Industry Applications, 2003, vol. 39, No. 3, pp. 883-892.

Maharjan, L., et al., "Fault-Tolerant Operation of a Battery-Energy-Storage System Based on a Multilevel Cascade PWM Converter With Star Configuration", IEEE Transactions On Power Electronics, 2010, vol. 25, No. 9, pp. 2386-2396.
Maharjan, L., et al., "State-of-Charge (SOC)-Balancing Control of a Battery Energy Storage System Based on a Cascade PWM Converter", IEEE Transactions On Power Electronics, 2009, vol. 24, No. 6, pp. 1628-1636.
Méllo, J.P.R., et al., "Multilevel Reduced Controlled Switches AC-DC Power Conversion Cells", IEEE Energy Conversion Congress and Exposition (ECCE), 2015, pp. 3815-3822.
Naderi, R., "Battery Management Converter System and Multilevel Converter Topology and Control", 2016, Dissertation at the University of California, Irvine, pp. 1-211.
Naderi, R., et al., "A Correction to the State-Machine-Decoder for Stacked Multicell Converters", IEEE Applied Power Electronics Conference and Exposition (APEC), 2014, pp. 1545-1549.
Naderi, R., et al., "A New Hybrid Active Neutral Point Clamped Flying Capacitor Multilevel Inverter", IEEE Applied Power Electronics Conference and Exposition (APEC), 2015, pp. 794-798.
Naderi, R., et al., "Dual Flying Capacitor Active-Neutral-Point-Clamped Multilevel Converter", IEEE Transactions On Power Electronics, 2016, vol. 31, No. 9, pp. 6476-6484.
Naderi, R., et al., "Phase-Shifted Carrier PWM Technique for General Cascaded Inverters", IEEE Transactions On Power Electronics, 2008, vol. 23, No. 3, pp. 1257-1269.
Niroshana, I., et al., "An Adaptive Pulse Charging Algorithm for Lithium Batteries", Conference on Electrical Engineering/Electronics, Computer, Telecommunications and Information Technology, 2017, pp. 218-221.
P., S., et al., "Seven Level Inverter Topologies: A Comparative Study", International Journal of Innovative Research in Electrical, Electronics, Instrumentation and Control Engineering, 2016, vol. 3, No. 1, pp. 148-162.
Ronanki, D., et al., "Extreme Fast Charging Technology-Prospects to Enhance Sustainable Electric Transportation", Energies, 2019, vol. 12, No. 19, pp. 1-17.
Sangiri, J. B., et al., "Modular Multilevel Converter for Multifunctional Battery Management System of Electric Vehicle", 44th Annual Conference of the IEEE Industrial Electronics Society, 2018, pp. 1333-1338.
Sg 11201912049P Written Opinion, Mar. 10, 2021, 12 pages.
Shimada, M., et al., "Energy-saving Technology for Railway Traction Systems Using Onboard Storage Batteries", Hitachi Review, 2012, vol. 61, No. 7, pp. 312-318.
Tajeddine, K., et al., "A Cascaded H-Bridge Multilevel Inverter with SOC Battery Balancing", International Journal of Advanced Computer Science and Applications, 2017, vol. 8, No. 12, pp. 345-350.
Tan, L., et al., "A Bipolar-DC-Bus EV Fast Charging Station with intrinsic DC-Bus Voltages Equalization and Minimized Voltage Ripples", IEEE Industrial Electronics Society, Nov. 9-12, 2015, Yokohama, Japan, pp. 002190-002195.
Tu, H., et al., "Extreme Fast Charging of Electric Vehicles: A Technology Overview", IEEE Transactions on Transportation Electrification, 2019, vol. 5, No. 4, pp. 861-878.
Varghese, K., "Implementation Of Single Phase Seven Level Cascaded Multilevel Inverter With Reduced No Of Switches", Project Report'15, retrieved from https://www.academia.edu/12826368/single_phase_seven_level_cascaded_multilevel inverter, pp. 1-45.
Venu, K., et al., "A Seven Level Single-Phase Cascaded Inverter with Improved Efficiency", International Journal & Magazine of Engineering, Technology, Management and Research, 2016, vol. 3, No. 10, pp. 243-249.
WO PCT/US18/37081 ISR and Written Opinion, Oct. 17, 2018, 21 pages.
WO PCT/US18/38089 ISR and Written Opinion, Oct. 29, 2018, 18 pages.
WO PCT/US19/23695 ISR and Written Opinion, Aug. 12, 2019, 15 pages.
WO PCT/US20/35437 ISR and Written Opinion, Oct. 8, 2020, 21 pages.
WO PCT/US21/27154 ISR and Written Opinion, Oct. 14, 2021, 19 pages.

(56) References Cited

OTHER PUBLICATIONS

WO PCT/US21/27159 ISR and Written Opinion, Sep. 1, 2021, 10 pages.
WO PCT/US21/32295 ISR and Written Opinion, Sep. 14, 2021, 16 pages.
WO PCT/US21/52221 ISR and Written Opinion, Feb. 3, 2022, 11 pages.
Wu, B., et al., "Analysis of a distributed maximum power point tracking tracker with low input voltage ripple and flexible gain range", IET Power Electron., 2016, vol. 9, No. 6, pp. 1220-1227.
Zhang, L., et al., "Design and Performance Evaluation of the Modular Multilevel Converter (MMC)-based Grid-tied PV-Battery Conversion System", IEEE Energy Conversion Congress and Exposition (ECCE), 2018, pp. 2649-2654.
Tang, "Side Reactions in Lithium-Ion Batteries," Dissertation for the degree of Doctor of Philosophy, University of California—Berkeley, 2012, 138 pages.
Akeyo et al., "Improving the Capacity Factor and Stability of Multi-MW Grid Connected PV Systems with Results from a 1MW/2MWh Battery Demonstrator," Presented at Proceedings of the 2018 IEEE Energy Conversion Congress and Exposition (ECCE), Sep. 23-27, 2018, Portland, OR, USA, 2504-2509.
Extended Search Report in European Appln. No. 20813193.8, dated Apr. 12, 2023, 9 pages.
Jayasinghe et al., "Dual Inverter Based Battery Energy Storage System for Grid Connected Photovoltaic Systems," Presented at Proceedings of IECON 2010—36th Annual Conference on IEEE Industrial Electronics Society, Nov. 7-10, 2010, Glendale, AZ, USA, 3275-3280.
Tolbert et al., "Charge Balance Control Schemes for Cascade Multi-level Converter in Hybrid Electric Vehicles," IEEE Trans. Indus. Electronics, Oct. 2002, 49(5):1058-1064.
De Simone, "Modular Multilevel Converter with Integrated Storage System for Automotive Applications," Dissertation for the degree of Doctor of Electrical Engineering, Politecnico di Milano, Department of Electronics, Information and Bioengineering, Sep. 21, 2021, 181 pages.
CN Search report Mailed on May 21, 2025 for CN Application No. 202080040357, 2 page(s).
English translation of CN Search report dated May 21, 2025 for CN Application No. 202080040357, 2 page(s).

* cited by examiner

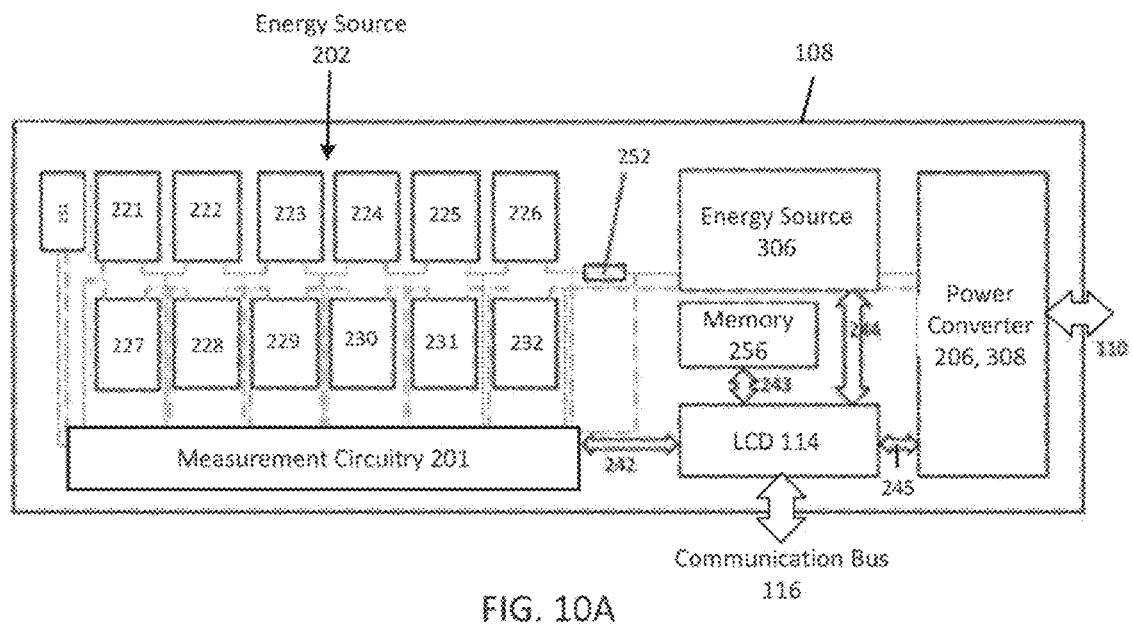
FIG. 10A
(AMENDED)

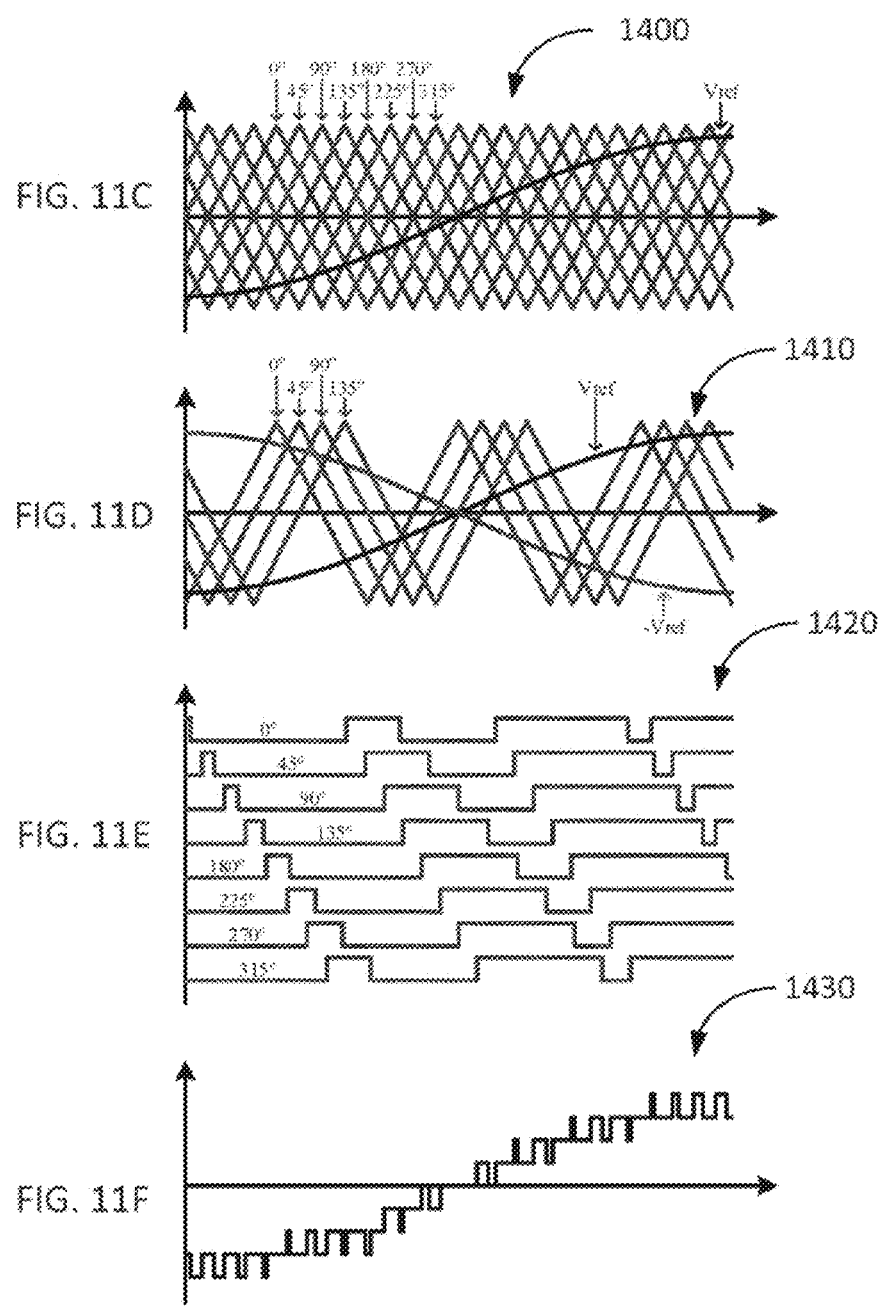

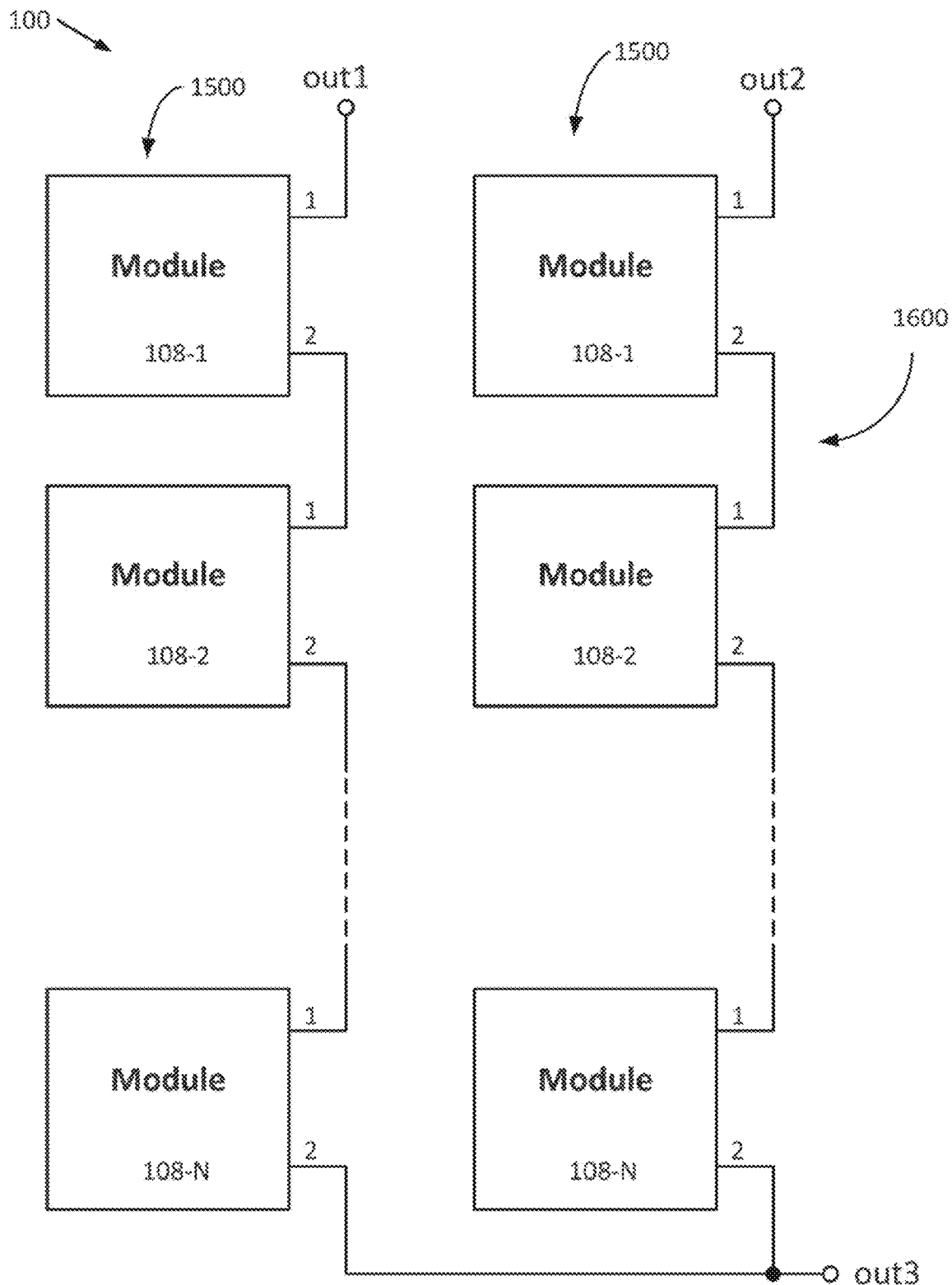
FIG. 12B
(AMENDED)

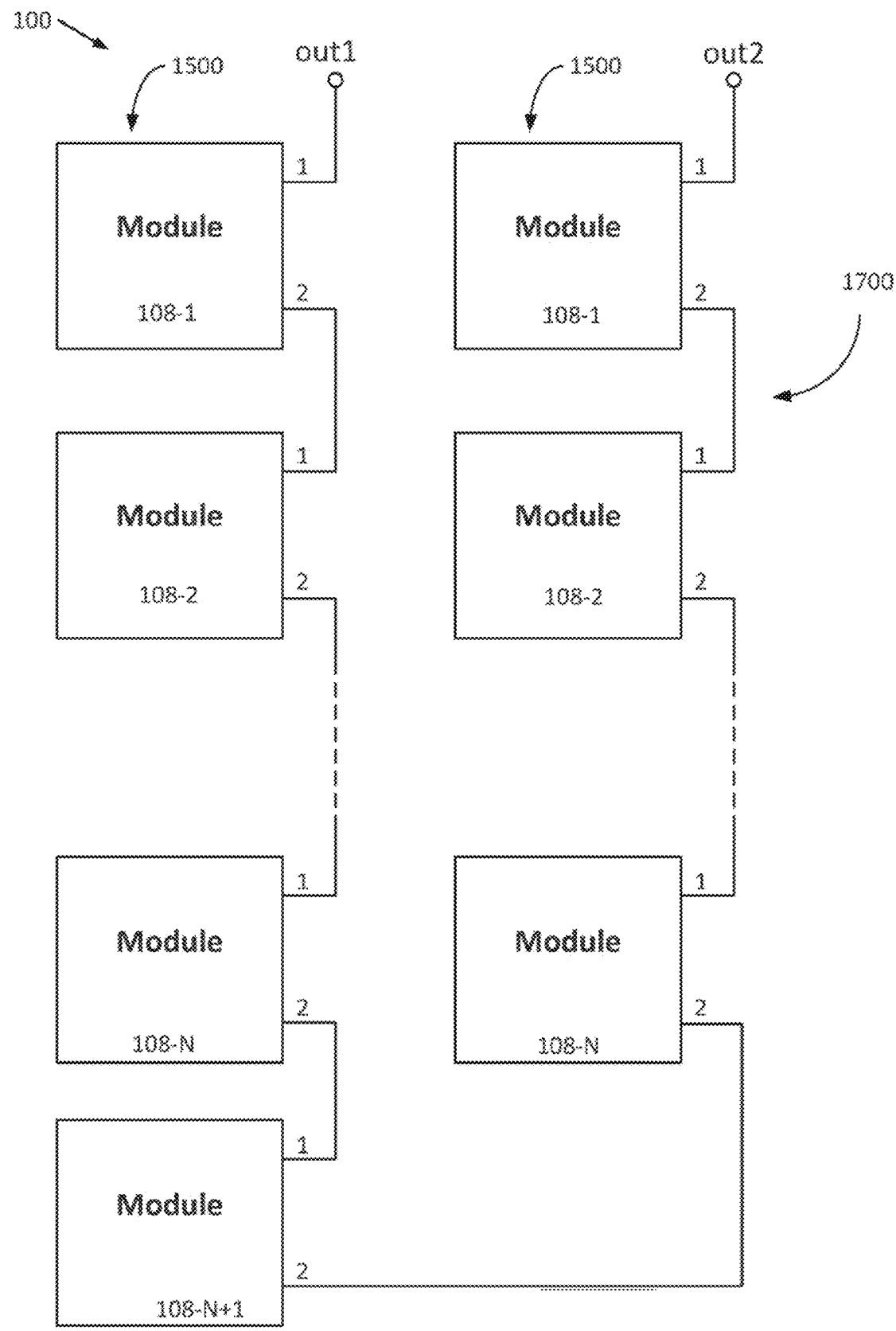
FIG. 12C (AMENDED)

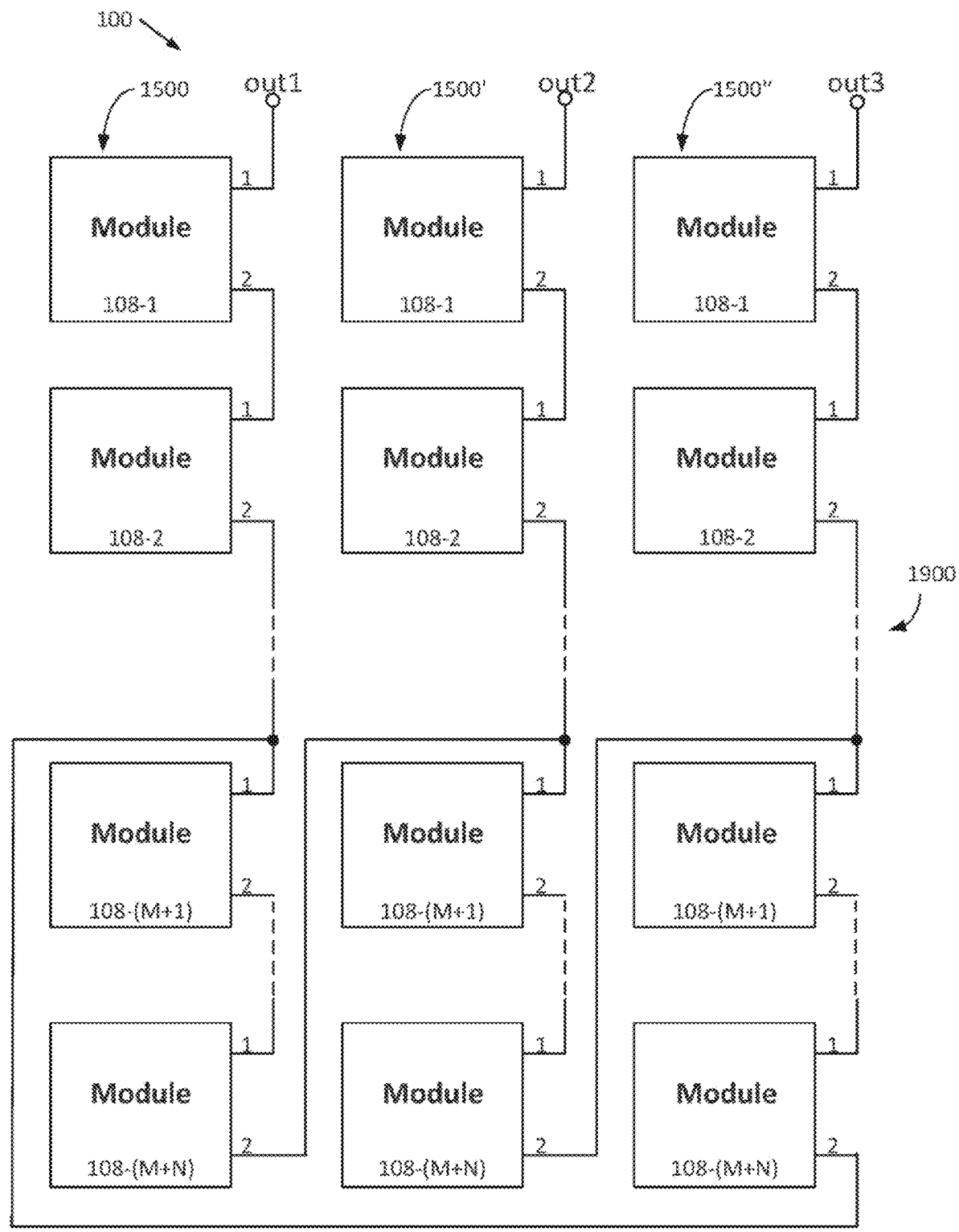
FIG. 12E
(AMENDED)

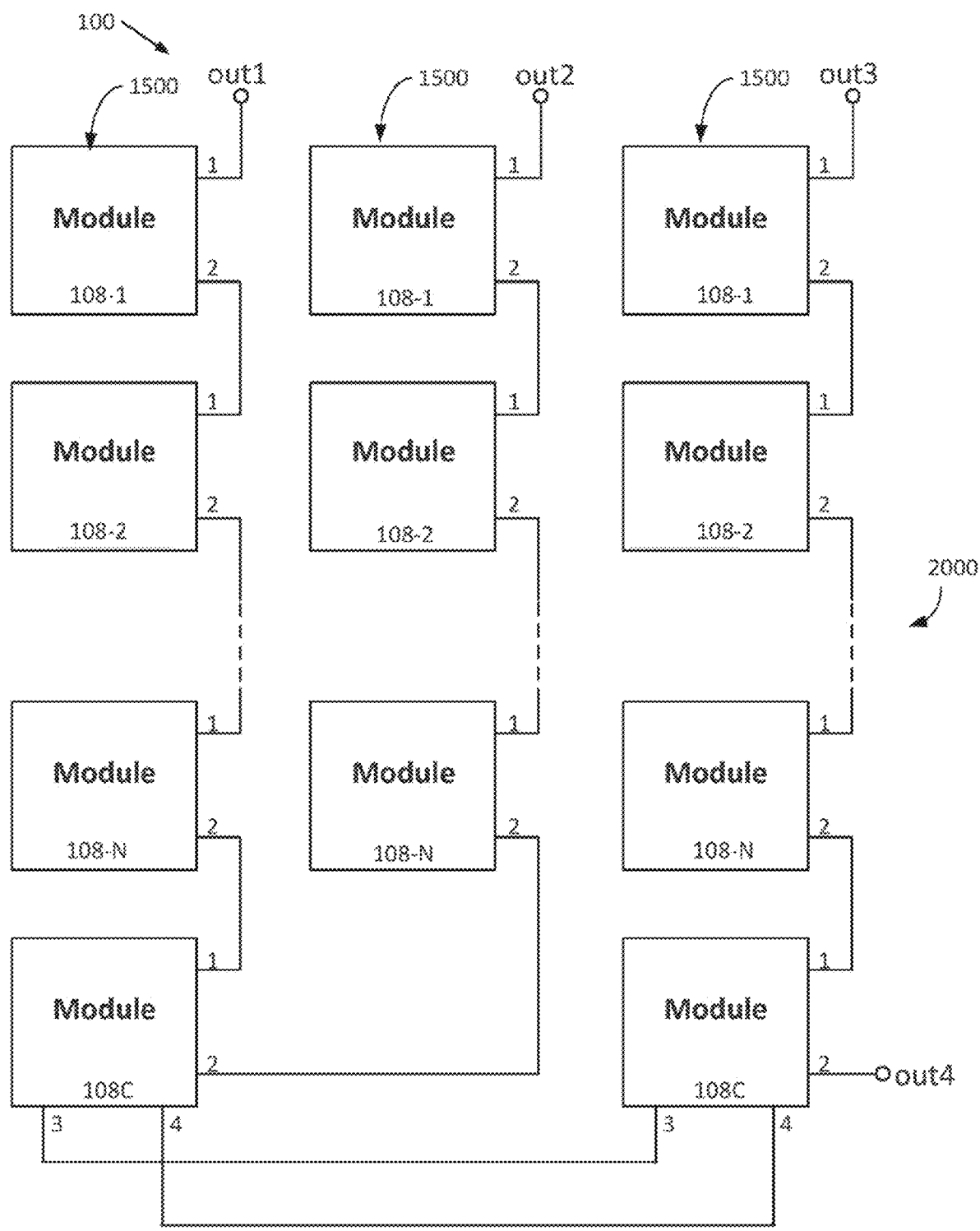
FIG. 12F
(AMENDED)

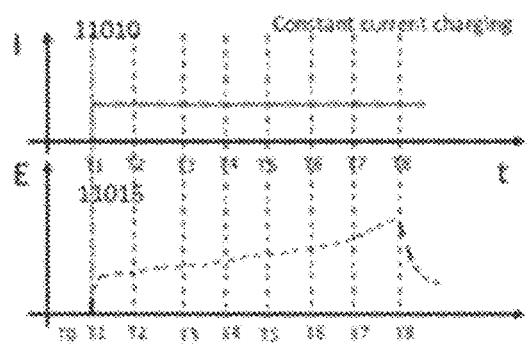
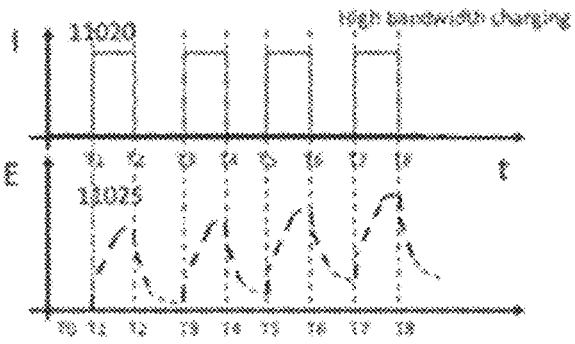
FIG. 18A FIG. 18B
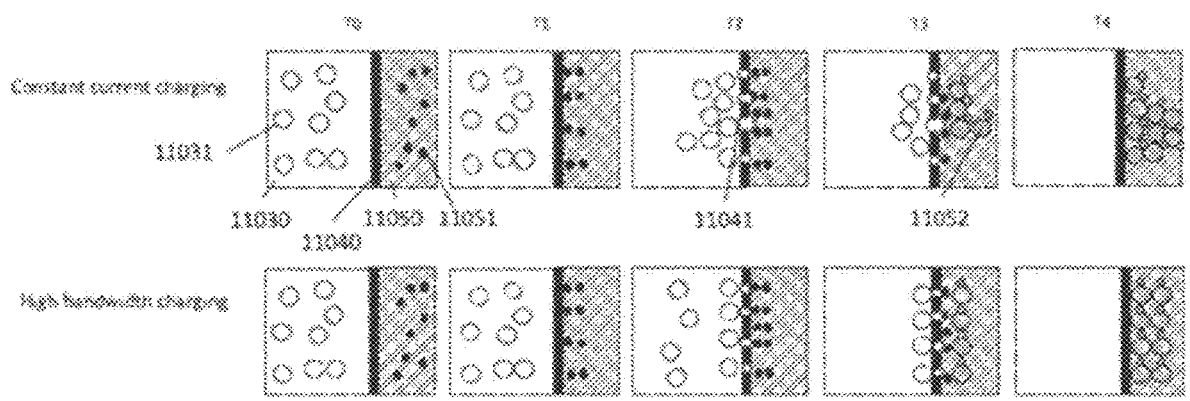
FIG. 18C

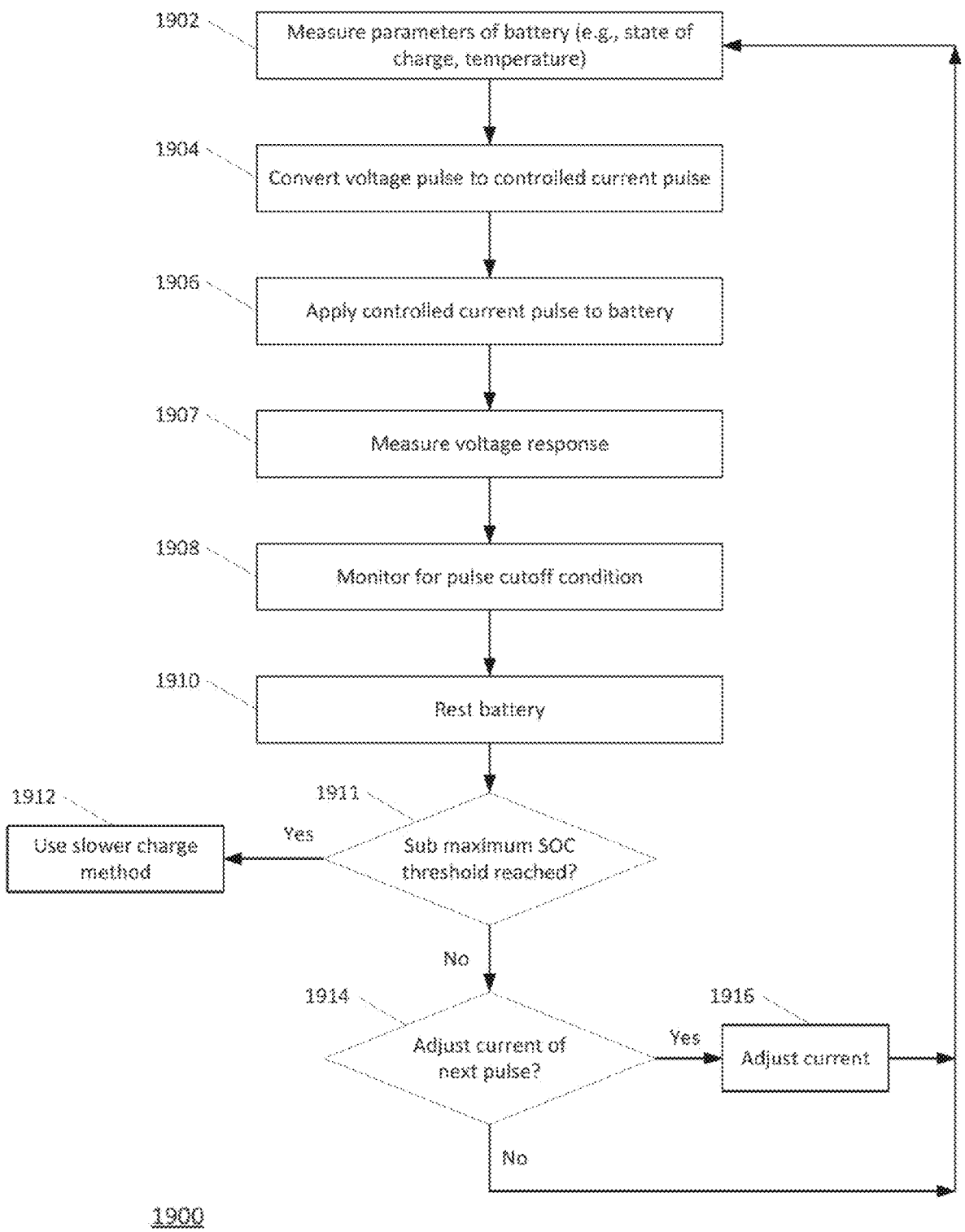
FIG. 19A
(AMENDED)

ADVANCED BATTERY CHARGING ON MODULAR LEVELS OF ENERGY STORAGE SYSTEMS

CROSS-REFERENCE TO RELATED APPLICATIONS

This application is a U.S. National Phase of PCT/US2020/035437, filed May 29, 2020, which claims the benefit of and priority to U.S. Provisional Application No. 62/854,861, filed May 30, 2019, both of which are incorporated by reference herein in their entirety for all purposes.

FIELD

The subject matter described herein relates generally to advanced charging of energy sources in energy storage systems used in both mobile and stationary applications.

BACKGROUND

A number of deficiencies and problems associated with existing charging methods, such as thermal losses, degradation, and slow rate of charge, have been identified. For example it is well known that lengthy charge times for electric vehicles are a major factor limiting their wide spread adoption. For these and other reasons, needs exist for improved systems, devices, and methods. Through applied effort, ingenuity, and innovation, many of these identified problems have been solved by developing solutions that are included in embodiments of the present disclosure, many examples of which are described in detail herein.

SUMMARY

Example embodiments of systems, devices, and methods are described herein for advanced charging of energy sources (e.g., a battery, capacitor, fuel cell) in cascaded modular energy storage systems. The cascaded modular systems in combination with high bandwidth charging algorithms allow improved control over electrochemical reactions of electrochemical charge storage devices. The embodiments described herein can be applied in either an adaptive or non-adaptive manner, e.g., with or without utilization of a measured response to application of a stimulating charge signal. The embodiments described herein can involve the application of a charge pulse of sufficient duration to initiate an electrochemical reaction. In some embodiments the electrochemical reaction is initiated and the pulse is terminated prior to initiation and/or driving of a detrimental side reaction. Aspects of the embodiments can achieve a highly uniform charge transfer over electrode areas even at non-uniform charge transfer resistances or electrolyte resistances, and thus can avoid current focusing and concentration gradients of electrode areas. Embodiments of the present disclosure enable accelerated charging with fewer or lower thermal losses and degradation compared to known charging methods in the field. Numerous other embodiments of systems, devices, and methods are also disclosed.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 10A is a schematic diagram depicting an additional example embodiment of a converter source module within an energy storage system.

FIGS. 11C-11F are graphs of example waveforms used in pulse width modulation.

FIGS. 12A-12H are block diagrams depicting example embodiments of energy storage system configurations.

FIGS. 18A and 18B are graphs depicting current and voltage signals of an example comparison between constant current and high bandwidth stimulation to drive electrochemical reactions.

FIG. 18C illustrates schematically a cross section of an electrochemical electrode with the active electrochemical species at different times in sequence undergoing constant current and high bandwidth stimulation signals.

FIGS. 19A and 19B are flow diagrams depicting example embodiments of methods of charging a modular energy storage system.

DETAILED DESCRIPTION

Figure 1A:
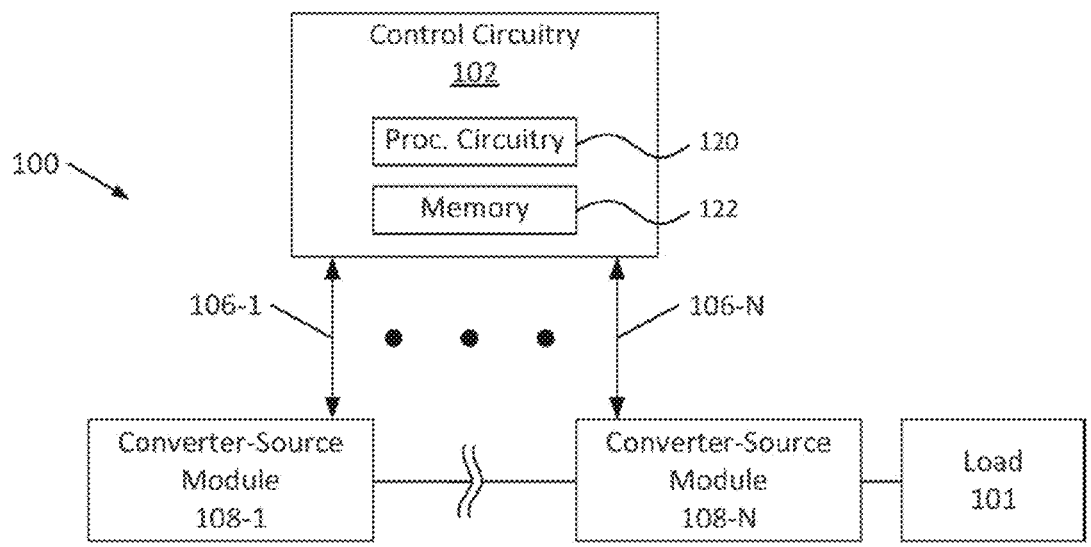
FIGS. 1A-1C are block diagrams depicting example embodiments of a modular energy storage system with various control configurations.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

The present technology relates to advanced charging of cell or multi cell arrangements for mobile applications such as EV, self-driving cars, car sharing application, as well as for stationary storage applications such as grid stabilization, micro grids, bridge energy storage to power critical infrastructure such as data centers, cloud computers, security lighting but not limited to these applications.

The described modular energy topology comprises modules that may be interconnected with a power bus system and a communication bus system. In embodiments, the communication bus system is combined with the power bus system to reduce wiring. In embodiments, the communication bus system is wireless. In embodiments, the present energy modules comprise energy units, one or more micro-controllers, a memory system, inverter circuitry, a switch unit and voltages regulators with embedded software algorithms. The present embodiments in combination with failure, degradation and adaptive charging and discharging routines embedded on the module level enable radically improved battery management.

Embodiments of the present disclosure may provide new capabilities. For example, the present system design establishes an adaptive charging and discharging schema based on the modes of failure or degradation of the energy storage unit on modular level.

Example embodiments of module-based energy systems are described herein, as are: example embodiments of devices, circuitry, software, and components within such systems; example embodiments of methods of operating and using such systems; and example embodiments of applications (e.g., apparatuses, machines, grids, locales, structures, environments, etc.) in which such systems can be implemented or incorporated or with which such systems can be utilized. In many cases, these applications can be classified as a mobile application or a stationary application.

Examples of Applications

Mobile applications are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, etc.), a military vehicle, a spacecraft, and a satellite.

Stationary applications are generally applications other than mobile applications. Generally, in stationary applications the module-based energy system resides in a static location while providing electrical energy for consumption by one or more other entities. Examples of stationary applications in or with which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), and systems that convert solar power, wind, geothermal energy, fossil fuels, or nuclear reactions into electricity for storage. Examples of stationary applications in or with which the embodiments disclosed herein can be used include, but are not limited to: energy systems for charging the mobile applications described above (e.g., a charging station). Other examples of stationary applications in or with which the embodiments disclosed herein can be used include, but are not limited to: a data center storage system, a power grid, or a micro-grid. A stationary energy system can be used in either a storage or non-storage role.

In describing embodiments herein, reference may be made to a particular mobile application (e.g., an electric vehicle (EV)) or stationary application (e.g., grid). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Example Embodiments of Module-Based Energy Systems

FIG. 1A depicts an example embodiment of a module-based energy system 100. Here, system 100 includes control circuitry 102 communicatively coupled with N converter-source modules 108-1 through 108-N, over communication paths or links 106-1 through 106-N, respectively. In these embodiments, any number of two or more converter-source modules can be used (e.g., N is greater than or equal to two). The converter-source modules 108 can be connected to each other in a variety of manners as will be described in more detail with respect to FIGS. 12A-12H. For ease of illustration, in FIGS. 1A-1C, modules 108 are shown connected in series, or as a one dimensional array, where the Nth module is coupled to a load 101. Load 101 is the electrical load to which system 100 outputs power when used to provide power. Load 101 can be any type of load including, but not limited to, a motor or a grid. For charging, the modules can be coupled with a charging source (not shown) either in addition to, or instead of, load 101. As will be described in greater detail herein, system 100 can be configured to supply multiple loads 101, including both primary and auxiliary loads.

In the embodiment of FIG. 1A, control circuitry 102 is configured to control one or more modules 108 based on status information received from the same or different one or more of the modules. Control can also be based on one or more other factors, such as requirements of load 101. In many embodiments, the aspect that is controlled is the output power of each module over time; however other aspects can be controlled as an alternative to or in addition to output power.

In many embodiments, status information of every module in system 100 will be communicated to control circuitry 102, from which control circuitry 102 will independently control every module 108-1 . . . 108-N. Other variations are possible. For example, control of a particular module (or subset of modules) can be based on status information of that particular module (or subset of modules), based on status information of a different module that is not the particular module (or subset of modules), based on status information of all modules other than the particular module (or subset of modules), based on status information of that particular module (or subset of modules) and status information of at least one other module that is not that particular module (or subset of modules), or based on status information of all modules in system 100.

As will be described herein, the status information can be information about one or more aspects of each module. The status information can be an operating characteristic or other parameter. Types of status information include, but are not limited to, the following aspects of a module or components thereof: State of Charge (SOC) (e.g., the level of charge of an energy source relative to its capacity, such as a fraction or percent), State of Health (SOH) (e.g., a figure of merit of the condition of an energy source compared to its ideal conditions), capacity, temperature, voltage, current, or the presence of absence of a fault. Each module 108-1 . . . 108-N includes one or more sensors or other measuring elements for collecting sensed or measured signals or data that constitute status information, or can be converted into status information. A separate sensor is not needed to collect each type of status information, as more than one type of status information can be sensed or measured with a single sensor, or otherwise algorithmically determined without the need for additional sensors.

Figure 1B:
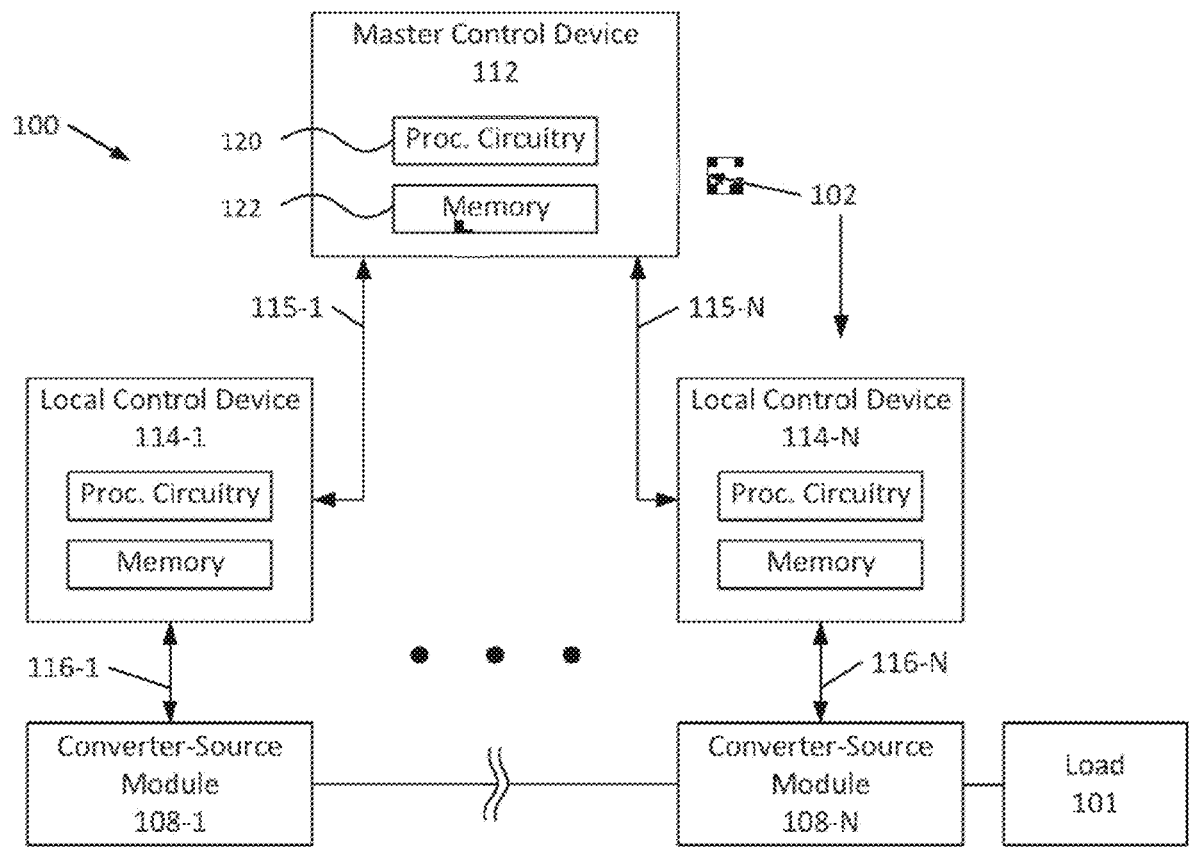

FIG. 1B depicts another example embodiment of system 100. Here, control circuitry 102 is implemented as a master control device 112 communicatively coupled with N different local control devices 114-1 through 114-N over communication paths or links 115-1 through 115-N, respectively. Each local control device 114-1 through 114-N is communicatively coupled with one converter-source module 108-1 through 108-N over communication paths or links 116-1 through 116-N, respectively, such that there is a 1:1 relationship between local control devices 114 and converter-source modules 108.

Figure 1C:
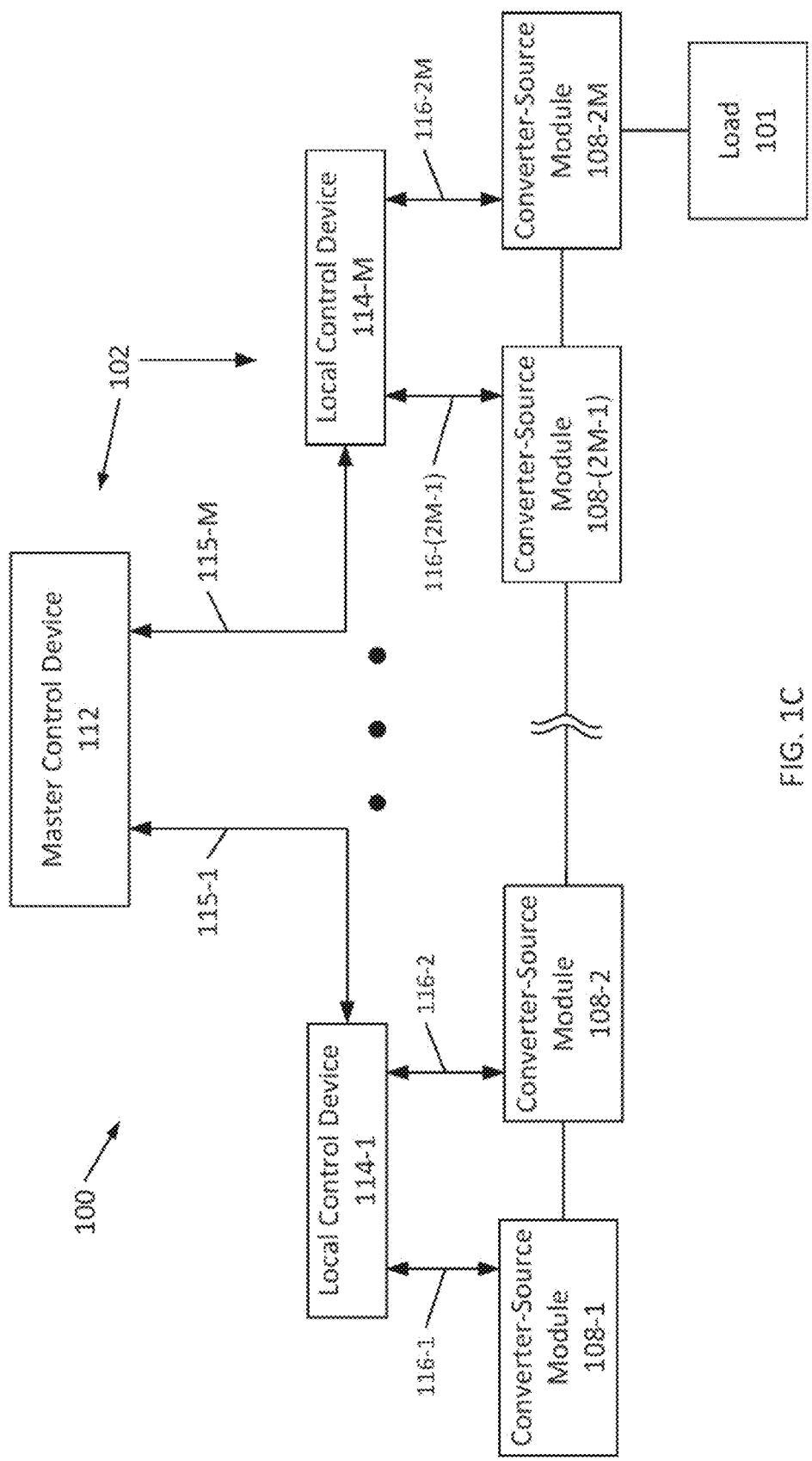

FIG. 1C depicts another example embodiment of system 100. Here, master control device 112 is communicatively coupled with M different local control devices 114-1 through 114-M over communication paths or links 115-1 through 115-M, respectively. Local control devices 114 can be coupled with and control two or more converter-source modules 108. In the example shown here, each local control device 114 is communicatively coupled with two converter-source modules 108, such that M local control devices 114-1 through 114-M are coupled with 2M converter-source modules 108-1 through 108-2M over communication paths or links 116-1 through 116-2M, respectively.

Communication paths or links 106, 115, and 116 can each be wired or wireless communication paths or links that communicate data or information bidirectionally, in parallel or series fashion. Data can be communicated in a standard or custom format. In automotive applications, communication paths or links 115 can be configured to communicate data according to FlexRay or CAN protocols.

In the embodiments described with respect to FIGS. 1B and 1C, the local control devices 114 receive the status information from each module, or determine the status information from sensed or measured signals or data received from each module, and communicate that information to master control device 112. In some embodiments local control devices 114 communicate the measured or sensed data to master control device 112, which then algorithmically determines the status information on the basis of that raw data. Master control device 112 can then use the status information of the modules 108 to make control determinations accordingly. The control determinations may take the form of instructions, commands, or other information (such as a modulation index described below) that can be interpreted or utilized by local control devices 114 to either maintain or adjust the operation or contribution of the modules.

For example, master control device 112 may receive status information indicating one or more of the following conditions that a particular module (or component thereof) is operating in with respect to one or more other modules in system 100: with a relatively lower SOC, with a relatively lower SOH, with a relatively lower capacity, with a relatively lower voltage, with a relatively lower current, with a relatively higher temperature, or with a fault. In such an example, master control device 112 can output control information that causes the power output of that particular module to be reduced (or in some cases, raised depending on the condition). In this manner, the power output of a module that is operating with, e.g., a higher temperature, can be reduced so as to cause the temperature of that module to converge towards the temperature of one or more other modules.

In other embodiments, the determination of whether to adjust the operation of a particular module can be made by comparison of the status information to predetermined thresholds, limits, or conditions, and not necessarily by comparison to statuses of other modules. The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, master control device 112 can adjust the operation of a module if the status information for that module indicates it to be operating in violation (e.g., above or below) of a predetermined threshold or limit, or outside of a predetermined range of acceptable operating conditions. Similarly, master control device 112 can adjust the operation of a module if the status information for that module indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like.

Local control device 114 can receive, process, and transmit: the signals from various sensors (e.g., temperature, voltage and current sensors) of the converter-source module; switching (e.g., triggering) and fault signals to and from semiconductor switches; the voltages of elementary cells of energy storage and buffering elements; and other signals. The local control device can perform communication with and transmission of corresponding control signals to and from the master control device 112.

In this manner, master control device 112 can control the modules 108 within system 100 to achieve or converge towards a desired target. The target can be, for example, operation of all modules at the same or similar levels with respect to each other, or within predetermined thresholds limits, or conditions. This process is also referred to as balancing or seeking to achieve balance in the operation or operating characteristics of the modules. The term "balance" as used herein does not require absolute equality between modules 108 or components thereof, but rather is used in a broad sense to convey to those of ordinary skill in the art that operation of system 100 can be used to actively reduce disparities in operation between modules that would otherwise exist.

Referring back to FIG. 1A, control circuitry 102 can be configured to operate and execute control using software (instructions stored in memory that are executable by processing circuitry), hardware, or a combination thereof. Control circuitry 102 can include processing circuitry and memory as shown here. Example implementations of processing circuitry and memory are described further below. Communication path or links 106 can also include wireline power so as to directly supply the operating power for control circuitry 102 from one or more converter source modules 108. In certain embodiments power for control circuitry 102 is supplied from only one or more converter source modules 108.

Referring to FIGS. 1B-1C, master control device 112 and local control devices 114 can similarly be configured to operate and execute control using software (instructions stored in memory that are executable by processing circuitry), hardware, or a combination thereof, and each can include processing circuitry and memory as shown here. Example implementations of processing circuitry 120 and memory 122 are described further below. Communication path or links 116 can also include wireline power so as to directly supply the operating power for local control devices 114 from one or more converter source modules 108. In certain embodiments, the operating power for each local control device 114 is supplied only by the one or more converter source modules 108 to which that local control device 114 is connected by path 116. The operating power for the master control device 112 can be supplied indirectly from one or more of the converter-source modules 108 (e.g., such as through a car's power network).

In some embodiments, control circuitry 102 can include a single control device for the entire system 100. In other embodiments, control circuitry can be distributed between local control devices 114 associated with the modules 108, such that a separate master control device 112 is not necessary and can be omitted from system 100.

In some embodiments, control of system 100 can be distributed between control circuitry 102 dedicated to or local to system 100, and control circuitry that is shared with other parts of the application. For example, in an automotive application, master control device 112 can be implemented as part of another control device (e.g., Electronic Control Unit (ECU)) of the vehicle having responsibility for one or more other automotive functions (e.g., motor control, driver interface control, traction control, etc.).

Control circuitry 102 can have a communicative interface for communicating with another control device of the application. For example, in an automotive application, control circuitry 102 (e.g., master control device 112) can output data or information about system 100 to another control device (e.g., the ECU) of the vehicle.

Example Embodiments of Modules within Cascaded Energy Storage Systems

Figure 2:
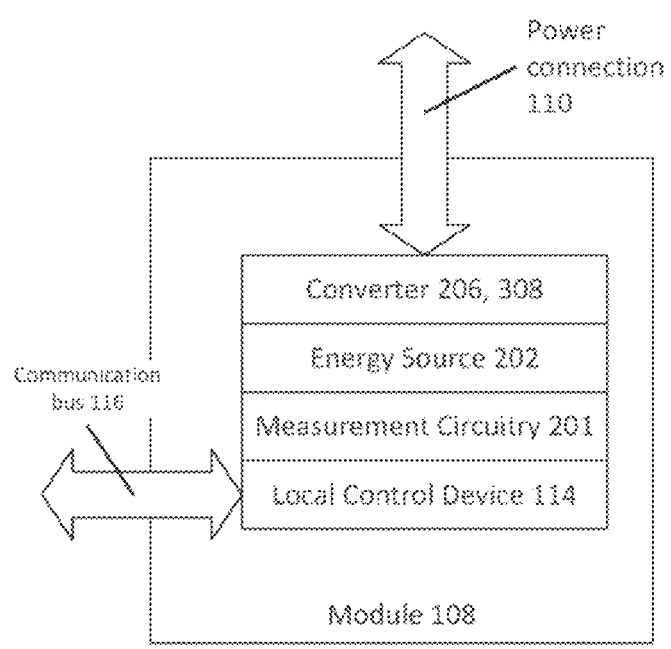
FIG. 2 is a block diagram depicting an example embodiment of a converter module.

A block diagram of an example embodiment of a module 108 is shown in FIG. 2. Module 108 can include any number of one or more energy sources 202. In this example, module 108 includes one energy source 202, which can be any of the types described herein, or combinations thereof. Module 108 can also include power electronics converter circuitry 206 or 308 (e.g., controllable switch circuitry), voltage, current and/or temperature measurement circuitry 201, and a local control device (LCD) 114 or other control circuitry communicatively coupled with (or including) memory that can store an adaptive control algorithm or executable software steps. Converter circuitry 206, 308 can receive and/or output power over power connection 110. Local control device can be communicatively coupled to other local control devices 114 and/or master control device 112 via communication bus 116.

Power connection 110 is a connection for transferring energy or power to, from and through module 108. Module 108 can output energy or power from energy source 202 to power connection 110, where it can be transferred to other modules of the system or to a load. Module 108 can also receive energy or power from other modules 108 or a charging source (DC charger, single phase charger, multi-phase charger). Signals can also be passed through module 108 bypassing energy source 202. The routing of energy or power into and out of module 108 is performed by power electronics converter 206, 308 under the control of control circuitry such as LCD 114.

Module 108, particularly LCD 114, can communicate (receive and/or send) information over communication bus 116. The information can be measurements or data about operating characteristics of the module and components thereof that is sent by LCD 114 to other control circuitry, such as master control device (MCD) 112. The information can also be control information, e.g., a voltage reference signal and/or a modulation index, received by LCD 114 and used to generate one or more control signals for power electronics converter 206, 308. Communication bus 116 can communicatively connect LCD 114 with other control circuitry of other modules 108, with master control circuitry such as the MCD, or with other devices.

Measurement circuitry 201 is configured to measure one or more voltages, temperatures, and/or currents of one or more components, such as the energy sources, of module 108. In some embodiments, measurement circuitry 201 is capable of measuring aspects of energy source 202 such as state of charge, temperature, current, and voltage. This information can be transferred within module 108 to LCD 114 for use by control circuitry in monitoring module 108 and controlling the energy output from and/or input to module 108 with respect to one or more other modules of the system. This permits the relative measured aspects of the modules in the system to be balanced with respect to each other.

Figure 3:
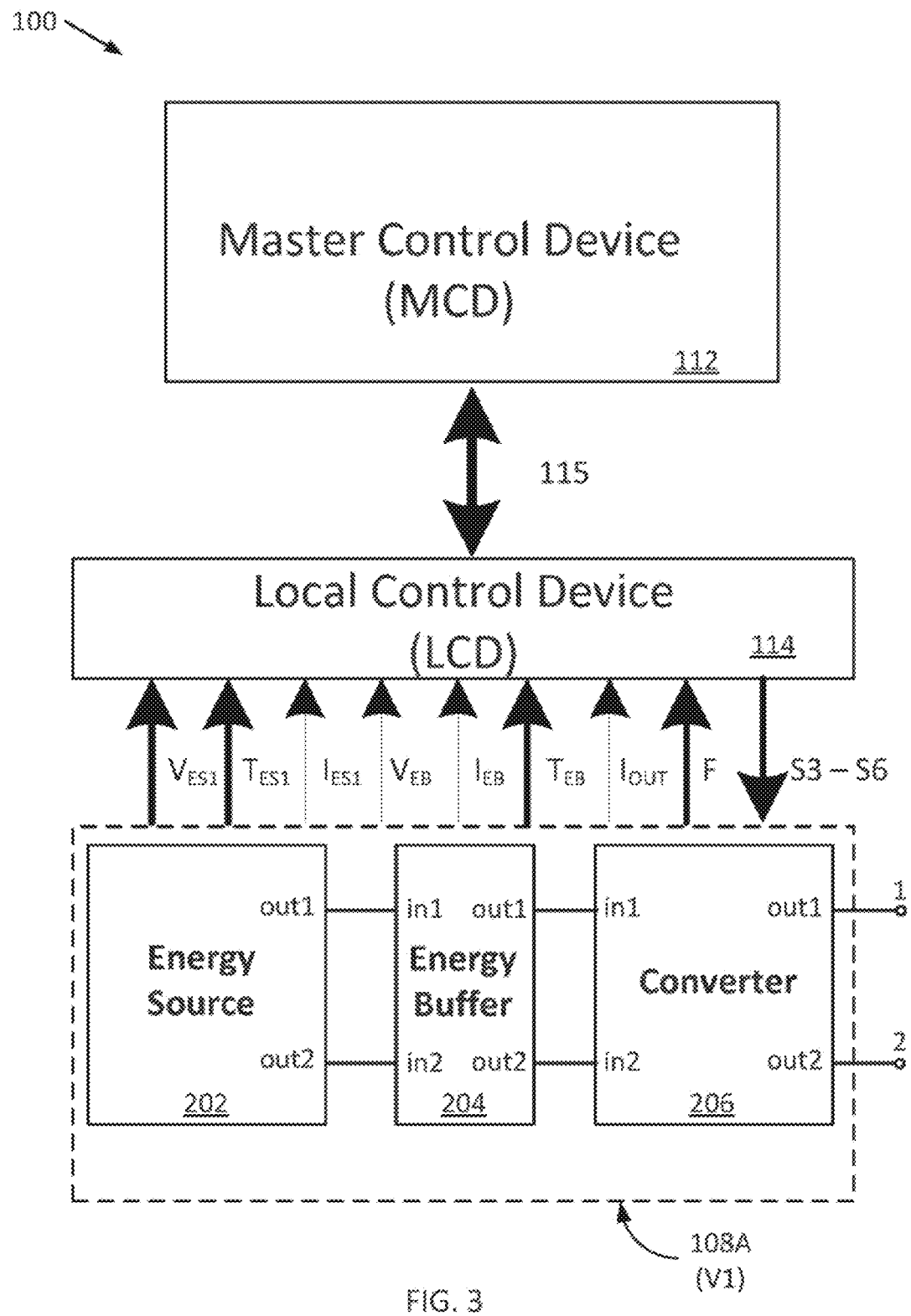
FIGS. 3-5 are block diagrams depicting additional example embodiments of a converter module within an energy storage system.
Figure 4:
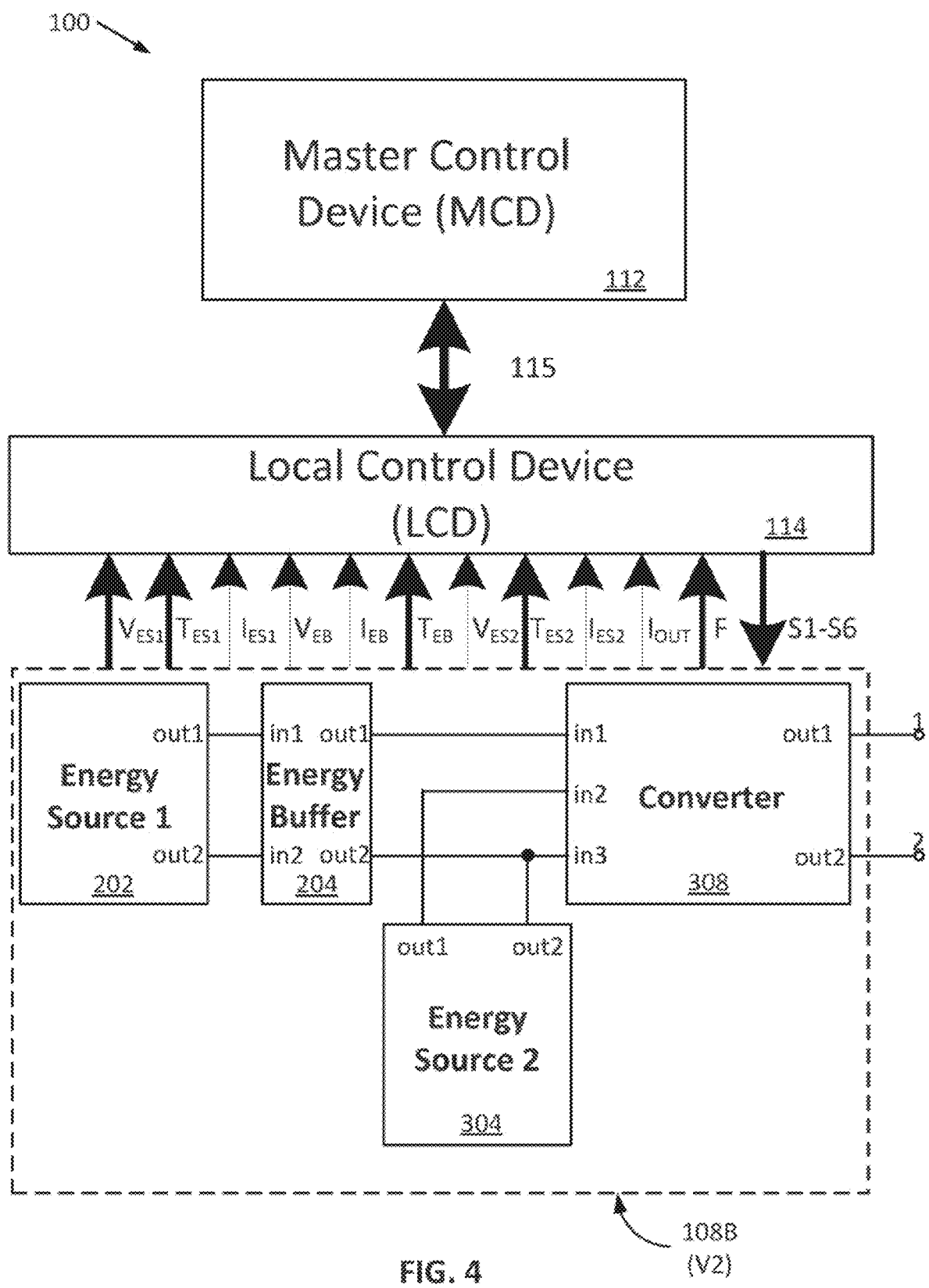
Figure 5:
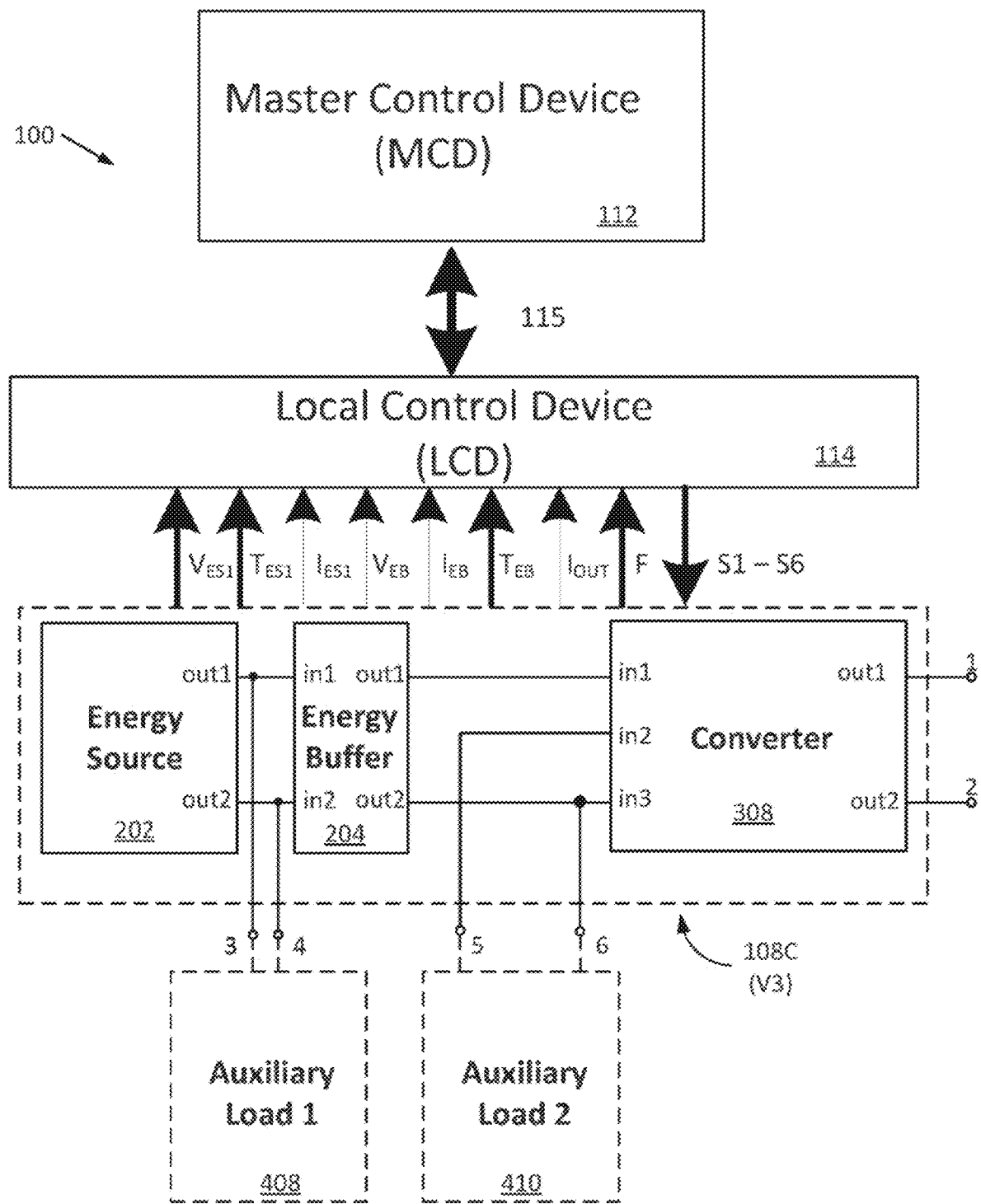

FIGS. 3-5 depict example embodiments of converter-source modules 108 within system 100 as depicted in FIG. 1B, with one local control device 114 per module. The embodiments of FIGS. 2-5 and any and all other embodiments described herein can be implemented in accordance with the configurations of FIGS. 1A-1C unless otherwise noted.

Modules 108 can be implemented as voltage converters or current converters. For ease of description, the embodiments described herein are done so with reference to voltage converters, although the embodiments are not limited to such.

FIG. 3 is a block diagram depicting an example embodiment of a module 108A within system 100. This embodiment of module 108A may be referred to herein as version 1 of an example module (V1) and is an example of a type of converter-source module 108. Also shown is a local control device 114 (LCD) and a master control device 112 (MCD). Module 108A is communicatively coupled with the LCD 114, which in turn is communicatively coupled with the MCD 112.

Figures 7A, 7B, 7C:
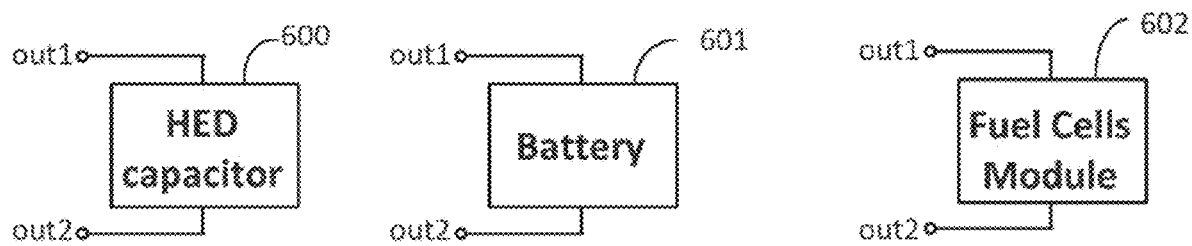
FIGS. 7A-7C are block diagrams depicting example embodiments of energy sources.

Module 108A includes an energy source 202, which can include one or more energy storage elements. Energy source 202 can be, for example, one of the following, but not limited to, an ultra-capacitor 600 (FIG. 7A), a battery module 601 including at least one cell or multiple battery cells connected in series and/or in parallel (FIG. 7B), or fuel, a fuel-cell, or fuel cell module 602 (FIG. 7C).

Figure 8A:
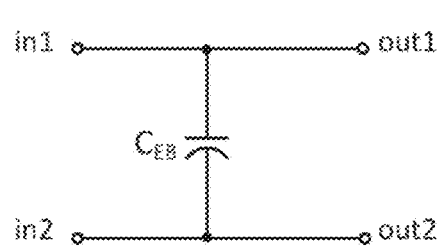
FIGS. 8A-8C are schematic diagrams depicting example embodiments of energy buffers.
Figure 8B:
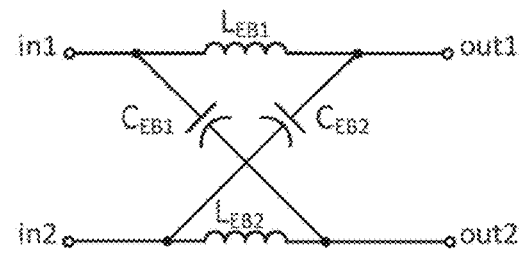
Figure 8C:
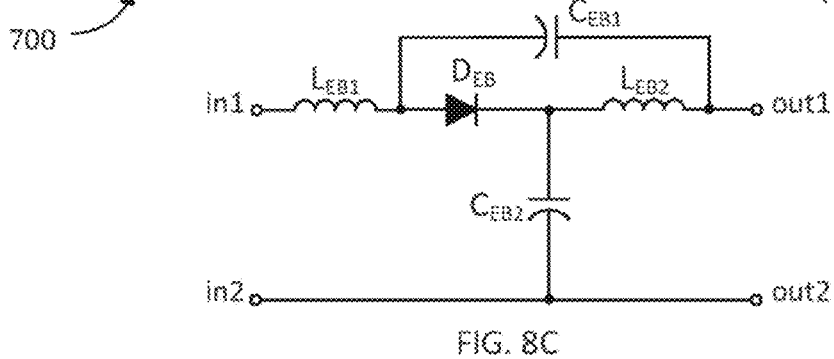

The outputs out1 and out2 of energy source 202 can be connected to input terminals in1 and in2 of an energy buffer 204, respectively, which can include, for example, one of the following, but not limited to, elements and topologies based on: an electrolytic and/or film capacitor CEB 700 (FIG. 8A), a Z-source network 710, formed by two inductors LEB1 and LEB2 and two electrolytic and/or film capacitors CEB1 and CEB2 (FIG. 8B), a Quasi Z-source network 720, formed by two inductors LEB1 and LEB2, two electrolytic and/or film capacitors CEB1 and CEB2 and a diode DEB (FIG. 8C). A choice of specific topology and components of energy buffer 204 depends on a maximum permissible amplitude of high frequency voltage pulsations on output terminals out1 and out2 of energy buffer 204. These pulsations can degrade the performance of the module 108, thus they can be efficiently buffered by designing suitable elements and topologies as a basis thereof.

Figure 6A:
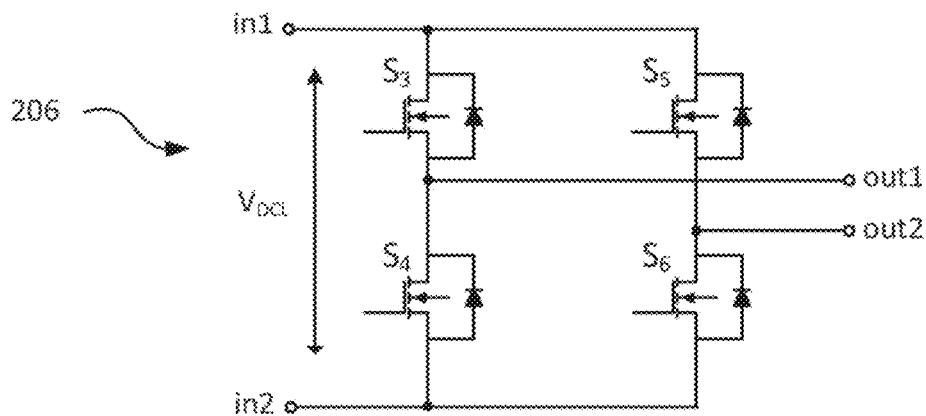
FIGS. 6A-6B are schematic diagrams depicting example embodiments of converter circuitry.
Figure 6B:
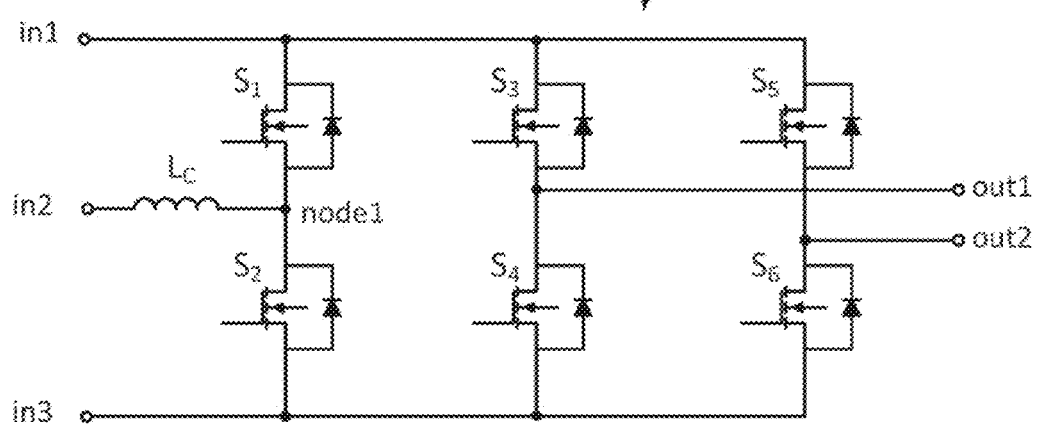

The outputs out1 and out2 of energy buffer 204 are connected respectively to the inputs in1 and in2 of converter 206. A schematic representation of an example embodiment of a converter 206 is shown in FIG. 6A. In many embodiments, converter 206 can include at least four switches S3, S4, S5, S6, which can be configured as semiconductor switches, such as metal-oxide-semiconductor field-effect transistors or MOSFETs (as shown in FIGS. 6A-6B). Another switch example is an insulated-gate bipolar transistor or IGBT. Semiconductor switches can be operated at relatively high switching frequencies, thereby permitting converter 206 to be operated in pulse-width modulated mode if desired, and to respond to control commands within a relatively short interval of time. This can provide a high tolerance of output voltage regulation and fast dynamic behavior in transient modes.

In this embodiment, converter 206 generates three different voltage outputs, +VDCL, 0, and −VDCL by connecting the DC line voltage VDCL, between its terminals in1 and in2, to its output terminals out1 and out2 by different combinations of switches S3, S4, S5, S6. To obtain +VDCL, switches S3 and S6 are turned on, whereas −VDCL can be obtained by turning on the switches S4 and S5. By turning on S3 and S5 or S4 and S6, the output voltage is set to zero or a reference voltage.

Figure 11A:
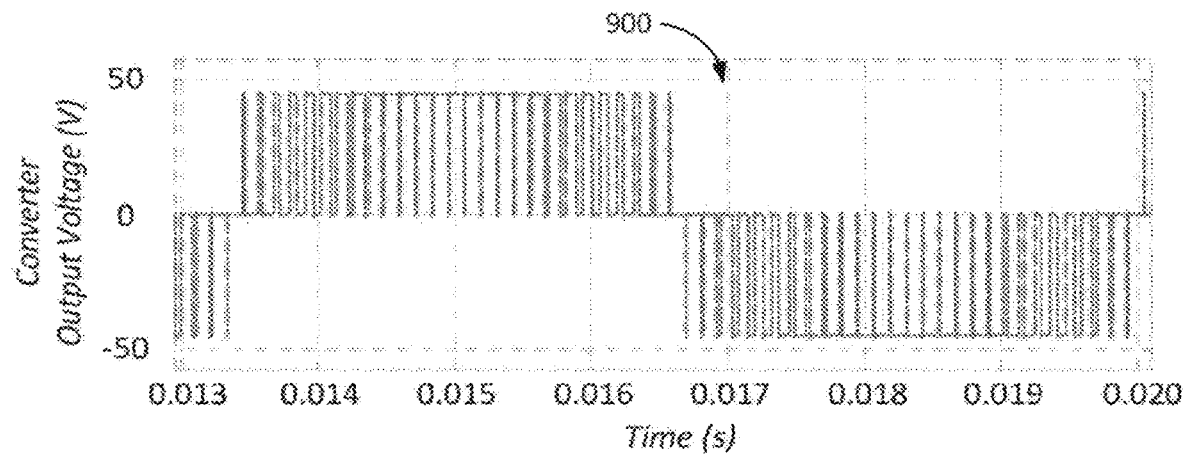
FIGS. 11A-11B are graphs of example output waveforms.

The control switching signals for semiconductor switches S3, S4, S5, S6 may be generated in different ways depending on the flexibility and requirements of the adopted control technique in the LCD and MCD. One approach is to use space vector pulse-width modulation SVPWM or sinusoidal pulse-width modulation SPWM, or variations thereof, to generate the output voltage of converter 206. An example of an output voltage waveform 900 of converter 206 is shown in FIG. 11A. The modulation method also depends on which version of system 100 to which it is applied and one possible solution of modulation will be presented herein further as an example.

In some embodiments using pulse width modulation, the LCD (and not the MCD) generates the switching signals for the switches in the module. In some embodiments, such as those using hysteresis, generation of the switching signals can be performed by the MCD. The LCD 114 shown in FIG. 3 can be connected to module 108A via a set of diagnostics, measurement, protection and control signal lines, and can perform one or more of three primary functions. The first function is management of energy source 202. The second function is protection of energy buffer 204 and more specifically it's components from over-current, over-voltage and high temperature conditions. The third function is control and protection of converter 206.

In one example embodiment, the function of management, by LCD 114, of energy source 202 for module 108A is as follows. LCD 114 accepts the measurement signals VES1, TES1, IES1, which are: VES1—the voltages of at least one of the, preferably all, elementary components of energy source 202 or the voltages of groups of elementary components, such as, for example and not limited to, battery cells (individual or connected in series and/or in parallel), ultra-capacitor cells (individual, or connected in series and/or in parallel); TES1—the temperatures of at least one of, preferably all, elementary components of energy source 202 or the temperatures of groups of elementary components; IES1—the output current of energy source 202. Based on these measurement signals LCD 114 can perform one or more of the following: calculation or determination of a real capacity, actual State of Charge (SOC) and State of Health (SOH) of the elementary components or groups of elementary components; set a warning or alarm signal, based on measured and/or calculated data; and/or transmission of corresponding signals to MCD 112.

In one example embodiment, the function of protection, by LCD 114, of energy buffer 204 is as follows. LCD 114 accepts the measurement signals VEB, TEB, IEB, which are: VEB—the voltages of at least one major component of the Energy Buffer, for example and not limited to, capacitor CEB, or capacitors CEB1, CEB2 (see FIGS. 8A-8C); TEB—the temperature of at least one component of the Energy Buffer; and/or IEB—the current through at least one component of energy buffer 204. Based on these measurement signals, LCD 114 can perform the following: setting of a warning or alarm signal based on measured data; and/or transmission of corresponding warning or alarm signals to MCD 112.

In one example embodiment, the function of control and protection, by LCD 114, of the converter 206 for module 108A is as follows. LCD 114 can receive the command signals from the MCD (e.g., over link 115 which can be, e.g., FlexRay or CAN), which in some embodiments can be a modulation reference signal and an enable signal, or a reference signal and a modulation index, which can be used with a pulse width modulation technique in LCD 114 to generate the control signals for semiconductor switches S3, S4, S5, S6. The current feedback signal IOUT (not shown in FIG. 3) coming from an integrated current sensor of converter 206 can be used for overcurrent protection together with one or more signals F, coming from driver circuits (not shown in FIG. 3) of the switches of converter 206, which can carry information about failure statuses (e.g., short circuit or open circuit failure modes) of all switches in converter 206. Based on this data, LCD 114 can make a decision on which combination of switching signals to be applied to corresponding semiconductor switches S3, S4, S5, S6 to bypass or to disconnect converter 206 and the entire module 108A from system 100. (A switching signals for a particular switch can turn that switch on or off.)

FIG. 4 is a block diagram depicting another example embodiment of a module 108B that may be referred to herein as version 2 and is an example of a type of converter-source module 108. Module 108B is communicatively coupled with LCD 114, which in turn is communicatively coupled with MCD 112.

In this embodiment, module 108B is in a dual energy source configuration with a primary energy source 202 and secondary energy source 304. Energy source 202 can include, for example, one of the following, but not limited to, a high energy density capacitor 600 such as an ultra-capacitor or super-capacitor (FIG. 7A), a battery module 601 (FIG. 7B) including at least one cell or plurality of battery cells connected in series and/or in parallel, and fuel, a fuel-cell, or a fuel-cell module 602 (FIG. 7C).

The outputs out1 and out2 of energy source 202 can be connected to input terminals in1 and in2 of energy buffer 204, the variants of which are described above. The outputs out1 and out2 of energy buffer 204 are connected respectively to the inputs in1 and in3 of converter 308.

Figure 9A:
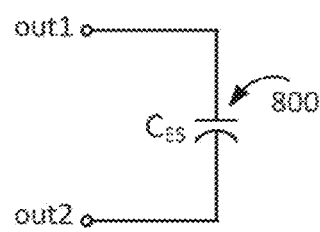
FIGS. 9A-9F are block diagrams depicting example embodiments of secondary energy sources that can be included within a converter module.
Figure 9B:
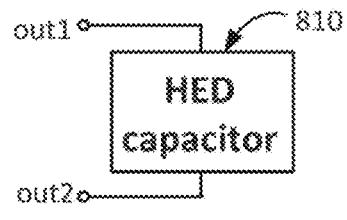
Figure 9C:
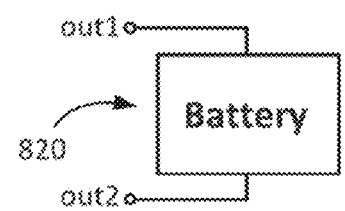
Figure 9D:
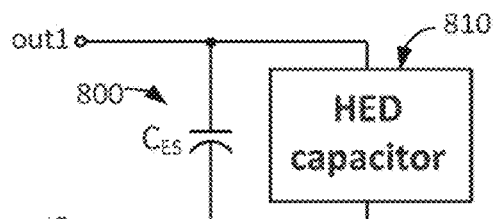
Figure 9E:
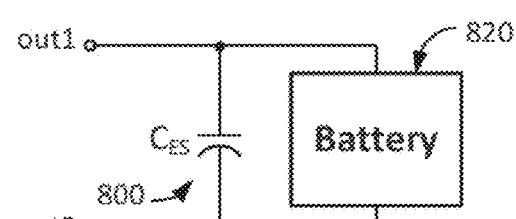
Figure 9F:
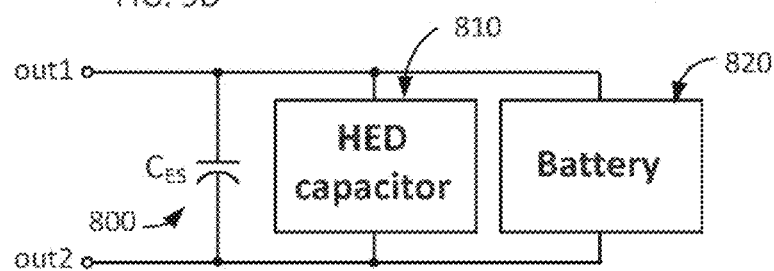

The output out2 of energy buffer 204 can be connected also to the output out2 of energy source 304. Another output of energy source 304, out1, is connected to input in2 of converter 308. Energy source 304 can include, for example, one of the following, but not limited to, storage elements such as: an electrolytic and/or a film capacitor CEB 800 (FIG. 9A); an HED capacitor 810 (FIG. 9B); a battery module 820 including at least one cell or plurality of battery cells connected in series and/or in parallel (FIG. 9C); an electrolytic and/or a film capacitor CEB 800 connected in parallel with an HED capacitor 810 (FIG. 9D); an electrolytic and/or a film capacitor CEB 800 connected in parallel with battery module 820, including at least one cell or plurality of battery cells connected in series and/or in parallel (FIG. 9E); an electrolytic and/or a film capacitor CEB 800 connected in parallel with an HED capacitor 810 and a battery module 820, including at least one cell or plurality of battery cells connected in series and/or in parallel (FIG. 9F).

A simplified schematic representation of example embodiment of converter 308 is shown in FIG. 6B. Here, converter 308 includes six switches S1, S2, S3, S4, S5, S6, which can be configured as semiconductor switches, such as e.g. MOSFETs (as shown in FIG. 6B) or IGBTs. Semiconductor switches can be operated at high switching frequency, thereby permitting converter 308 to be operated in pulse-width modulated mode if required, and to respond to the control commands within a short interval of time, providing a high tolerance of output voltages regulation and fast dynamic behavior in transient modes.

The left-hand side of converter 308 includes two switches S1 and S2, and can generate two different voltages at Node 1, which are +VDCL and 0, referenced to input In3, which can be at virtual zero potential. The coupling inductor $L_C$ is connected between input In3 and Node 1. The output out1 of energy source 304 is connected to coupling inductor LC at the input In 3 of converter 308. The current consumed from or generated to energy source 304 can be controlled by regulating the voltage on coupling inductor $L_C$, using, for example, a pulse-width modulation technique or a hysteresis control method for commutating switches S1 and S2. Other techniques can be used as well.

The right-hand side of converter 308 includes four switches S3, S4, S5, S6, and is capable of generating three different voltage outputs, +VDCL, 0, and −VDCL by connecting the DCL-voltage VDCL between terminals in1 and in2 to the output terminals out1 and out2 by different combinations of switches S3, S4, S5, S6. To obtain +VDCL voltage between out1 and out2, switches S3 and S6 are turned on, whereas −VDCL voltage between out1 and out2 can be obtained by turning on switches S4 and S5. By turning on S3 and S5 or S4 and S6, the output voltage is set to zero or a reference potential.

The control switching signals for semiconductor switches S3, S4, S5, S6 may be generated in different ways depending on the flexibility and requirements of the adopted control technique in LCD 114 and MCD 112. One approach is to use pulse width modulation, such as space vector pulse-width modulation (SVPWM) or sinusoidal pulse-width modulation (SPWM), including additional variations of thereof, to generate the output voltage of converter 308. A typical output voltage waveform 900 of converter 308 is shown in FIG. 11A. The modulation method can vary based on the needs of the application.

In this example embodiment of module 108B, energy source 202 acts as a primary energy source and therefore supplies the average power needed by the load. Energy source 304 can be a secondary energy source with the function of assisting energy source 202 by providing additional power at load power peaks, or absorbing excess power.

Figure 11B:
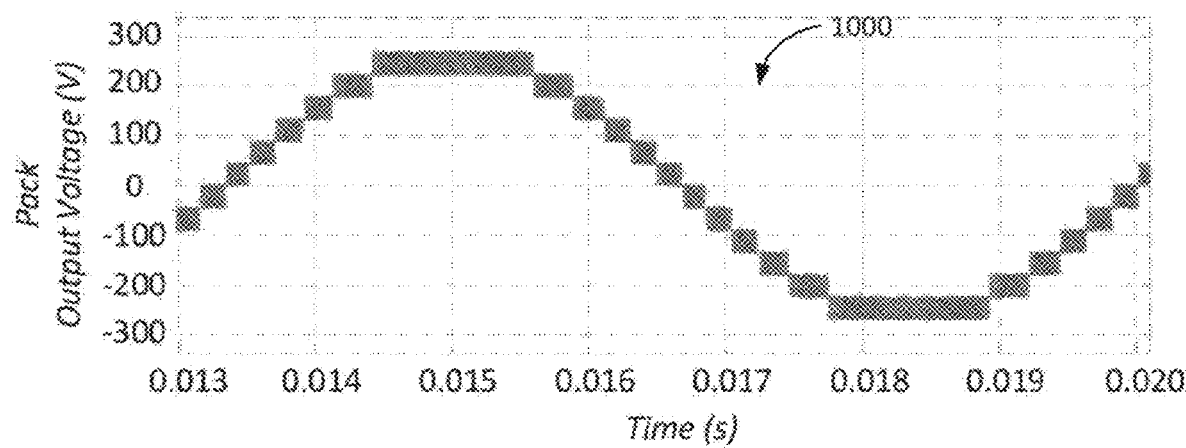

FIG. 11B shows the output voltage waveform 1000 from an example module-based energy storage system having six example converter-source modules.

Both primary and secondary functions performed by Converter V2 and described above can be performed either separately or at the same time. If at the same time, energy source 304 can include an electrolytic capacitor or ultra-capacitor 810 connected in parallel with other energy storage elements as shown in FIGS. 9A, 9B, and 9D-9F.

An LCD 114 is shown in FIG. 4 connected to module 108B via a set of diagnostics, measurement, protection and control signal lines, and can perform at least one of, preferably all of, four major functions. The first function is management of energy source 202. The second function is management of energy source 304. The third function is protection of energy buffer 204 and more specifically its components from over-current, over-voltage and high temperature. The fourth function is control and protection of converter 308.

The function of management of energy source 202 can be as follows. LCD 114 accepts the measurement signals VES1, TES1, IES1, which are: VES1—the voltages of all elementary components/cells of energy source 202 or the voltages of groups of elementary components/cells, such as, for example, but not limited to, battery cells, individual or connected in series and/or in parallel, ultra-capacitor cells, individual, or connected in series and/or in parallel; TES1—the temperatures of all elementary components of Energy Source 1 or the temperatures of groups of elementary components; IES1—the output current of energy source 202. Based on these measurement signals LCD can perform the following: calculates a real capacity, actual State of Charge (SOC) and State of Health (SOH) of the elementary components or groups of elementary components; set a warning or alarm signal based on measured and calculated data; transmission of corresponding signals to MCD 112.

The function of management of energy source 304 for module 108B can be as follows. LCD 114 can receive the measurement signals VES2, TES2, IES2, which are: VES2—the voltages of all elementary components or cells of energy source 304 or the voltages of groups of elementary components or cells, such as, for example and not limited to, battery cells, individually or connected in series and/or in parallel, ultra-capacitor cells, individually or connected in series and/or in parallel; TES2—the temperatures of all elementary components of energy source 304 or the temperatures of groups of elementary components; IES2—the output current of energy source 304. Based on these measurement signals, the LCD can perform the following: calculate a real capacity, actual State of Charge (SOC) and State of Health (SOH) of the elementary components or groups of elementary components; set a warning or alarm signal, based on measured and calculated data; and/or communicate corresponding signals to MCD 112.

The function of protection of energy buffer 204 for module 108B can be as follows. LCD 114 receives the measurement signals VEB, TEB, IEB, which are: VEB—the voltages of at least one major component of energy buffer 204, for example and not limited to, capacitor CEB, or capacitors CEB1, CEB2 (see FIGS. 8A-8C); TEB—the temperature of at least one major components of energy buffer 204; and/or IEB—the current through at least one major components of energy buffer 204. Based on these measurement signals LCD 114 can perform the following: set a fault (e.g., warning or alarm) signal based on measured data; and/or transmit corresponding fault signals to MCD 112.

The function of control and protection of converter 308 for module 108B can be as follows. LCD 114 receives the command signals from MCD 112, which can be a modulation reference signal and enable signal, or a reference signal and a modulation index, which can be used in a PWM and/or a Hysteresis function in the LCD to generate the control signals for semiconductor switches S1, S2, S3, S4, S5, S6 in accordance to power management and/or second order harmonic reduction techniques described above. The current feedback signals IES2, IOUT coming from the integrated current sensors (not shown in FIG. 4) of converter 308 can be used for overcurrent protection together with signals F, for example, coming from driver circuits (not shown in FIG. 4), of semiconductor devices of converter 308, which carry the information about failure statuses (e.g., short circuit or open circuit failure mode) of one or more, preferably all, of the semiconductor switches. Based on this specific data, LCD 114 can make a decision on which combination of switching signals S1, S2, S3, S4, S5, S6 to be applied to the corresponding semiconductor switches to bypass or disconnect converter 308 and the entire module 108B from system 100 (e.g., the battery pack, etc.).

FIG. 5 is a block diagram depicting an example embodiment of a module 108C, referred to as version 3 and is an example of a type of converter-source module 108. In this example, module 108C is communicatively coupled with LCD 114, which in turn is communicatively coupled with MCD 114.

Module 108C can include an energy source 202 and converter 308 with an additional input for connection of an auxiliary load 410, if desired, as shown in FIG. 5. Module 108C has output ports 1 and 2 for connection with other modules 108 (e.g., V1, V2, and/or V3) within an example system 100. The illustrated output ports 3 and 4 of module 108C can be used for connection of the example module 108C to the same output ports of other modules 108C of an example system 100, if needed, and/or for connection to an Auxiliary Load 1 408, if desired, as shown in FIG. 5. The illustrated output ports 5 and 6 of module 108C can be used for connection of the example module 108C to the same output ports of other modules 108C of an example system 100, if needed, and/or for connection to an Auxiliary Load 410, if desired, as shown in FIG. 5.

As with modules 108A and 108B, the outputs out1 and out2 of energy source 202 can be connected to input terminals in1 and in2 of energy buffer 204. The outputs out1 and out2 of energy buffer 204 can be connected respectively to the inputs in1 and in3 of converter 308.

Referring again to FIG. 6B, coupling inductor $L_C$ can be connected between input In3 and Node 1. The output of coupling inductor $L_C$ can be connected through input In2 of converter 308 to port 5 of module 108C and to optional Auxiliary Load 410 as shown in FIG. 5. It is assumed that Auxiliary Load 410 has an input capacitor, so converter 308 can regulate and stabilize the required constant voltage on the load regulating the voltage on and current through coupling inductor LC.

The control switching signals for semiconductor switches S3, S4, S5, S6 may be generated in different ways depending on the flexibility and requirements of the adopted control technique in the LCD 114 and the MCD 112.

Energy source 202 can supply the corresponding part of power needed by the load of system 100, Auxiliary Load 408 and/or Auxiliary Load 410, if connected. Power flow between energy source 202, Auxiliary Load 1, and Auxiliary Load 2 can be adjusted as desired. Examples of auxiliary loads can be, for example, an on-board electrical network of an electric vehicle, an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

The LCD 114 for module 180C is shown in FIG. 5. It can be connected to module 108B via a set of diagnostics, measurement, protection and control signal lines, and can perform at least one of, preferably all of, four major functions. The first function can be management of energy source 202. The second function can be management of Auxiliary Load 410. The third function can be protection of energy buffer 204 and more specifically its components from overcurrent, over-voltage and high temperature. The fourth function can be control and protection of converter 308.

In some example embodiments, the function of management of energy source 202 for module 108C can be as follows. LCD 114 accepts the measurement signals VES1, TES1, IES1, which are: VES1—the voltages of all elementary components/cells of energy source 202 or the voltages of groups of elementary components/cells, such as, for example, but not limited to, battery cells, individual or connected in series and/or in parallel, ultra-capacitor cells, individual, or connected in series and/or in parallel; TES1—the temperatures of all elementary components of Energy Source 1 or the temperatures of groups of elementary components; IES1—the output current of Energy Source 1. Based on these measurement signals LCD 114 can perform the following: calculates a real capacity, actual State of Charge (SOC) and State of Health (SOH) of the elementary components or groups of elementary components; set a warning or alarm signal based on measured and calculated data; transmission of corresponding signals to MCD 112.

The function of management of Auxiliary Load 2 410 for module 108C can be as follows. LCD 114 receives the measurement signals VAL2, IAL2, which are: VAL2—the voltage between ports 5 and 6 of module 108C, and IAL2—the current in coupling inductor LC of converter 308, which is a current of Auxiliary Load 2. Based on these signals LCD 114 can perform a correction of the reference signal for pulse width modulation in the LCD to stabilize and/or to control the voltage on Auxiliary Load 410.

The function of protection of energy buffer 204 for module 108C can be as follows. LCD 114 can receive the measurement signals VEB, TEB, IEB, which are: VEB—the voltages of at least one major component of energy buffer 204, for example and not limited to, capacitor CEB, or capacitors CEB1, CEB2 (see FIGS. 8A-8C); TEB—the temperature of at least one major components of Energy Buffer; IEB—the current through at least one major components of energy buffer 204. Based on these measurement signals LCD 114 can perform the following: set a fault (e.g., warning or alarm) signal based on measured data; and/or transmit corresponding fault signals to MCD 112.

The function of control and protection of converter 308 for module 108C can be as follows. LCD 114 receives the command signals from the MCD 112, which can be a modulation reference signal and enable signal, or a reference signal and a modulation index, which can be used in a PWM and/or a Hysteresis function in the LCD to generate the control signals for semiconductor switches S1, S2, S3, S4, S5, S6 in accordance to power management and/or second order harmonic reduction techniques described above. The current feedback signals IES2, IOUT coming from integrated current sensors of converter 308 (not shown in FIG. 5) can be used for overcurrent protection together with one or more signals F, coming from driver circuits (not shown in FIG. 5), of semiconductor devices of converter 308, which carry the information about failure statuses (e.g., short circuit or open circuit failure mode) of one or more, preferably all, of the semiconductor switches. Based on this specific data, LCD 114 can make a decision on which combination of switching signals S1, S2, S3, S4, S5, S6 to be applied to the corresponding semiconductor switches to bypass or disconnect converter 308 and the entire module 108C from system 100 (e.g., the battery pack, etc.).

In other example embodiments, modules 108 can connect with additional sources of electrical power, such as photovoltaic panels and/or a wireless charging receiver. In other example embodiments, system 100 can connect to another system 100 (e.g., another battery pack) coupled with other auxiliary loads of different voltage levels, such as, e.g., an EV's on-board electrical network system and air-conditioner.

Another example embodiment of a converter module 108 is shown in FIG. 10A. The example embodiment of the module 108 includes a bidirectional power connection 110, a communication bus 116, a first energy source 202, which in this example includes twelve (12) energy storage units or cells (e.g. battery cells) 221 through 232 connected in series, a second energy source 304 (for example, an HED capacitor) with any corresponding power electronics, measurement circuitry 201 configured to measure, e.g., open circuit voltages of energy sources 202 and 304, a temperature sensor 251, a current sensor (shunt) 252, LCD 114, a measurement bus 242 communicatively coupling measurement circuitry 201 with LCD 114, a second energy source connection 244, memory 256 (e.g., capable of storing control and adaptive algorithm/software), a memory bus 243 communicatively coupling memory 256 with LCD 114, power converter circuitry 206 or 308, and a control bus 245 communicatively coupling LCD 105 with power converter circuitry 206, 308. The components depicted here can be interconnected in various different configurations to achieve the desired functionality.

By way of example only, and one embodiment primary energy source 202 can be a lithium ion battery, e.g., the NMC/Graphite type, and can exhibit a nominal voltage of about 43 volts (V) with a low cutoff voltage of 33 V and high cut off voltage of 51 V. Similarly, in one embodiment measurement circuitry 201 can be high bandwidth circuitry. For example circuitry 201 can have a measurement sample rate capability of one millisecond (ms) or less for voltage and/or current, with a voltage resolution of one millivolt (mV) or less. Measurement circuitry 104 can have a current resolution of C/100000 or better, where C is the C-rate of the energy source 202 and/or 306. This facilitates incremental charging as well. In some embodiments, LCD 114 can have an example switching capability of one kilohertz (kHz) or faster to generate pulses with pulse length of 2 ms or shorter for charging purposes.

Figure 10B:
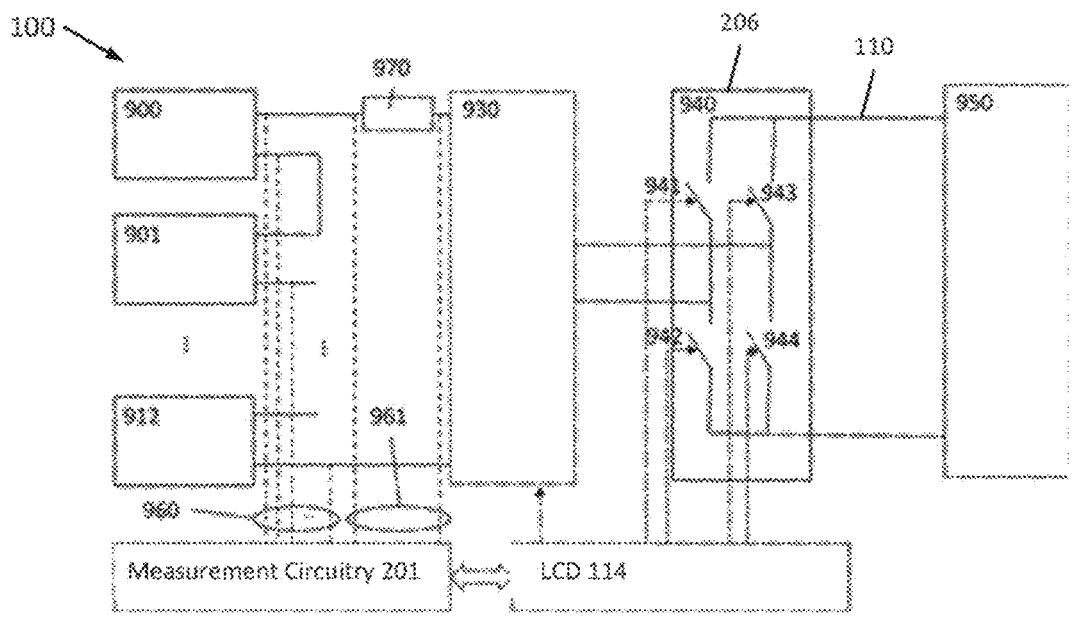
FIG. 10B is a schematic diagram depicting an additional example embodiment of a converter source module within an energy storage system coupled to a source and/or sink.

FIG. 10B illustrates another example embodiment of a module 108 within system 100. Here, module 108 includes multiple battery cells (900-912) connected in series, measurement circuitry 201, and LCD processing circuitry and memory 114. Measurement circuitry 201 can communicate measured information (current, voltage, temperature) to LCD 114. Similarly, LCD 114 can instruct measurement circuitry 201 when to take measurements and what type of measurement to collect. The example of FIG. 10B also includes a DC/DC converter 930 and a converter (e.g., switching circuitry) 206 having switches 941-944 in a half bridge configuration with switching capability in the kHz-10 kHz (and higher) range. Converter 206 can be implemented on a common substrate 940. Converter 206 can be coupled to a source/sink 950, which can be a load and/or a charging device. Measurement circuitry 201 can measure a voltage response and/or a current response of each cell before, during, or after application of a charge pulse to the cells. Measurement wiring 960 couples each battery cell to measurement circuitry 201 for, e.g., making voltage measurements of each cell. Measurement wiring 961 can carry measurement information (e.g., a current or voltage signal) to measurement circuitry 201, which in turn can communicate the measured information to LCD 114. For example, as shown here measurement wiring 961 can carry a measured current response from current shunt 970 to measurement circuitry 201, which can then be communicated to LCD 114. In some embodiments multiple shunts 970 can be placed for measuring current responses of each cell. Converter 206 can apply a voltage from power connection 110 (e.g., carrying charge from a DC or AC charge source 950) to DC-DC converter 930, which can then adjust the voltage or current to the level desired for fast charging of the cells 900-912. Converter 930 can be configured as a DC-DC converter, AC-DC converter, or other circuitry to accomplish a similar function.

Example Embodiments of Module Arrangements for Module-Based Systems

FIGS. 12A-12G depict example embodiments of system 100 arranged according to various architectures or configurations. In these embodiments system 100 is referred to as being configured as a pack, such as where the components are physically secured to each other and can be located in a common housing. These embodiments are not limited to implementations as packs. Also, for ease of illustration, the MCD and the LCDs in each embodiment are not shown. As can be seen, the modules can be arranged in numerous ways such that the power contributed by each module can be summed to form one or more of, e.g., a single phase AC output, multiple phases of AC outputs, and a DC output.

Figure 12A:
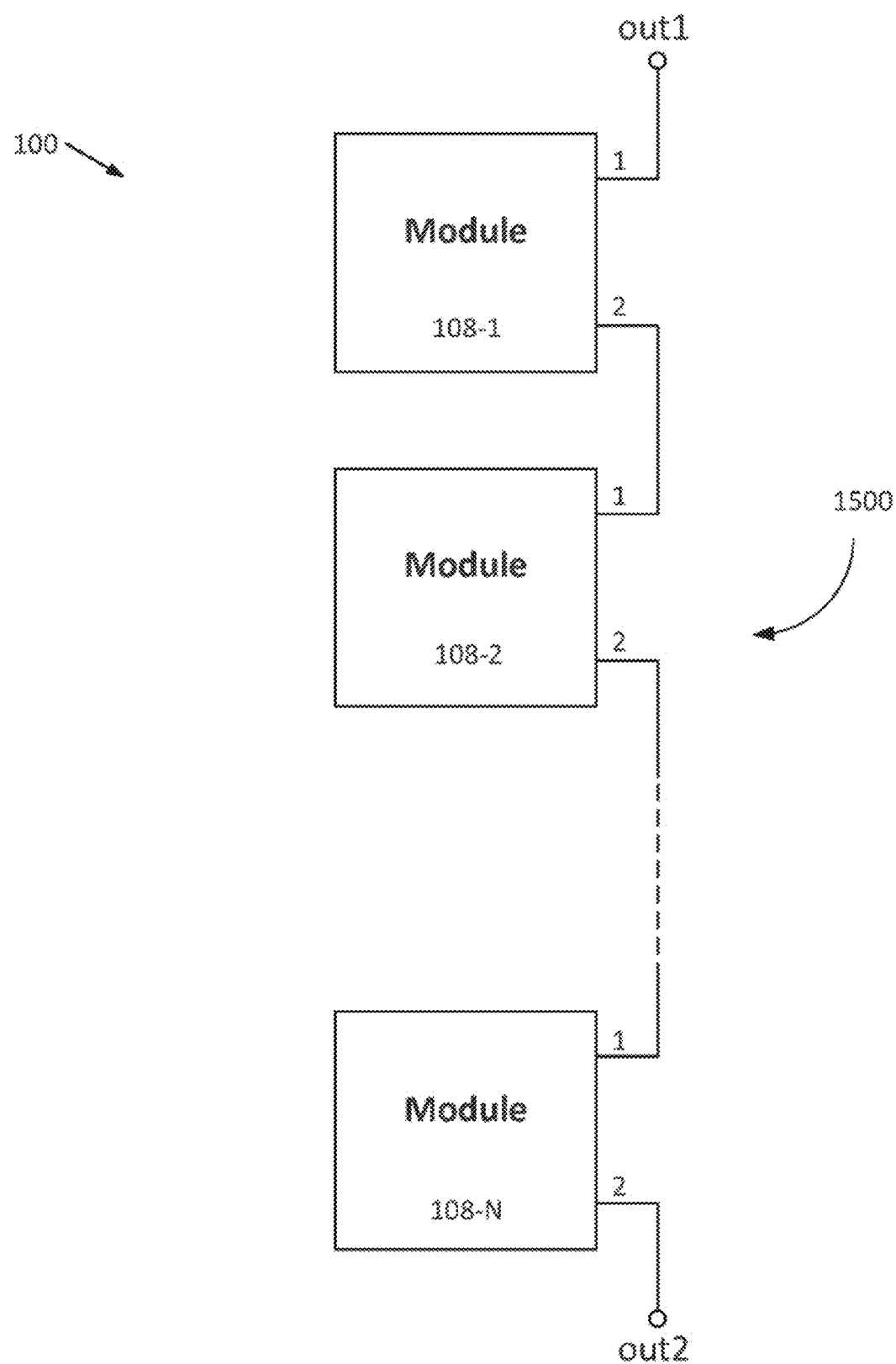

FIG. 12A shows an example embodiment of a pack 1500 including a one-dimensional array of N number of cascaded modules 108-1, 108-2 . . . 108-N according to the present disclosure. Each of the modules in the array may be configured according to any one of the module embodiments described herein. The plurality of modules may include modules configured according to the same module version (e.g., V1, V2, V3 or others) or a mixture of modules configured according to two or more module versions (e.g., V1, V2, V3, or others). A first port 1 of a module 108-1 of a first row of the one-dimensional array is connected to a first output terminal out1 of the one-dimensional array of modules. A second port 2 of the first module 108-1 is connected to a first port 1 of a module 108-2 in a second row. A second port 2 of the second module 108-2 is connected to a first port 1 of module 108-3 in a third row (not shown) and so on in the same order further down to a Nth module 108-N in an Nth or last row. A second port 2 of the Nth module 108-N is connected to a second output terminal out 2 of the one-dimensional array 1500. This one-dimensional array of N number of interconnected modules can be used as a DC or single phase AC energy source, such as, e.g., a battery pack, for stationary energy storage applications for DC or AC single-phase loads. A DC or AC single-phase load can be connected between the first and second output terminals out1 and out2.

The output voltage of the one-dimensional array of N number of modules 108 can be generated using, for example, but not limited to, space vector modulation or sine pulse width modulation ("PWM") with a Phase Shifted Carrier technique. The switching signals for each of the modules' Converter may then be generated using Phase Shifted Carrier technique. This technique ensures that the modules are continuously rotated and the power is almost equally distributed among them.

An aspect of a phase shifted technique is to generate a multilevel output PWM waveform using incrementally shifted two-level waveforms. Therefore an N-level PWM waveform is created by the summation of N−1 two-level PWM waveforms. These two-level waveforms are generated by comparing the reference waveform to triangular carriers 1400, 1410 (FIGS. 11C, 11D) that are incrementally shifted by 360°/(N−1). A 9-level example 1400 is shown in FIG. 11C. The carriers are incrementally shifted by 360°/(9−1)=45° and compared to the reference waveform. The resulted two-level PWM waveforms 1420 are shown in FIG. 11E. These two-level waveforms may be used as the switching signals for semiconductor switches of the Converters in each module 108. As an example, for a one-dimensional array including four interconnected modules, each having a converter 206, the 0° signal is used for S3 and 180° signal for S6 of the first module, the 45° signal is used for S3 and 225° signal for S6 of the second module, and so on. Note that in all converters 206, the signal for S3 is complementary to S4 and the signal for S5 is complementary to S6 along with certain dead-time to avoid shoot through of each leg. FIG. 11F depicts an example AC waveform 1430 produced by superposition of output voltages from the four modules 108.

This one-dimensional array 1500 embodiment of system 100 shown in FIG. 12A enables obtaining a high voltage of any shape with very low total harmonic distortion between first and second terminals out 1 and out 2 using low and/or medium voltage rated energy source elements and switching components (MOSFETs, JFETs, IGBTS, etc.) with significantly reduced switching and conduction losses in the modules.

FIG. 12B shows another example embodiment of a pack including a two-dimensional array 1600 or two one-dimensional arrays 1500 of N number of cascaded modules 108-1, 108-2 . . . 108-N according to the present disclosure. An aspect of configuration and output of DC or AC voltage generation of each of the two one-dimensional arrays 1500, which form this two-dimensional array 1600, is described above with regard to FIG. 12A. A second port 2 of each of an Nth module in Nth or last rows of both of the one-dimensional arrays are connected together and to a common output terminal Out3 of the two-dimensional array. Output voltages are provided between first and second output terminals Out1 and Out2 and the common output terminal Out3.

This two-dimensional array of 2N number of modules 108 can be used as a two-phase AC energy source for stationary energy storage applications for DC or AC single-phase loads. The load can be connected between first and second output terminals Out1 and Out2, while the common terminal Out3 can be connected to a neutral of the load, if required.

The first and second output terminals out1 and out2 of the example two-dimensional array based pack can be connected together via coupling inductors and connected to the same first terminal of an AC or DC load, when the common output terminal out3 is connected to the second terminal of the AC or DC load. In this case the output power capability of such two-dimensional array based pack with N rows is two times higher than one of the single-dimensional array based pack with the same number N of rows.

This two-dimensional array embodiment of system 100 shown in FIG. 12B, enables obtaining a two phase system of high voltages with 90 degree phase displacement. For example, such systems can be used in electrical furnaces. In general, the high voltages of any shape with very low total harmonic distortion can be obtained between terminals out1, out2 and common terminal out3, which can serve as a Neutral, using low and/or medium voltage rated energy source elements and switching components (MOSFETs, JFETs, IGBTS, etc.) with significantly reduced switching and conduction losses in the modules.

FIG. 12C shows another example embodiment of a pack including a two-dimensional array 1700 or two one-dimensional arrays of N and N+1 numbers of cascaded modules 108-1, 108-2 . . . 108-N according to the present disclosure. An aspect of configuration and output of DC or AC voltage generation of each of the two one-dimensional arrays 1500 with N and N+1 numbers of cascaded modules, which form this two-dimensional array, is described above with regard to FIG. 12A. A second port 2 of each of an Nth module in Nth or last rows of both of the one-dimensional arrays are connected to first and second ports 1 and 2 of an additional or N+1th module.

This two-dimensional array of 2N+1 number of cascaded modules can be used as a single-phase AC energy source for stationary energy storage applications for DC or AC single-phase loads. The load can be connected between first and second output terminals Out1 and Out2 of a first module in a first row of each of the one-dimensional arrays.

Figure 12D:
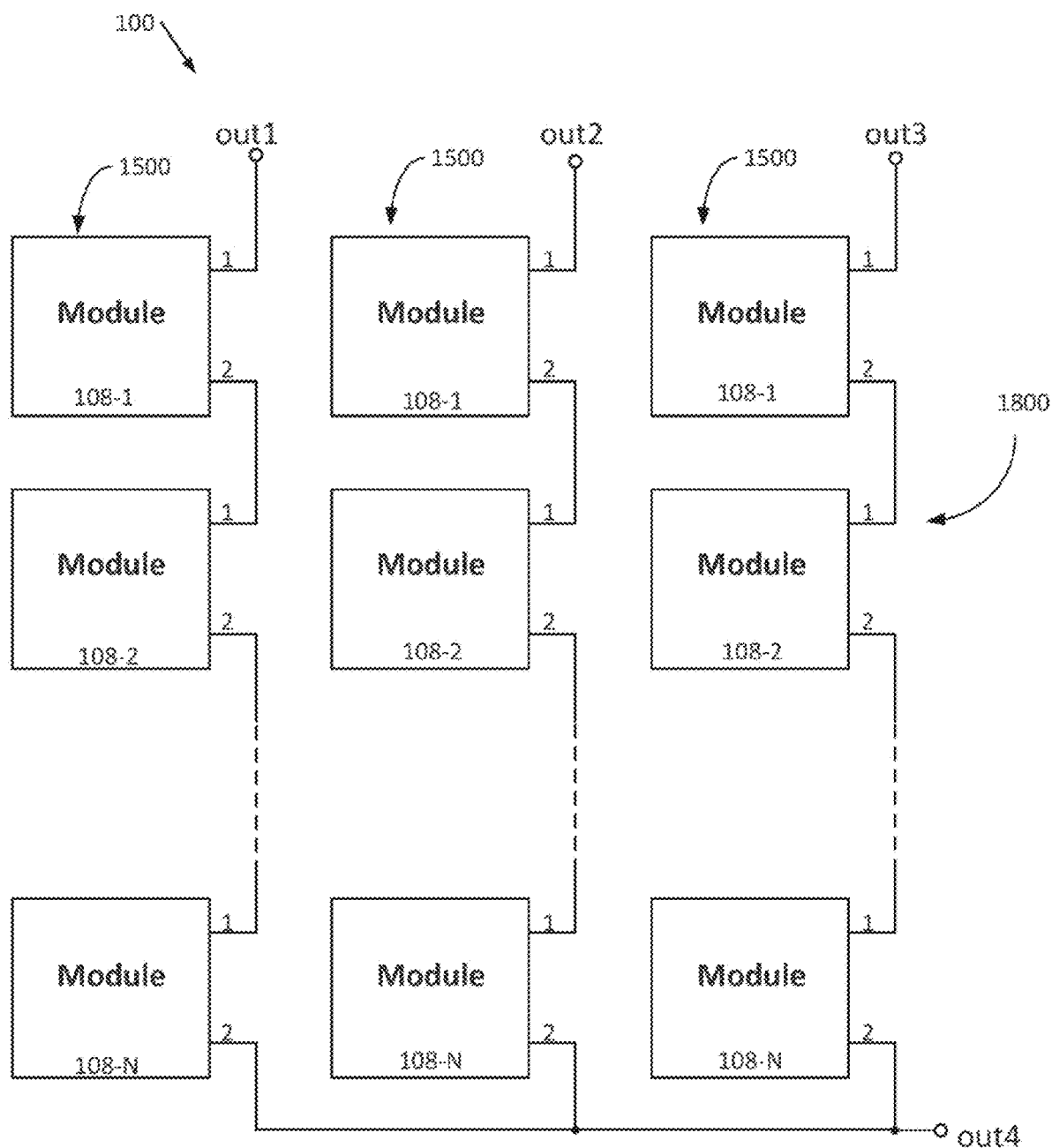

FIG. 12D shows another example embodiment of a pack including a plurality of modules 108-1, 108-2 . . . 108-N, cascaded in a three-dimensional array 1800, according to the present disclosure. First, second and third output terminals out1, out2 and out3 of the pack are connected to a first port 1 of a first module of a first row of each of the three one-dimensional arrays 1500, which form this three-dimensional array 1800 based pack. An aspect of configuration and output of DC or AC voltage generation of each of the three one-dimensional arrays 1500, which form this three-dimensional array 1800 based pack, is described above with regard to FIG. 12A. A second port 2 of an Nth module in an Nth or last row of each of the three one-dimensional arrays are connected together and to a common output terminal out 4 of the three-dimensional array. The output voltages are provided between the first, second and third output terminals out1, out2, out3 and the common output terminal out 4.

This three-dimensional array 1800 of 3N cascaded modules 108-1, 108-2 . . . 108-N can be used as a three-phase AC energy source for stationary energy storage or electric vehicle applications for DC or AC single load, three-phase loads, three phase power grids or three-phase electric motors. The three-phase load can be connected between the first, second and third output terminals out1, out2, out3, while the common output terminal out4 can be connected to a neutral of the load, if required.

The first, second and third output terminals out1, out2 and out3 of the three-dimensional array based pack can be connected together via coupling inductors and connected to the same first terminal of a DC or single-phase AC load, when the common output terminal out4 is connected to the second terminal of the DC or single phase AC load. In this case, the output power capability of such three-dimensional array based pack with N rows is three times higher than the one single-dimensional array based pack with the same number N of rows.

This three-dimensional array 1900 embodiment of system 100 shown in FIG. 12E provides a three-phase system of high voltages of any shape with very low total harmonic distortion between terminals out1, out2, out3 and common terminal out3 which can serve as a Neutral, using low and/or medium voltage rated energy source elements and switching components (MOSFETs, JFETs, IGBTS, etc.) with significantly reduced switching and conduction losses in the modules. Such a system can be connected to the power distribution grid and can be used as an active power source or buffer, reactive power compensator and power factor corrector, active harmonic filter with very high dynamic response and significantly reduced size of passive filter between out1, out2, out3 and the phases of power grid. This system can also be connected to three-phase load providing the energy from energy source elements such as batteries, HED capacitors, fuel-cells, etc.

FIG. 12E shows another example embodiment of a pack including a plurality of modules 108 cascaded in a three-dimensional array 1900 according to the present disclosure. A first port 1 of a module 108-1 of a first row of each of the three one-dimensional arrays 1500 are connected to first, second and third output terminals out1, out2 and out3 of each of the three one-dimensional arrays, which form this three-dimensional array based pack. An aspect of configuration and output DC or AC voltage generation of each of the three one-dimensional arrays with N number of cascaded modules 108, which form this three-dimensional array, is described above with regard to FIG. 12A. A second port 2 of the first modules 108-1 are connected to first ports 1 of modules 108-2 in second rows of the three one-dimensional arrays. Second ports 2 of the second modules are connected to first ports 1 of modules in third rows (not shown) of the three one-dimensional arrays and so on in the same order further down for M number of rows of modules, where M is 2 or greater.

First ports 1 of modules of M+1th rows are connected to second ports 2 of modules of Mth rows (not shown). Second ports 2 of modules in the M+1th rows are connected to first ports 1 of modules in M+2th rows (not shown). Second output ports 2 of modules in the M+2th rows are connected to first ports 1 of modules in M+3th rows (not shown) and so on in the same order further down for M+N number of rows of modules.

A second port 2 of a module in a last row or M+Nth row of a first column 1500 of the three-dimensional array is connected to the first port 1 of the module of the M+1 row of a second column 1500' of the three-dimensional array. A second port 2 of a module in a last row or M+Nth row of the second column of the three-dimensional array is connected to the first port 1 of the module of the M+1 row of a third column 1500" of the three-dimensional array. A second port 2 of a module in a last row or M+Nth row of the third column of three-dimensional array is connected to the first port 1 of a module of a M+1 row of the first column of the three-dimensional array.

This three-dimensional array of cascaded modules can be used as a three-phase energy source for stationary energy storage or electric vehicle applications for DC or AC single load, three-phase loads, three phase power grids or three-phase electric motors.

In addition to the advantages mentioned with regard to FIG. 12D, this three-phase (three-dimensional array) configured embodiment of system 100 shown in FIG. 12E, with a combination of series connected and delta connected modules, enables an effective exchange of energy between all modules of the system (inter-phase balancing) and phases of power grid or load. A combination of delta and series connected modules allow reducing the total number of modules in array to obtain the desired output voltages.

FIG. 12F shows another example embodiment of a pack including a plurality of modules, cascaded in a three-dimensional array 2000 according to the present disclosure. First, second and third output terminals out1, out2 and out3 of the pack are connected to first ports 1 of modules 108-1 of first rows of the three one-dimensional arrays 1500, which form this three-dimensional array 2000 based pack. A aspect of configuration and output DC or AC voltage generation of each of the three one-dimensional arrays with N number of interconnected modules 108-1, 108-2 . . . 108-N, which form this three-dimensional array, is described above with regard to FIG. 12A. A second port 2 of a module of an Nth row of a first column of the three-dimensional array is connected to a first port 1 of a first additional module 108C of an N+1th row. A second port 2 of a module of an Nth row of a second column of the three-dimensional array is connected to a second port 2 of the first additional module 108C of the N+1th row. A second port 2 of a module of an Nth row of a third column of the three-dimensional array is connected to a first port 1 of a second additional module 108C of an N+1th row. A second port 2 of the second additional module is connected to a fourth output terminal Out4 of the pack. Third and fourth ports 3 and 4 of the first and second additional modules of the N+1th rows are interconnected as shown in FIG. 12F.

This three-dimensional array of cascaded modules can be used as a three-phase energy source for stationary energy storage or electric vehicle applications for DC or AC single load, three-phase loads, three phase power grids or three-phase electric motors. The three-phase load can be connected between the first, second and third output terminals out1, out 2 and out 3, while the fourth output terminal out 4 can serve as one a charging terminal.

In addition to the advantages mentioned with regard to FIG. 12D, this three-phase (three-dimensional array) configured embodiment of system 100 shown in FIG. 12F, with two additional interconnection modules 108C, enables an effective and fast exchange of energy between all modules of the system (inter-phase balancing) and phases of power grid or load.

Figure 12G:
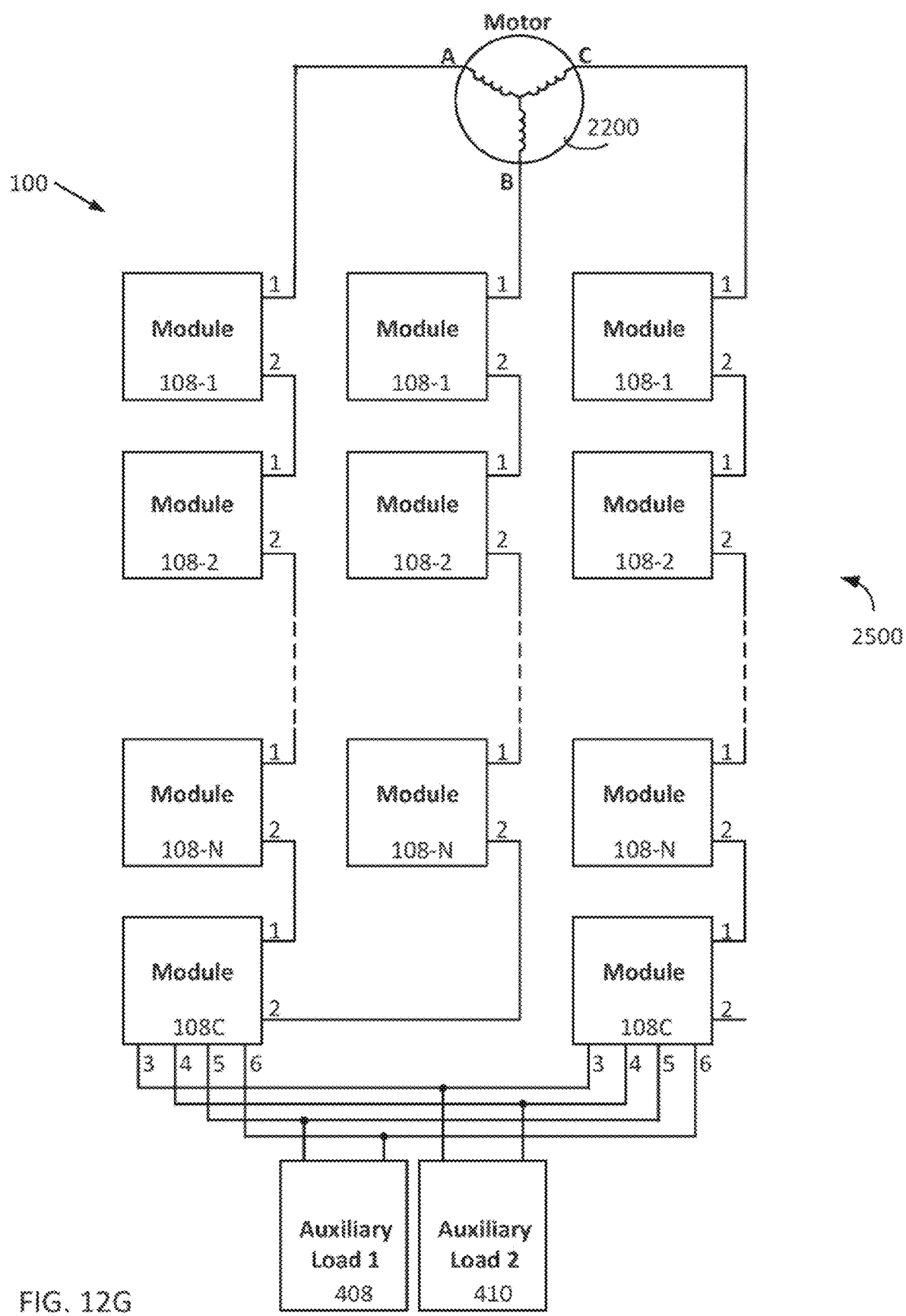

FIG. 12G shows another example embodiment 2500 of a pack connected to a three-phase electrical motor 2200 of any type. The pack is as presented in FIG. 12F with the third and fourth output ports 3 and 4 of the two additional modules 108-C of the N+1th rows connected together and to a second Auxiliary Load 410. The two additional modules of the N+1th rows further include fifth and sixth output ports 5 and 6 connected together and to a first Auxiliary Load 408. The first Auxiliary Load and second Auxiliary Load 410 have different voltages and represent, for example, but not limited to, electric vehicle's onboard network system and air-conditioner power supply system, respectively.

In addition to the advantages mentioned, this three-phase motor drive embodiment of system 100 (three-dimensional array) shown in FIG. 12G, with two additional interconnection modules 108C, enables an effective and fast exchange of energy between all modules of the system (inter-phase balancing) and phases electric motor. The additional output terminals 3, 4, 5, 6 of interconnection modules 108C provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of modules 108.

Figure 12H:
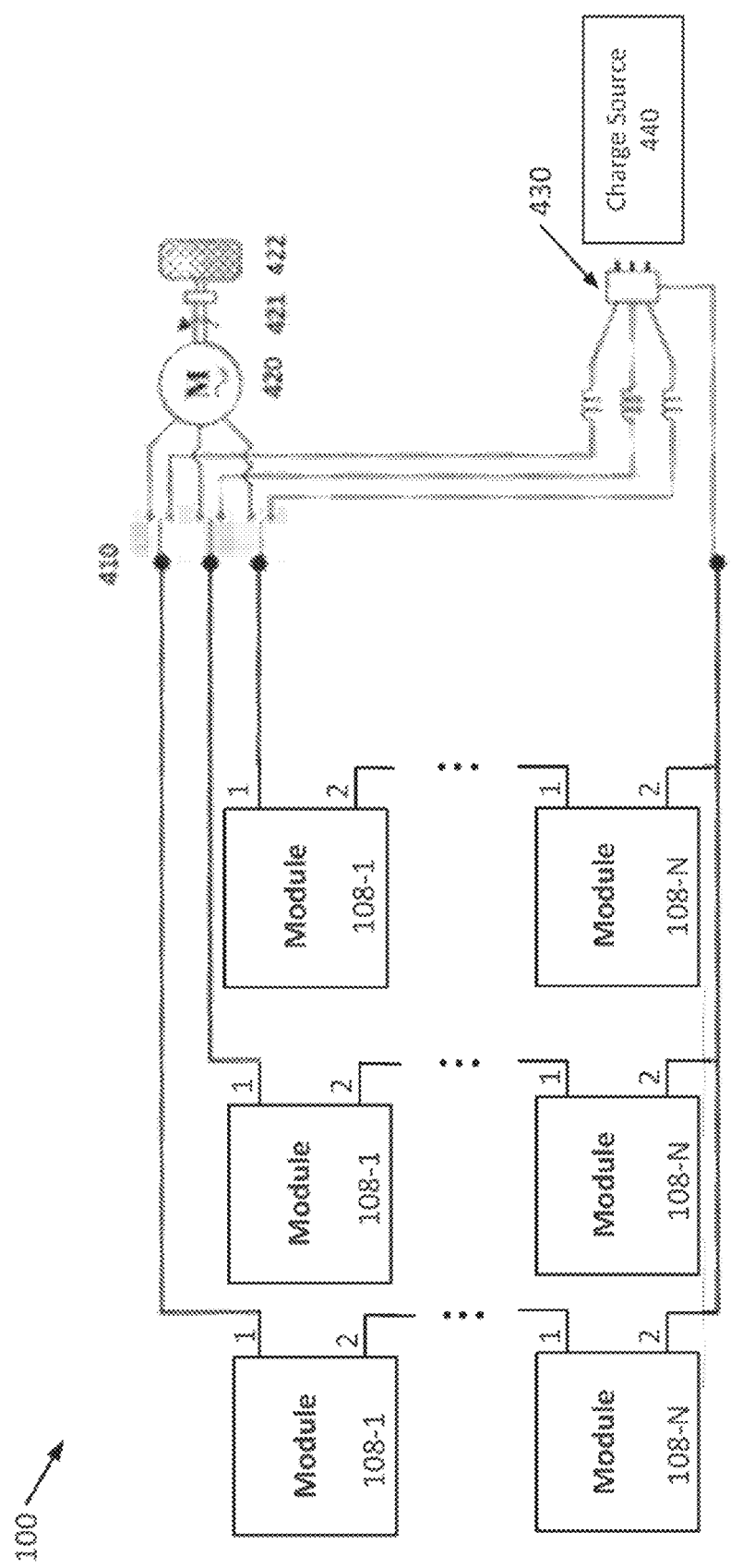

FIG. 12H illustrates an example embodiment of system 100 configured to couple with and supply power to a three-phase motor 420 and also switch to alternatively couple with a charge source 440 (not shown) by way of controllable switches 410 and, if desired, a charge connection 430 (e.g., a plug). A bus system for module communication is not shown in FIG. 12H.

The example modular system 100 includes N cascaded modules 108 arranged in three arrays to supply three phase power to motor 420, which in turn is coupled to a wheel 422 of an electric vehicle by way of a mechanical connection 421. Switches 410 can enter a first position that electrically connects the modules 108 to motor 420. Switches 410 can enter a second position that electrically disconnects the modules 108 from motor 420 and instead electrically connects modules 108 to charge source 440 by way of connection 430. In this second position modules 108 can receive energy from charge source 440, which can be a DC charger, single phase AC charger, or multi-phase AC charger. The configuration shown here, with switches 410 interposed between modules 108 and the charge sink (e.g., motor 420) and source 440 can be applied to any of the system configurations described herein (e.g., the systems described with respect to FIGS. 12A-12G).

In embodiments, an example modular energy topology may couple to multiple sinks and multiple sources. In embodiments, an example modular energy topology may connect to multiple (e.g., two) motors to power a vehicle (e.g., a four-wheel vehicle) and be connectable to DC and/or AC sources for charging of the modules. In yet another embodiment, an example modular energy topology may connect to multiple (e.g., four or more) motors to power a flying vehicle. In yet another embodiment, an example modular energy topology may connect to multiple housing (e.g., residential) loads connected as sinks and solar or wind energy generators as sources. In such embodiments, the system may be used for residential energy storage. In yet other embodiments, a connected grid may serve as sink as well as a source (e.g., for grid stabilization purposes).

Example Embodiments Related to Layouts and Housings

Figure 13A:
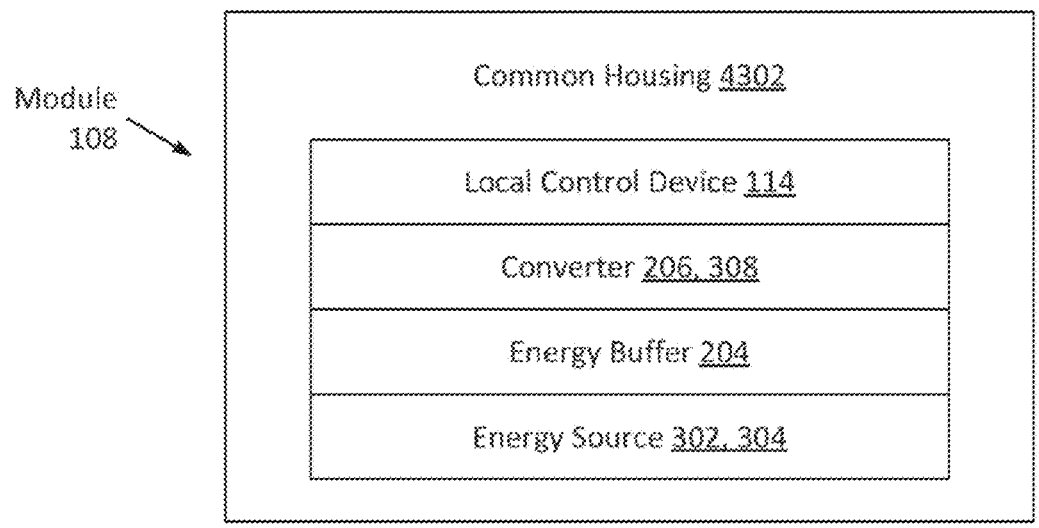
FIGS. 13A-13C are block diagrams depicting example housing configurations for a converter module.

In many of the embodiments herein, module 108 is shown or described as being separate from LCD 114. However, in any and all embodiments described herein, module 108 can be configured such that LCD 114 is a component thereof. For example, FIG. 13A is a block diagram depicting an example embodiment of a module 108. In this embodiment, module 108 has a common housing or physical encasement 4302 that holds LCD 114 for module 108, as well as converter 206, 308, energy buffer 204 and energy source 202 (and optionally energy source 304 if present). Thus, in this embodiment module 108 is provided or manufactured as an integrated or unitary device or sub-system.

Figure 13B:
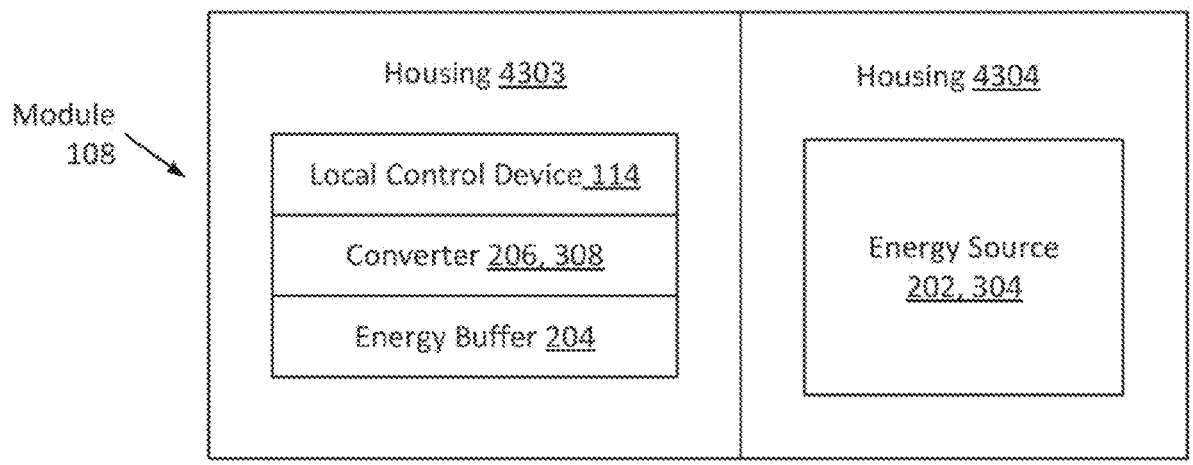

FIG. 13B is a block diagram depicting another example embodiment of module 108. In this embodiment, module 108 has a housing or physical encasement 4303 that holds LCD 114 for module 108, as well as converter 206, 308, and energy buffer 204. Energy source 202 (and optionally energy source 304 if present) is provided in a separate housing 4304. Housings 4303 and 4304 can be physically joined, secured, or connected together prior to installation in system 100, or can be separate entities electrically connected together. Housings 4303, 4304 can have ports or other access to accommodate electrical connections between the various devices 114, 206, 308, 202, etc.

Figure 13C:
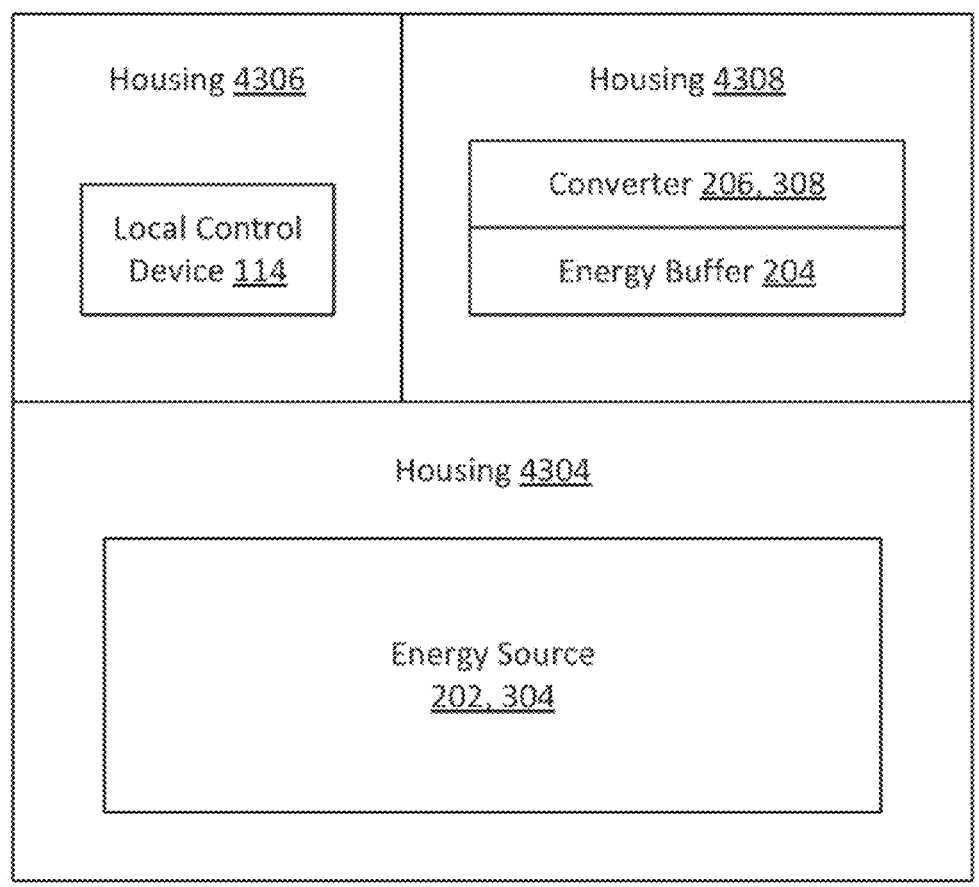

FIG. 13C is a block diagram depicting another example embodiment of module 108. In this embodiment, module 108 has a first housing or physical encasement 4306 that holds LCD 114 for module 108 and a second housing or physical encasement 4308 that holds converter 206, 308, and energy buffer 204. Energy source 202 (and optionally energy source 304 if present) is provided in a separate housing 4304. Housings 4306, 4308, and 4304 can be physically joined, secured, or connected together prior to installation in system 100, or can be separate entities electrically connected together. All of the housings 4306, 4308, and 4304 can have ports or other access to accommodate electrical connections between the various devices 114, 206, 308, 202, etc.

Figure 14A:
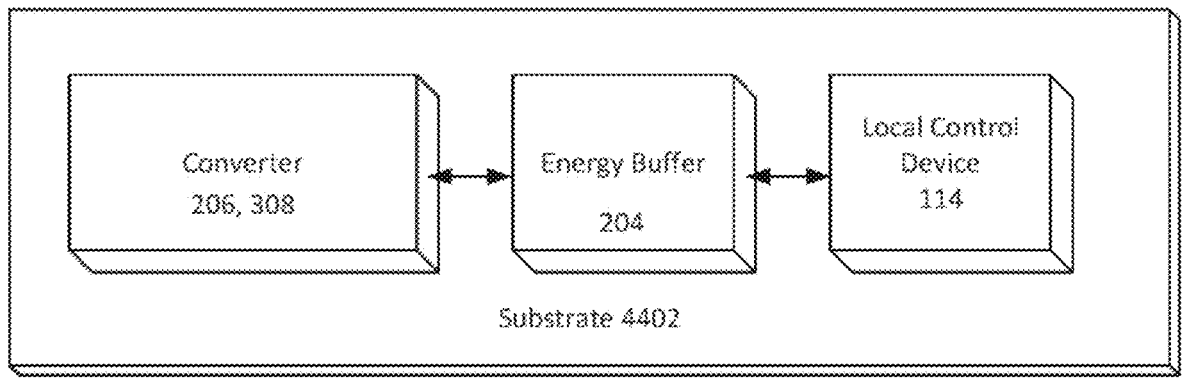
FIGS. 14A-14B are block diagrams depicting example embodiments of substrate layouts for a converter module.

In any and all embodiments described herein, the various circuitry components can be integrated on or more substrates to reduce the form factor. For example, the LCD can be part of a module 108 as described with respect to FIGS. 13A-13C. FIG. 14A is a schematic view depicting an example embodiment where LCD 114, converter 206, 308, and energy buffer 204 are each mounted or secured to a single common substrate 4402, which can be a single printed circuit board (PCB). These components can be electrically coupled with substrate 4402 and each other to permit the exchanging of signals or data therebetween. Other passive or active componentry can likewise be mounted or secured to substrate 4402.

Figure 14B:
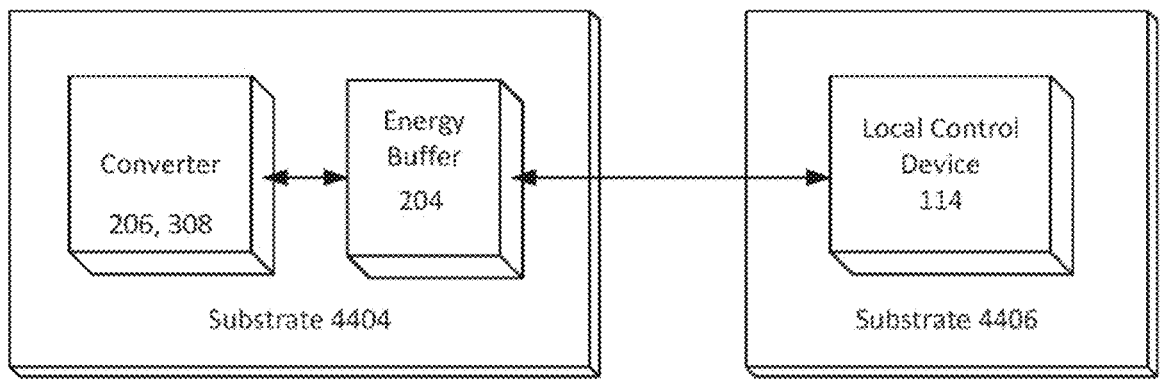

FIG. 14B is a schematic view depicting an example embodiment where converter 206, 308 and energy buffer 204 are each mounted or secured to a single common substrate 4404, which can be a single printed circuit board (PCB). These components can be electrically coupled with substrate 4404 and each other to permit the exchanging of signals or data therebetween. LCD 114 is mounted or secured to a different substrate 4406, which can also be a single PCB. Other passive or active componentry can likewise be mounted or secured to substrates 4404 and 4406. Communication between LCD 114 and the components on substrate 4404 can occur over one or more buses, wires, or fiber optics.

System 100 can operate across a wide range of frequencies as may be required in various stationary and mobile applications. For example, the system AC output frequency in stationary applications will often be 60 Hz. In an embodiment where a MOSFET is used for each switch in converter 206, 308 (FIGS. 6A-6B), the switching frequency of each MOSFET (Fsw) can be in a range of 1 Khz-2 kHz, or more. In an example where there are 8 modules in each phase array, then the resulting frequency of pulsations in the AC output voltage will be 2Fsw*N=16 kHz-32 kHz, or more. The switching frequency of conventional systems, like IGBT based high power inverters, is often less 5 kHz. In mobile applications the system frequency will depend on the needs of the motor(s), which commonly range from 0 Hz to 2000 Hz, or more, for a sinusoidal output waveform. In an example embodiment where Fsw of the switches of circuitry 207 is 5 Khz, then the switching frequency of an example system 100 (equivalent output pulsations) with five modules in series would be 2*5 kHz*5=50 kHz. This is compared to a conventional power inverter that has a switching frequency is less than 20 kHz. In embodiments where converter 206, 308 includes gallium nitride (GaN) switches, then the frequency of operation can be higher than that of MOSFETs or IGBTs. These examples merely illustrate the enhanced performance of system 100 over conventional systems, and are in no way intended to be limiting.

Example Embodiments Related to Pulse Charging

Provided herein are embodiments related to pulsed charging, sometimes referred to as fast charging, of system 100. These embodiments will be described primarily in the context of charging of electrochemical batteries, with respect to a module 108 having at least one energy source 202 in the form of a battery (having one or more cells). The battery can have any desired electrochemistry (e.g., lithium ion, lead acid, alkaline, nickel metal hydride, and others). The embodiments, however, can also benefit high energy density capacitors and fuel cells, as well as combinations of one or more batteries, one or more HED capacitors, and one or more fuel cells. Thus, the embodiments described herein can be used with all of the aforementioned energy sources.

The cascaded topology of system 100 permits the charge voltage or charge current from a charge source to be divided amongst the energy sources 202, 304 of modules 108 as needed to implement charging schemes of varying complexity. For example, voltage (or current) can be applied in a pulsed manner where some sources are charged at certain times and others are not generally provided the total voltage applied to the energy sources (and other charge sinks of the system) is equal to the DC or AC voltage supplied to the system by the charge source at that moment in time. The voltage and duration of the pulse applied (as well as the duration of the rest time between pulses) can be varied and timed based on the state of those sources as monitored by the module (e.g., measurement circuitry 201 and LCD 114). Thus the division of voltages between modules allows both charging of the sources of the modules as needed and resting of the sources of the modules as needed.

Application of the charge pulse to each source of a module is accomplished by the switch circuitry of converter 206, 308 under the control of control circuitry 102. Thus for an energy source 202 in the form of a battery having multiple cells, the charge pulse from converter 206, 308 will be applied to all cells in many embodiments.

Figure 15A:
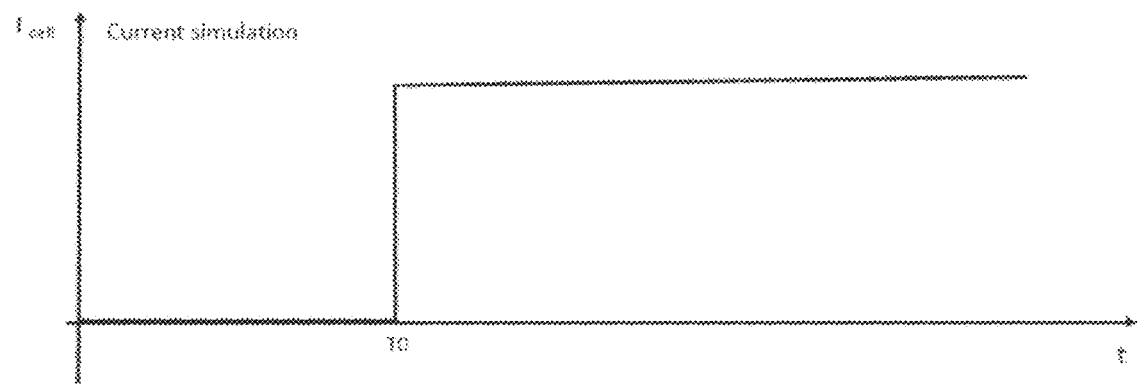
FIGS. 15A and 15B are graphs depicting a stimulation signal and response signal, respectively.
Figure 15B:
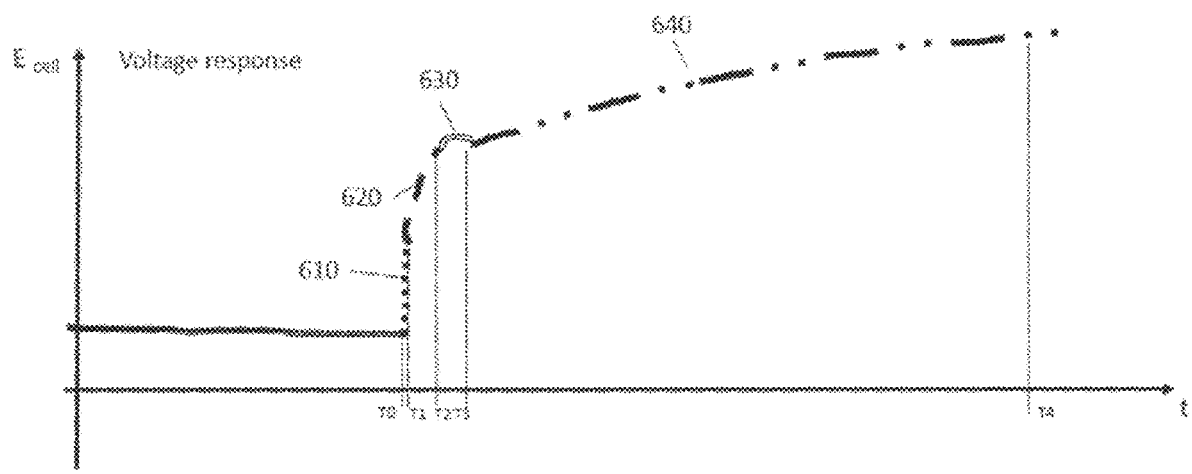

FIG. 15A illustrates a current stimulation pulse that can be applied as a high bandwidth stimulation signal. FIG. 15B illustrates a time response of an electrochemical system during application of the high bandwidth stimulation signal of FIG. 15A. In FIG. 15A, the stimulation is a current step function and in FIG. 15B, the voltage signal carries the response of the system with different relaxation regimes. In a reverse case where the stimulation signal is a voltage signal, then the current signal will exhibit the system response.

Referring to FIG. 15B, different relaxation mechanisms occur on an electrochemical active interface. Typically responses can be distinguished because they are defined by four different relaxation mechanisms. The relaxation of electrons happens in atto-seconds to sub femto-seconds, the relaxation of ions typical has a time constant in milliseconds, the diffusion relaxation of species in the electrolyte occurs in seconds to hours, and the diffusion relaxation in the active material ranges from minutes to hours. The different system responses and stimulation signals shown in FIG. 15B are 610: Response A (Relaxation of electrons in atto-seconds to femto-seconds); 620: Response B (Relaxation of ions in milliseconds to sub seconds); 630: Response C (Activation of electrochemical ion transfer of electrons and or ions in the electrode material); 640: Response D (Diffusion in solid and/or liquid ion conduction material in seconds to hours); 650: High bandwidth current step stimulation. Table 1 below summarizes the Responses referred to herein.

TABLE 1

| Response Label | Relaxation Mechanism |
| --- | --- |
| Response A | Electrons |
| Response B | Ions |
| Response C | Electrochemical Ion Transfer of Electrons or Ions in Electrode Material |
| Response D | Diffusion in Solid And/Or Liquid Ion Conduction Material |

Figure 16:
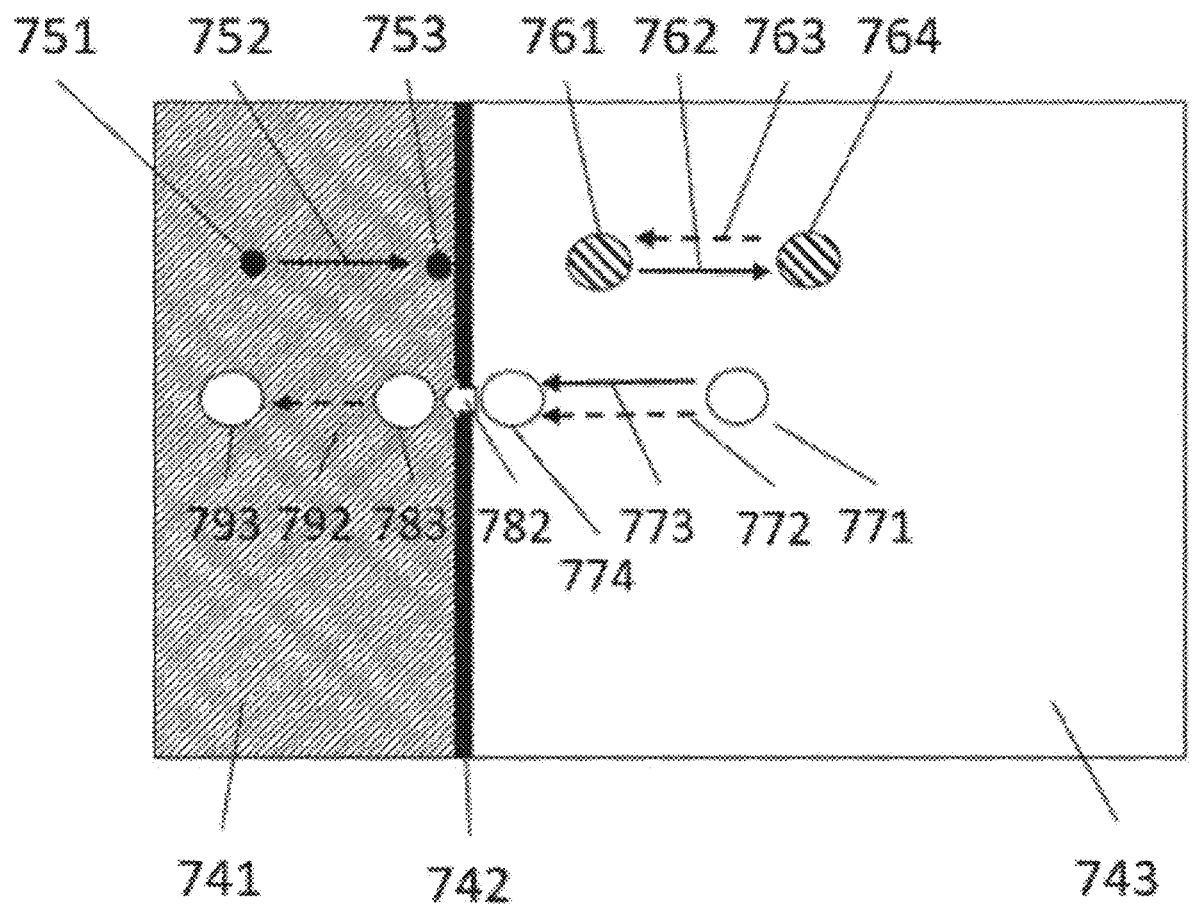
FIG. 16 is a schematic depicting relaxation and diffusion mechanisms occurring at an electrochemical interface during high-bandwidth stimulation.

FIG. 16 illustrates schematically typical relaxation/diffusion mechanisms occurring at an electrochemical interface during a high-bandwidth stimulation. Referring to FIG. 16, a schematically illustrated cross-section is shown of an active electrode immersed in an electrolyte containing active electrochemical species. FIG. 16 illustrates electrochemically active electrode 741 where the applied high bandwidth stimulation signal is negative polarized to a second electrode of a full cell arrangement. FIG. 16 further illustrates an electrochemical interface 742 between the electrode 741 and electrolyte 743, where the electrolyte comprises electrochemically active substances. FIG. 16 further illustrates one electron 751 located in the active material before the high bandwidth stimulation signal. Response A (752) illustrates movement of the electron 751 in a position close—in range of the Debye length—to the electrode interface surface due to the high bandwidth stimulation signal. Response A results in a new position 753 of the electron 751 closer to the electrode interface.

FIG. 16 further illustrates a negatively charged ion 761. In this example embodiment, the species is not involved in an active electrochemical reaction—before the high bandwidth signal stimulation. Response B (762) results in movement of the negative charged counter ion 761 due to the electrical field of the high bandwidth stimulation signal. Response D (763) results in movement of the counter ion 764 due to concentration gradients—diffusion (e.g., 764 illustrates a position of the counter ion due to the movement of Response B). Also shown in FIG. 16 is a positively charged ion 771 before the high bandwidth signal stimulation—in this embodiment the species is electrochemically active. Response D (772) results in movement of the active ion 771 due to concentration gradient—diffusion. Response B (773) results in movement of the active ion 771 due to the electrical field of the high bandwidth stimulation signal— migration. Also shown in FIG. 16, an active ion 774 is positioned close to the electrode interface surface. FIG. 16 further illustrates electrochemical reaction and transport 782 from the electrolyte to the active electrode of the active electrochemical species which requires an increased energy level for activation. Response D (792) results in movement of the active ion 783 due to concentration gradients in the active electrode—diffusion of active species in active electrode material, where 793 illustrates a position of the active ion after Response D.

In embodiments, charging algorithms and specifically the fast charging algorithms described herein operate autonomously on the modular level and can be integrated within each module 108. For example, referring to FIG. 10B, modules 108 are connected in a single-phase cascade arrangement and can communicate between each other and MCD 112 (if present) over a communication bus. The energy of the modules and source or sinks can be exchanged over a two-pole power bus in this embodiment.

Some or all control functions (current, voltage, temperature) as well as measurement functions (current, voltage and temperature) can be carried out on the modular level. Processing can occur directly at each module 108 with LCD 114, in which charging algorithms can be integrated or stored. Such an arrangement enables a high bandwidth data processing and feedback control loop independent of the size and complexity of the modular energy topology. Each module 108 does not need to transmit the high bandwidth data of each energy source of the module 108 back to MCD 112 over a communication bus, nor does the MCD 112 need to transmit back a high bandwidth control signal to control each energy source in a short time frame, such as the sub millisecond range (less than 1 mS). The communication bus need only transmit system information such as low bandwidth control and synchronizing signals of the operation modus of each module (e.g., modulation index, state of operation (e.g., idle, charging, discharging), etc.), which allows the bus bandwidth to remain at a low and robust level.

For example, the embodiments of FIGS. 10A and 10B each have 12 storage units for the primary storage as described herein (e.g., battery cells for the battery). The embodiments can have less than or greater than 12, which is merely an example. Only signals of 12 storage units need to be read and processed by the LCD 114 of the module 108, compared to conventional battery pack technologies where every cell of every battery module needs to be read and processed by a centralized chip or chipset. These conventional battery packs process the signals of each storage unit on the system main controller level. For example a battery pack with 216 energy storage units has a communication and processing requirement that is 12 times more demanding compared to the embodiments of system 100 described herein where, e.g., 18 modules each having 12 storage units and a discrete LCD 114 can be integrated on the modular level. It will be appreciated that the signal processing and feedback control are insensitive to scaling and is therefore not dependent on the size of the total system of the modular energy topology described in this disclosure.

The modular arrangement described herein therefore enables operation of each individual storage unit at a high bandwidth signal level to control stimulation response at a time level of sub milliseconds independent of the size of the total system. For an embodiment where electrochemical systems are used, this level of control enables operation of each individual storage unit (e.g., such as batteries or fuel cells in the regime of the Response B, C or D) with high precision in combination with control algorithms for charging as well as discharging.

Accordingly, features the present embodiments enable design as well as manufacturing of modules without the knowledge of the size and amount of energy units required on the total system level. Also, the components on the module level are simpler compared to the requirement of components of conventional systems operating on same level of bandwidth signal control on each energy storage units due to the reduced required processing speed on the module level. These features allow a simpler system design as well as reduce cost of the total system compared to conventional pack architectures.

In embodiments, current or voltage may be applied to the batteries so that only ions are moved but not yet intercalated in the material. The shape of the current response or voltage response may be used to determine when the Li ion is starting movement in the active material—e.g., cathode material or anode material. Typically charge pulse length will be on the order of a sub milliseconds (e.g., (0.1 ms)) to seconds (1000 ms or more). The current and voltage response will be sampled with 1 kHz or faster to determine when active intercalation of the Li ion in the cathode and anode begins. The beginning of the active intercalation reaction determines the end of the charge pulse which is followed by a rest phase. After the ion gradient on the electrochemical interphase is relaxed due to further intercalation and diffusion in the active material, a next pulse is applied. The rest time is determined by the relaxation of the voltages on the interface between the electrolyte and active material.

Figure 17A:
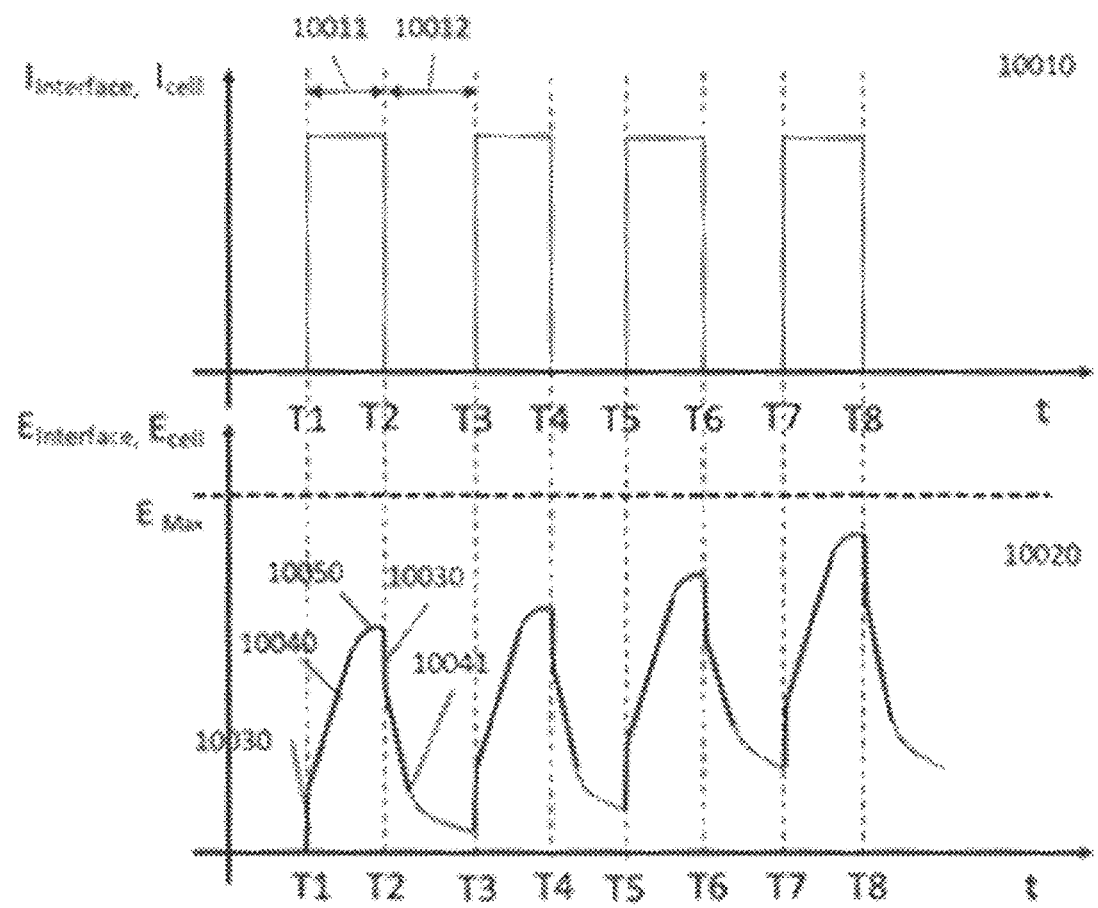
FIGS. 17A and 17B are graphs depicting stimulation and responses under different embodiments of charging regimens.

FIG. 17A depicts current and voltage signals of an example embodiment of a fast charging algorithm, which utilize certain response regimes described herein for advanced and accelerated charging. FIG. 17A illustrates important regimes for advanced and accelerated charging compared to conventional constant current charging strategies. The important operation regime occurs at the transition of Response B to Response C, during Response C, and at the transition from Response C to Response D. However, preferred operation may be in Response C when the storage related electrochemical reactions are activated as shown in FIG. 17A. In this embodiment, the current is controlled and the voltage response of each cell is used as the control feedback signal. The voltage may also be controlled and the current can be used as a control feedback signal to keep the operation end point in Response C during stimulation. The components and details of FIG. 17A are current stimulation (10010), voltage stimulation (10020), current on (10011), current off (10012), voltage Response A (10030); 10040, voltage Response B (10040), voltage Response C (10050) with switch off condition $dE2/dt2<0$ and $dE/dt<$certain threshold a, voltage Response A (10031), relaxation (10041) of ion gradients and voltages due to charge exchange on electrochemical interface with switch on condition $E<E_{max}$, $dE/dt<$certain threshold b.

FIGS. 18A and 18B illustrates current and voltage signals of an example comparison between constant current and high bandwidth stimulation drive electrochemical reaction, respectively. FIG. 18C illustrates schematically a cross section of an electrochemical electrode with the active electrochemical species at different time sequences according to constant current and high bandwidth stimulation signals.

Shown in FIG. 18A are constant current stimulation— current signal 11010), constant current stimulation—voltage signal (11015), and shown in FIG. 18B are high bandwidth charging—current signal (11020), and high bandwidth charging—voltage signal (11025).

Shown in FIG. 18C are an electrolyte (11030), an electrochemical active ion (11031), an electrochemical interface (11040), an electrochemical active electrode material (e.g., intercalation material) (11050), a non-located electron in active electrode material (11051), an electrochemical charge transfer reaction of the electrochemical active ions (11041), and an electrochemical active ion intercalated in active material with one associated electron located at the transition metal site (11052).

Conventional charging is based on constant current phase until the max voltage of the cell is reached fat a constant voltage phase. During the constant voltage phase, the cell voltage is held at the max voltage of the cell until the current reaches a lower threshold. There are also other charging strategies described in the literature where step current functions or pulsed current patterns are used. However, known strategies have in common the need to drive the electrochemical reaction on the interface directly by the applied voltage and current from the outside source. The time of applied current or voltage is longer than the Response A, Response B, and Response C and leads to uniformities of the distribution of the active species at the electrode surface in the electrolyte, as well as in the active material, in scenarios where the active electrode material is an intercalation material (as shown in FIG. 18C). Intercalation materials or materials that are reacting with the active ion species are typically used in batteries. This non-uniform distribution of the active ion species in the electrolyte and in the active electrode material is mainly caused due to the non-uniformity in local resistances of the electrolyte and local charge transfer resistivity on the electrode surface. The non-uniformity of these resistances is not avoidable due to battery design and construction. This can lead to local over-heating due to hot spots, and can lead to concentration gradients which can cause Li deposition on the anode or other parts of the batteries as well as phase transformation on the cathode. Local over-heating can lead to increased electrolyte side reaction on the electrode surface. All these effects lead to an accelerated degradation of a battery and limits the charging current and therefore the rate and speed of charging.

In the case of high bandwidth charging according to the present disclosure, the electrochemical reactions are not driven directly by the outside applied voltages or current. The electrochemical reaction is rather only activated by the applied voltages and current (as opposed to driven by them). After activation of the electrochemical reactions, the outside source is disconnected and the reaction is further driven by the concentration gradients that are built up during the Response A, Response B, and Response C. The concentration gradients are built up very uniformly over the area of the electrochemical interface almost independently from the local resistance variation of the charge transfer resistances. This mitigates the buildup of hot spots as schematically shown in FIG. 18C for high bandwidth charging applications.

The aforementioned embodiments lead to an improved concentration uniformity of the active species in the electrolyte and more importantly in the active materials, and they mitigate local overheating. This is directly related to lower degradation and less damage of the batteries during charging as well as the ability to charge the battery at higher current density for accelerate charging.

Figure 19B:
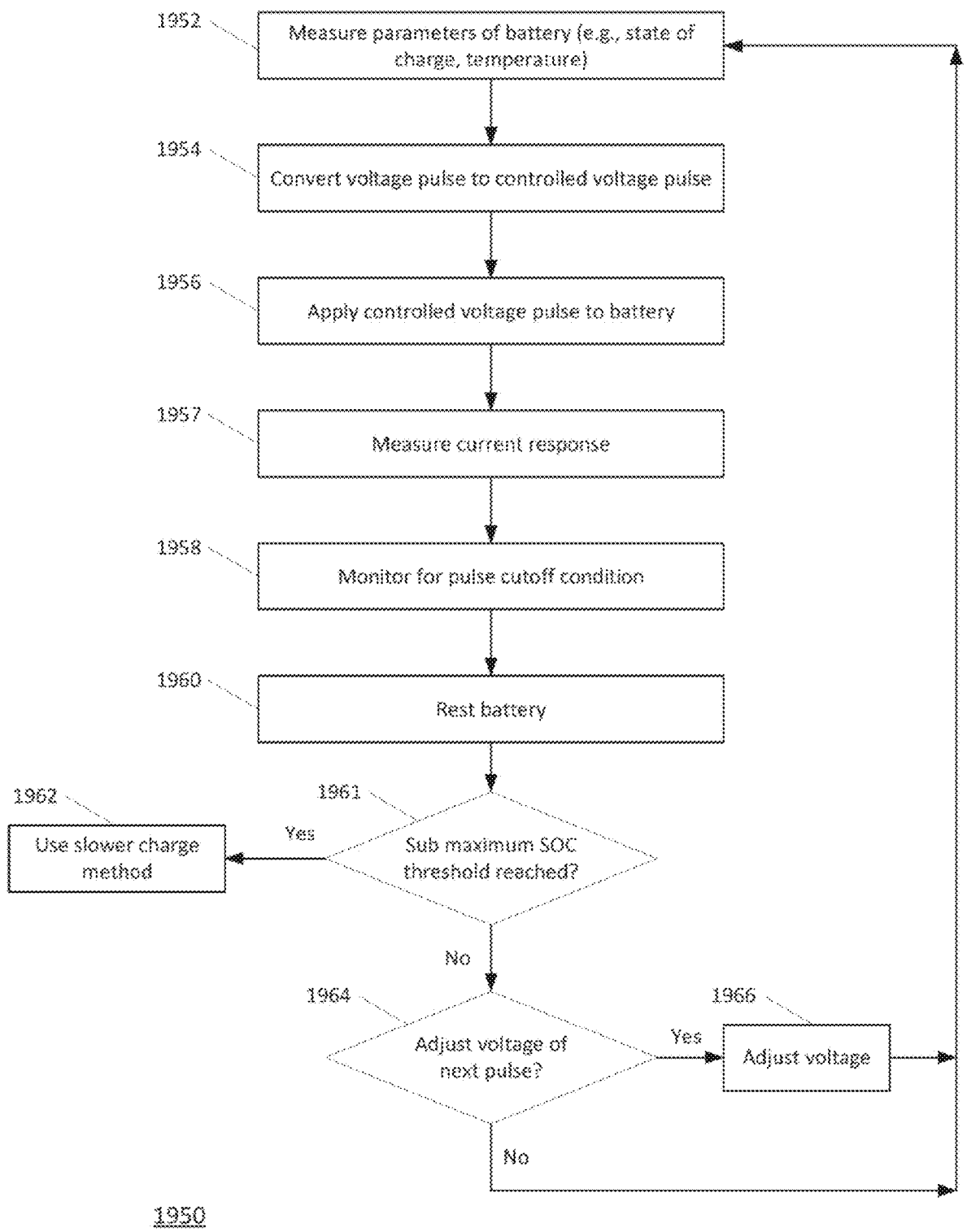

FIGS. 19A and 19B are flow diagrams depicting example embodiments of methods 1900 and 1950 of charging one or more batteries based on current controlled and voltage controlled high bandwidth stimulation, respectively. These methods can be executed by the module circuitry under the control of control circuitry 102, preferably control circuitry 102 that is local to the module (e.g., LCD 114). The threshold values will vary for each battery chemistry and type. The methods can be utilize self-learning algorithms to optimize and adapt to the threshold values during aging and usage of the battery can be integrated to the advanced charging algorithm performed on the control circuitry 102 (e.g., LCD 114). Methods 1900 and 1950 will be described as executed by an individual module 108 of system 100, although the features of the methods can also be applied at a system-wide level.

Referring first to FIG. 19A, at step 1902 one or more parameters of battery 202 of the module 108 can be measured. The one or more parameters can be measured for the battery as a whole or for each cell of the battery individually. These parameters can include, for example, a state of charge of the battery or battery cells, and also optionally a temperature of the battery or battery cells. Step 1902 may be performed during normal discharge operation of system 100 and thus may not need to be performed after system 100 is been placed in a charge state (e.g., connection and switching of system 100 to a charge source). Step 1902 can be repeated as needed throughout method 1900 to obtain the current parameter values.

If the state of charge of the battery is sufficiently low to permit the fast charging technique to be applied (e.g., below a threshold such as 60-80% of capacity), then high current pulses can be applied to charge the battery cells in a relatively fast manner. At step 1904, a divided voltage from the power connection can be converted to a controlled current pulse. For example, the switch circuitry of converter 206, 308 can supply a voltage pulse from power connection 110 to a controllable DC-DC converter (e.g., converter 930 of FIG. 10B) or other circuitry that can be controlled to produce a pulse of a desired current level. At 1906, the current controlled pulse can be applied to the battery (e.g., to all cells together if connected in series or the same pulse divided and applied to each cell individually if connected in parallel). In some embodiments, the current is regulated to ensure that the voltage applied to the battery does not exceed a maximum threshold (e.g., the rated maximum for the source), such as a voltage expected of the battery when at 100% SOC. In other embodiments, a voltage exceeding this maximum can be applied for a brief time that does not initiate or drive side reactions in the battery cells as described further herein (see, e.g., FIG. 17B).

At 1907 a voltage response on each cell in module 108 is measured (e.g., with measurement circuitry 201). At 1908 the measured response can be used to assess whether a cut off condition has been satisfied. In some embodiments the cut off condition can be satisfied if it is determined that a second derivation of the voltage response is negative and a first derivation of the voltage response is lower than a threshold. The battery or cell of the module that determines the cutoff condition can be the first such battery or cell that satisfies the cutoff condition, or can be based on a weighting algorithm. After the cut off condition is satisfied but at least one cell, then the current pulse can be terminated by the switching circuitry (e.g., converter 206, 308).

At step 1910, the battery cells can be rested with no pulse applied for a rest period. At 1911, a determination can be made whether a sub maximum SOC threshold is reached (e.g., 60-80%, or another level), and this can entail performance of another SOC measurement. The selected threshold can depend on the battery chemistry. If the threshold is reached, then at step 1912 the system can transition to another charging technique using a relatively slower method, such as using longer durations of constant lower current, to reach a full SOC level as dictated by the needs of the system (e.g., 100%). If the method continues, then at step 1914, a determination is made whether to adjust the current of the next pulse. This determination can be made based on the voltage measured during the pulse on phase, for example by assessing the difference of the predetermined maximum voltage of the cell and the voltage peak of the cell measured while applying a pulse. As the difference decreases, the current applied during each successive pulse can be reduced to assist the cell in not exceeding the predetermined maximum voltage. If no adjustment is to be made, then the method can revert to step 1902 or 1904 and repeat. If the current is to be adjusted, then this can occur at 1916, prior to reverting. Application of the next pulse can be conditioned on satisfaction of a restart condition, and/or after passage of a minimum or predetermined period of time. An example of satisfaction of a restart condition can be after determination that a second derivation of the voltage response is positive and a first derivation of the voltage response is larger than a threshold, which can be the same or different threshold.

FIG. 19B depicts method 1950, which is similar to method 1900 but performed with a voltage controlled pulse as opposed to a current controlled pulse. At step 1952 one or more parameters of battery 202 of the module 108 can be measured. The one or more parameters can be measured for the battery as a whole or for each cell of the battery individually. These parameters can include, for example, a state of charge of the battery or battery cells, and also optionally a temperature of the battery or battery cells. Step 1952 may be performed during normal discharge operation of system 100 and thus may not need to be performed after system 100 is been placed in a charge state (e.g., connection and switching of system 100 to a charge source). Step 1952 can be repeated as needed throughout method 1950 to obtain the current parameter values.

If the state of charge of the battery is sufficiently low to permit the fast charging technique to be applied (e.g., below a threshold such as 60-80% of capacity), then high voltage pulses can be applied to charge the battery cells in a relatively fast manner. At step 1954, a divided voltage from the power connection can be converted to a controlled voltage pulse. For example, the switch circuitry of converter 206, 308 can supply a voltage pulse from power connection 110 to a controllable DC-DC converter (e.g., converter 930 of FIG. 10B) or other circuitry that can be controlled to produce a pulse of a desired voltage level. At 1956, the voltage controlled pulse can be applied to the battery as whole (e.g., to all cells together if connected in series, or the same pulse applied to each cell individually if connected in parallel). In some embodiments, the current is regulated to ensure that the voltage applied to the battery does not exceed a maximum threshold (e.g., the rated maximum for the source), such as a voltage expected of the battery when at 100% SOC. In other embodiments, a voltage exceeding this maximum can be applied for a brief time that does not initiate or drive side reactions in the battery cells as described further herein (see, e.g., FIG. 17B).

At 1957 a current response on each cell in module 108 is measured (e.g., with measurement circuitry 201). At 1958 the measured response can be used to assess whether a cut off condition has been satisfied. In some embodiments the cut off condition can be satisfied if it is determined that a second derivation of the current response is negative and a first derivation of the current response is lower than a threshold. The battery or cell of the module that determines the cutoff condition can be the first such battery or cell that satisfies the cutoff condition, or can be based on a weighting algorithm. After the cut off condition is satisfied but at least one cell, then the voltage pulse can be terminated by the switching circuitry (e.g., converter 206, 308).

At step 1960, the battery cells can be rested with no pulse applied for a rest period. At 1911, a determination can be made whether a sub maximum SOC threshold is reached (e.g., 60-80%, or another level), and this can entail performance of another SOC measurement. The selected threshold can depend on the battery chemistry. If the threshold is reached, then at step 1962 the system can transition to another charging technique using a relatively slower method, such as using longer durations of a constant lower voltage (beneath the expected voltage at full charge), to reach a full SOC level as dictated by the needs of the system (e.g., 100%). If the method continues, then at step 1964, a determination is made whether to adjust the voltage of the next pulse. This determination can be made by assessing the difference of the predetermined maximum voltage of the cell and the voltage peak of the cell measured while applying a pulse. As the difference decreases, the voltage applied during each successive pulse can be reduced to assist the cell in not exceeding the predetermined maximum voltage. If no adjustment is to be made, then the method can revert to step 1952 or 1954 and repeat. If the current is to be adjusted, then this can occur at 1966, prior to reverting. Application of the next pulse can be conditioned on satisfaction of a restart condition, and/or after passage of a minimum or predetermined period of time. An example of satisfaction of a restart condition can be after determination that a second derivation of the current response is positive and a first derivation of the current response is larger than a threshold, which can be the same or different threshold.

In electrochemical storage devices primary and side reactions can occur. The electrochemical reactions are the primary processes for energy storage, and can also be referred to as the storage reaction or reactions. For lithium ion battery chemistries it is the reaction of Li ions with the active materials. Examples of such a reaction on the negative pole of a Li ion battery are intercalation reactions with Graphite, alloying reaction with silicon, displacement reactions with oxides or even plating reaction of Li metal. On the positive pole of Li ion batteries typical examples of the primary storage reaction are intercalation reactions with oxide or phosphate types of materials, displacement reaction with oxides or fluorides, or even formation reactions with oxygen as utilized in a lithium air battery. Typically these reactions are rather simple and are single electron electrochemical reactions where only one electron is transferred. For other battery chemistries is it also typical that the electrochemical reaction is based on electrochemical processes where not more than a few electrons (e.g., two) are transferred. For example, only two electrons are transferred in the cases of lead acid and alkaline chemistries, and only one electron for nickel metal hydride chemistries.

Side reactions are undesired reactions that either do not contribute to energy storage or enhance energy storage capability of the source. The side reactions can be degradatory or degenerative to the source, such as by limiting cut off voltages during charging or discharging processes, and/or reduction of operative life time of the energy source. The embodiments provided herein encompass techniques where pulses are applied to initiate the electrochemical reaction without initiating and/or driving at least one side reaction, preferably all side reactions, in the source.

A non-exhaustive list of examples of such reactions includes: an oxidation reaction of the electrolyte on the positive electrode, a reduction reaction on the negative electrode, a break down reaction (e.g., reduction or phase change reaction) of the active materials, dissolution reaction of a metal compound of the active materials, reactions that result in the formation of dendrites (e.g., plating of lithium dendrites for lithium ion batteries), reactions that result in the dissolution or unwanted growth of the SEI (solid electrolyte interphase) on the anode, and reactions that result in the dissolution or oxidation of the current collectors on either electrode.

These side reactions are typically more complex than the electrochemical reaction and involve multi electron transfer, often coupled with slow chemical, transport or rearrangement processes. For example, Ethylene carbonate, which is a typical component of an electrolyte of Li ion batteries, decomposes following multiple reaction pathways. These decomposition reaction paths form Ethylene, poly carbonates coupled with series of nucleophilic reactions, lithium ethylene dialkoxide, carbon dioxide, and Lithium Ethylene Decarbonate based on five electron transfers.

Reactions with single or low number of electron transfer are typical kinetically much faster with a much shorter reaction time constant compared to multi electron transfer reactions. This behavior can be described and understood with the Marcus theory in combination with first principle consideration of electron tunneling processes.

The consequence for electrochemical storage devices such as batteries, fuel cells and HED capacitors is that the onset of the desired primary storage reaction is much faster than the onset of undesired side reactions. This behavior enables novel charge or discharge strategies that can suppress or even fully avoid side reactions as described and proposed herein. Embodiments are provided herein where each module 108 is configured to charge an energy source 202 such that pulses are applied in a manner sufficient to initiate an electrochemical reaction in the source without initiating, driving, or substantially driving a side reaction in the source.

Application of a pulse pattern where the pulses each have a duration that is longer than the reaction time constant of the primary electrochemical reaction but shorter as the time constant of side reactions permits application of one or more pulses at raised voltage levels during the charging process, which can lead to faster charging compared to conventional constant current and constant voltage charge methodologies. Furthermore, the effective suppression of side reaction slows down aging and degradation and therefore will prolong the life time of the energy source.

The reaction time constant of the electrochemical reaction can be directly connected to exchange current densities or charge transfer resistances of the reaction. Depending on the complexity of the reaction the charge transfer resistance and exchange current can range over several orders of magnitude. The reduction of transition metals such as iron or cobalt (typically utilized in the primary storage reaction of lithium ion chemistries) has a high exchange current density of up to 1 A/cm2 (amp per square centimeter) which corresponds to a very low exchange resistivity with a reaction time constant of sub milliseconds (e.g., 0.1 ms). On the other hand, the breakdown reaction of water, which is a major side reaction in batteries with an aqueous electrolyte, shows very low exchange current densities in the range of $10^{-6}$ to $10^{-10}$ A/cm2 with a high exchange resistivity and a reaction time constant of up to one or more seconds. In such an example, the control circuitry of the module (e.g., LCD 114) can control the application of pulses to the source using a pattern of pulses where the length or duration of each pulse is longer than the a sub millisecond duration, in order to initiate (and optionally drive) the primary electrochemical reaction, but shorter than one or a few seconds to avoid initiation of the water break down side reaction.

Although dependent on chemistry of the source, in certain embodiments the pulse length can range from 0.1 milliseconds (mS) to 5 seconds, more preferably 1 mS to 100 mS, and still more preferably from 5 mS to 25 mS (such as, e.g., with lithium ion chemistries). These ranges correspond to different example embodiments and it is stressed that the subject matter disclosed herein is not limited to any of these ranges, as implementations can and will vary depending on the structure, chemistry, and/or composition of the sources.

These and other pulse patterns that avoid initiation of side reactions enables application of pulses with voltages that can be higher than the expected source voltage at a full state of charge condition (e.g., 100% SOC). An example of this expected voltage is the rated maximum voltage for the source (e.g., as provided by the manufacturer). In some embodiments this increased voltage level is between 101 and 200% of the expected voltage at 100% SOC. In some embodiments the range can be narrower, such as between 101 and 180%, or between 105% and 150%. Table 2 provides a list of example expected voltages at 100% SOC (maximum voltages) for batteries of common chemistries. These are examples only and the maximum voltages will vary based on battery chemistry, composition, size, and structure.

TABLE 2

| Chemistry | Typical Maximum Voltage | Type |
|---|---|---|
| NMC 8:1:1/Li | 4.3-4.5 V | Li ion |
| NMC 8:1:1/Si | 4.2-4.5 V | Li ion |
| NMC 8:1:1/C + Si | 4.3-4.6 V | Li ion |
| NMC 6:2:2/C + Si | 4.2-4.4 V | Li ion |
| NMC 6:2:2/C | 4.2-4.4 V | Li ion |
| NCA/C + Si | 4.2-4.3 V | Li ion |
| NCA/C | 4.2-4.3 V | Li ion |
| NMC 6:2:2/LTO | 2.7-2.8 V | Li ion |
| FePO4/C | 3.2-3.5 V | Li ion |
| Lead acid | 2.2-2.4 V | Aqueous electrolyte |
| Alkaline | 1.5-1.65 V | Aqueous electrolyte |
| Ni metal hydride | 1.4-1.6 V | Aqueous electrolyte |
| Ni metal cadmium | 1.4-1.6 V | Aqueous electrolyte |
| Zink oxide | 1.5-1.8 V | Aqueous electrolyte |
| Li air | 3-4.2 V | Non aqueous electrolyte |

For example, with NMC/Graphite lithium ion chemistries, a battery cell can be limited to application of a voltage of around 4.2 V (expected voltage at 100% SOC) and the voltage value is not to be exceeded during any point of operation with standard charging and discharging protocols. For a pulse pattern that avoids side reactions as described herein, the applied voltage can be higher than 4.2 V in a voltage range of 0% to 80% of the expected voltage at full state of charge. Pulses can be applied at these raised voltage levels when the source is at a charge level that is less than full SOC (e.g., 60-80%). Pulse voltage levels can be greater when the source is at low SOC levels than when the source is at high SOC levels. For example, the voltage of an applied pulse can be at a first level when the source is at a first SOC less than full SOC, and after charging when the source is at a second SOC greater than the first SOC, a subsequently applied pulse is at a second level that is less than the first voltage level. For example, the raised level can be 50% higher at low state of charge compared to the raised level when at a higher state charge. Thus the raised voltage levels can decrease as the source SOC increases, and the application of pulses at raised levels preferably stops when the source reaches a target SOC level (e.g., 60-80%) that is less than full SOC (e.g., 100%). The target level can be selected based on the source chemistry.

Figure 17B:
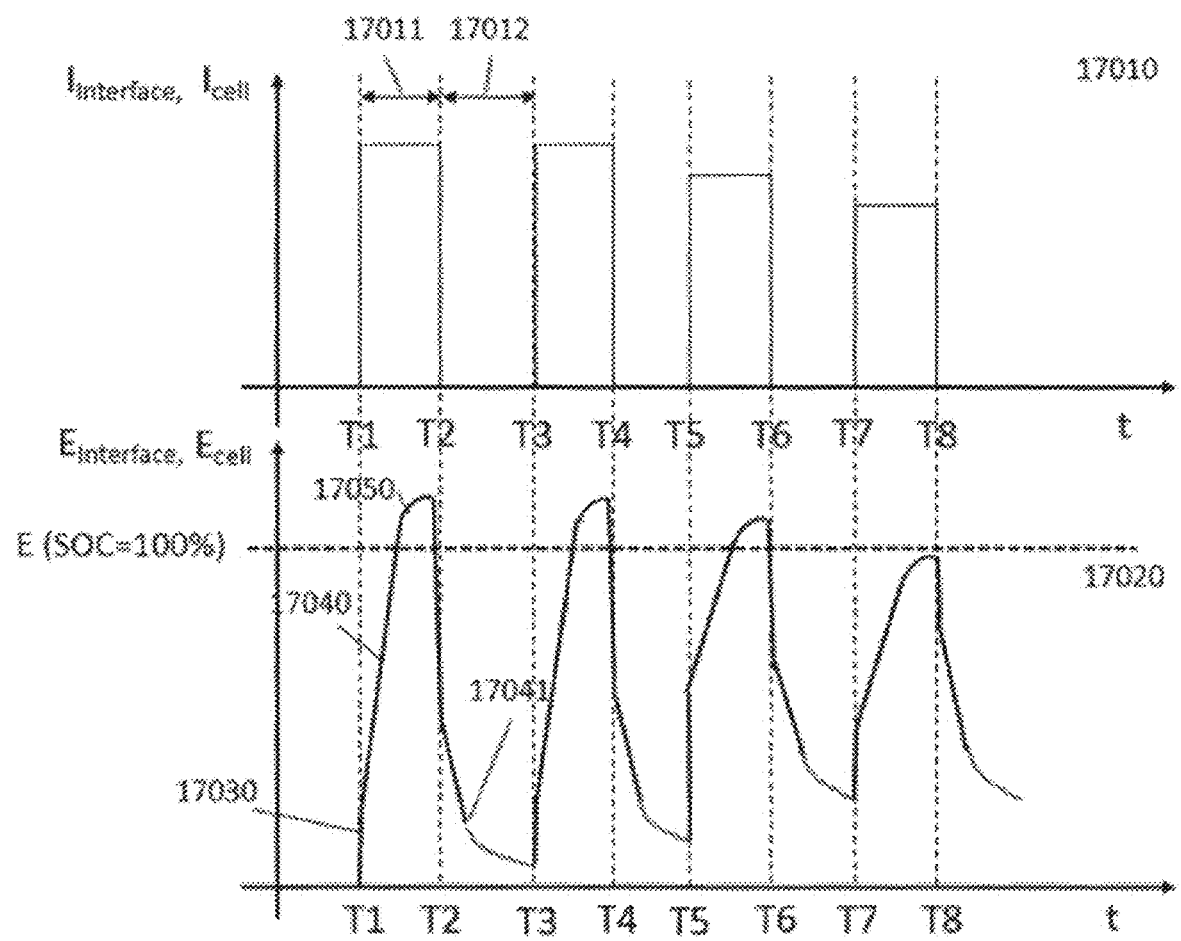

FIG. 17B depicts current and voltage signals of another example embodiment of a fast charging algorithm, which utilizes a pulse scheme that produces raised voltage levels for advanced and accelerated charging. In this embodiment, the current is controlled to produce the raised voltage response as described. The features of FIG. 17B are current stimulation (17010), voltage stimulation (17020), current on (17011), current off (17012), voltage Response A (10030); voltage Response B (10040), voltage Response C (10050) with switch off condition $dE2/dt2<0$ and $dE/dt<$certain threshold a, and relaxation (10041) of ion gradients and voltages due to charge exchange on electrochemical interface with switch on condition E<Emax, dE/dt<certain threshold b. E at 100% SOC corresponds to the expected voltage at full charge. Here, the first two pulses are applied at generally the same voltage in excess of E, and the third pulse is applied with an adjusted and reduced voltage, and the fourth pulse is applied with a voltage less than E. In practice, as many pulses as are necessary can be applied in succession at voltages above E. The rest time between pulses can vary and need not be constant, nor does the duration of the pulses themselves need to be constant.

The embodiments provided herein further encompass techniques where pulses are applied to initiate the electrochemical reaction without initiating and/or driving degradatory or degenerative side reactions (such as those listed above and those that can dissolute the SEI), but permitting those side reactions that are beneficial, such as non-degradatory or generative side reactions resulting in structural modification of the cell to upgrade performance (e.g., lifespan). For example, in some embodiments the formation of the SEI (solid electrolyte interphase) in the first cycle or first few cycles of the battery facilitates formation of a stable, protective coating that can improve the functioning lifetime of the cell. The side reactions used to form the SEI can therefore have beneficial effect on the battery cell. In such embodiments, pulse duration can be controlled to such that these side reactions occur. After formation of the SEI coating, pulse duration can be modified (shortened) such that the electrochemical reaction is initiated without initiation and/or driving of this and other side reactions. The embodiments described herein can also be utilized and tailored such that other side reactions that prove useful are permitted over the life of the source.

All of the aforementioned embodiments pertaining to pulsed charging can be implemented according to a pulse width modulated scheme as described with respect to FIGS. 11C-11F, with additional constraints as to pulse length implemented where applicable so as not to violate pulse duration conditions of certain embodiments described herein, such as those pertaining to the initiation of an electrochemical reaction without initiation of a side reaction.

The example embodiments discussed above can be applied on a system level to enable the electrification of mass transportation vehicles and systems such as, e.g., locomotive and rail vehicles, buses, trucks, ferries, aircrafts and the like. In a mass-transit system utilizing locomotives or rail vehicles, busses, trucks, ferries, aircraft, or other vehicles, example embodiments can be applied to a first environment having three or more waypoints that include battery charging or battery swapping equipment at all waypoints, or to a second environment having three or more waypoints that include battery charging or battery swapping equipment at less than all waypoints. Waypoints include, but are not limited to, stops, stations, docks, ports, locations capable of non-stationary charging, and other locations where a vehicle may stop and/or receive a source of energy, whether electrical or otherwise.

Vehicles operating within the first environment may be equipped with smaller battery pack(s) [and/or other energy storage unit(s)] than vehicles operating within the second environment. Further, the power required at each charging station may be smaller in context of the first environment than in the second environment due to the shorter distance between charges. In another case, an implementation of the first environment whereby a vehicle is making short stops along its route may require higher charging power than the same vehicle operating in context of the second environment, if the implementation of the second environment permits longer stops for charging (for example, at the extreme ends of the route).

Any one or more of the advanced battery charging methods, modular energy topology, battery systems, and/or converter-battery units described herein may be applied in context of such examples to improve the energy management and other aspects of a mass-transit system. Other example systems are possible, comprising any number of waypoints, where individual waypoints possess unique attributes including but not limited to: vehicle stop time, charging equipment and available charge power thereof, battery or energy storage unit swapping equipment, and/or distance from adjacent stop(s) along a given route.

In such systems, the energy consumption or requirement is typically too high to install an energy storage unit that support the operation of the vehicle over a full operation shift. For example, operating shifts for rail vehicles, busses, aircraft and the like can be 12-19 hours. In case of a high speed rail example, the energy consumption over a 19 hour operation shift is higher than 25 MWh. A battery with a sufficient amount of energy would be much to heavy and too expensive. As a result, charging during shift operation is preferable, if not required.

A first example scenario in which the present embodiments can be applied includes fast charging in end station and sub stations/stops. The embodiments provided herein enable high bandwidth pulse charging to accelerate charging without damaging of the cell (e.g. 20 min instead of 40 min to 70-80% state of charge). In such a scenario no special charger is required at station, sub stations, stops. The embodiments provided herein enable charging from any AC or DC power system, and are bidirectional such that the embodiments can be used to power the motors as well as charge the batteries. The embodiments also enable advanced energy peak shaving to minimize power rating of grid infrastructure.

A second example scenario in which the present embodiments can be applied includes the use of swappable energy sources, such as at end stations or and at sub-station or stops. These embodiments can include a modular system where one can remove battery modules or packs and replace the removed module or pack with other battery modules or pack without the need for the modules or packs to match the other modules or packs already in place. Therefore the embodiments enable both a partial swap of only a couple of modules or packs as required or, if desired, the entire converter-battery system. Battery capacity can be adjusted by adding modules during operation dependent of desired energy and power requirement—if the load is lower it is possible to use less battery modules.

A third example scenario in which the present embodiments can be applied includes fast charging of batteries on rails where an energy source is provided, e.g., a third rail or some charging catenary infrastructure on parts of the corridor or route. The embodiments above enable high bandwidth pulse charging to accelerate charging without damaging of the cell (e.g. 20 min instead of 40 to 70% state of charge) without a special charger, and enable charging from any AC or DC power system. The embodiments enable advanced temperature control and enabled higher charging C rate on the system level compared to conventional system.

Vehicle battery pack configurations can be adapted during life of operation depending on need. In case there is a need to use a vehicle for a different route where different power or energy is required the battery pack modules can be changed and adapted as needed. The battery module can have different cell chemistry, different C rate capabilities as well as different capacity and system will adapt accordingly.

In addition, vehicle modules can be partial renewed depend on the status of health of the modules. Further, vehicle battery packs don't need to be oversized for a desired life time as the improved energy utilization of aging batteries by applying the embodiments discussed herein can avoid substantial oversizing for a desired life time compared to conventional technology, such can lead to less battery modules or packs, reduced costs.

Due to the high cycle life of mass transport applications the lifetime of batteries can be substantially limited. As discussed in the two high speed rail examples with high energy cells 250 Wh/kg & 4000 cycles life time (70-80% of their initial capacity/energy) the cells need to be replaced every one or two years. The embodiments described herein allow the use of modules directly, without any retrofitting for any stationary storage application. This enables a cost saving due to the remaining high value of the modules after mass transportation application. This will avoid further costs or fee for recycling.

In all of the embodiments described herein, the primary energy source of each module of a particular system can have the same voltage (either standard operating voltage or nominal voltage). Such a configuration simplifies management and construction of the system. The primary and second energy sources can also have the same voltage (standard or nominal). Other configurations can be implemented, such as those where primary energy sources of different modules of the same system have different voltages (standard or nominal), and those where the primary and secondary energy sources of a module have different voltages (standard or nominal). Still other configurations can be implemented, where primary energy sources of modules of a system have primary energy source batteries that are different chemistries, or where modules of the system have a primary energy source battery of a first chemistry, and a secondary energy source battery of a second chemistry. The modules that differ from each other can be based on placement in the system (e.g., modules within a phase array are different than the IC module(s)).

Various constituents of the figures (e.g., elements, components, devices, systems, and/or functional blocks) are depicted as being coupled with or connected to one or more other constituents (e.g., elements, components, devices, systems, and/or functional blocks). These constituents are often shown as being coupled or connected without the presence of an intervening entity, such as in a direct coupling or connection. Those of ordinary skill in the art will readily recognize, in light of the present description, that these couplings or connections can be direct (without one or more intervening components) or indirect (with one or more intervening components not shown). Thus, this paragraph serves as antecedent support for all couplings or connections being direct couplings connections or indirect couplings or connections.

A detailed discussion regarding systems (e.g., an ACi-battery pack), devices, and methods that may be used in conjunction with the systems, devices, and methods described herein is provided in International Publication No. WO2019/183553, filed Mar. 22, 2019, entitled Systems And Methods For Power Management And Control, International Application No. PCT/US20/25202, filed Mar. 27, 2020, entitled Module-based Energy Storage Systems Having Converter-Source Modules and Methods Related Thereto, and International Application No. PCT/US20/25366, filed Mar. 27, 2020, entitled Module-based Energy Storage Systems Capable of Cascaded and Interconnected Configurations, and Methods Related Thereto, all of which incorporated by reference herein for all purposes as if set forth in full.

The embodiments described herein, when used as a battery pack, e.g., in the automotive industry, permit the elimination of the conventional Battery Management System as a sub-system accompanying each battery module. The functionality typically performed by the Battery Management System is subsumed or replaced by the different and in many ways greater functionality of the system embodiments described herein.

A person of ordinary skill in the art would understand that the a "module" as that term is used herein, refers to a device, assembly, or sub-system within system 100, and that system 100 does not have to be configured to permit each individual module to be physically removable and replaceable with respect to the other modules. For example, system 100 may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

The example embodiments described herein can be used with one or more cooling systems to dissipate heat from any and all components of the system (e.g., switch circuitry, energy source, energy buffer, control circuitry, etc.). The cooling systems can utilize a cooling medium such as a gas, liquid, or solid. The cooling systems can utilize one or more piezo cooling elements.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In many embodiments, a modular energy storage system is provided, including: a plurality of converter modules coupled together in at least one array, each converter module comprising a battery cell and switch circuitry, where in a discharge state the at least one array is configured to generate at least one AC voltage waveform comprising a superposition of output voltages from the plurality of converter modules; and control circuitry associated with the plurality of converter modules, where in a charge state the control circuitry is configured to control the application of pulses in a manner sufficient to initiate an electrochemical reaction in the battery cell without substantially driving a side reaction in the battery cell.

In some embodiments, at least one pulse is applied at a first voltage greater than an expected voltage of the battery cell at full charge.

In some embodiments, at least one pulse is applied at a first voltage greater than an expected voltage of the battery cell at 100% state of charge. The first voltage can be a voltage that is between 101 and 200% of the expected voltage of the battery cell at 100% state of charge. The control circuitry can be configured to control application of pulses such that the at least one pulse is applied when a state of charge of the battery cell is less than 100%. The control circuitry is configured to control application of pulses such that the at least one pulse is applied when a state of charge of the battery cell is less than 80%. The at least one pulse can be at least one first pulse, and the control circuitry can be configured to control application of pulses such that at least one second pulse is applied at a second voltage less than the first voltage when a state of charge of the battery cell is greater than the state of the charge of the battery cell at application of the at least one first pulse, where the second voltage is greater than an expected voltage of the battery cell at 100% state of charge. The control circuitry can be configured to control application of pulses such that the at least one first pulse and the at least one second pulse is applied when a state of charge of the battery cell is less than 80%.

In some embodiments, the control circuitry can be configured to control the application of pulses in a manner sufficient to initiate an electrochemical reaction in the battery cell without substantially driving a side reaction in the battery cell while a state of charge of the battery cell does not exceed 80%.

In some embodiments, the control circuitry can be configured to control the application of pulses in a manner sufficient to initiate an electrochemical reaction in the battery cell without substantially driving a side reaction in the battery cell, where each pulse has a duration of between 0.1 milliseconds and 5 seconds.

In some embodiments, the control circuitry can be configured to control the application of pulses in a manner sufficient to initiate an electrochemical reaction in the battery cell without substantially driving a side reaction in the battery cell, where each pulse has a duration of between 1 millisecond and 100 milliseconds.

In some embodiments, the control circuitry can be configured to control the application of pulses in a manner sufficient to initiate an electrochemical reaction in the battery cell without substantially driving a side reaction in the battery cell, where each pulse has a duration of between 5 milliseconds and 25 milliseconds. The battery cell can be a lithium ion battery cell.

In some embodiments, each module includes a plurality of battery cells, and the control circuitry is configured to control the application of pulses in a manner sufficient to initiate an electrochemical reaction in the plurality of battery cells without substantially driving a side reaction in the plurality of battery cells.

In some embodiments, the control circuitry can be configured to control the application of pulses in a manner sufficient to initiate an electrochemical reaction in the battery cell without driving a side reaction in the battery cell.

In some embodiments, the control circuitry can be configured to control the application of pulses in a manner sufficient to initiate an electrochemical reaction in the battery cell without initiating a side reaction in the battery cell.

In some embodiments, the battery cell includes electrochemical active ions, and the control circuitry can be configured to cause application of a pulse to end at substantially the time when active intercalation of the electrochemical active ions begins. The battery cell can include an electrolyte and an active electrode material, and the control circuitry can be configured to apply a charge pulse substantially upon relaxation of a voltage on an interface between the electrolyte and the active electrode material.

In some embodiments, each of the plurality of converter modules comprises monitoring circuitry communicatively coupled to the control circuitry, where the monitoring circuitry is configured to detect a voltage or current response of the battery cell.

In some embodiments, the control circuitry can be configured to cause a pulse to be initiated and/or terminated based upon a response detected by the monitoring circuitry.

In some embodiments, the control circuitry includes: a plurality of local control devices communicatively coupled with the plurality of converter modules such that at least one converter module is associated with each local control device; and a master control device communicatively coupled with the plurality of local control devices. The local control device of a converter module can be configured to determine whether to cause initiation and/or termination of a pulse. The local control device can be configured to determine whether to cause initiation and/or termination of the pulse without instruction from the master control device. Each of the plurality of converter modules can have a power port for outputting and receiving energy, and the local control device associated with each converter module can be configured to control the switch circuitry of the converter module such that voltage applied to the power port is used for generation of a pulse for application to the battery cell. The master control device can be configured to control the plurality of local control device to coordinate utilization of a charge voltage applied to the at least one array from an external voltage source.

In some embodiments, each converter module of the plurality of converter modules includes a DC-DC converter electrically coupled between the switch circuitry and the battery cell.

In some embodiments, the plurality of converter modules are coupled together in three or more arrays, where each of the three or more arrays is configured to generate an AC voltage waveform having a different phase angle.

In some embodiments, the plurality of converter modules includes at least one interconnection module coupled to at least two of the three or more arrays.

In many embodiments, a modular energy storage system is provided, where the system includes: a plurality of converter modules coupled together in at least one array, each converter module including a battery cell and switch circuitry, where in a discharge state the at least one array is configured to generate at least one AC voltage waveform comprising a superposition of output voltages from the plurality of converter modules; and control circuitry associated with the plurality of converter modules, where in a charge state the control circuitry is configured to control the application of pulses in a manner sufficient to initiate an electrochemical reaction in the battery cell.

In some embodiments, at least one pulse is applied at a first voltage greater than an expected voltage of the battery cell at full charge.

In some embodiments, at least one pulse is applied at a first voltage greater than an expected voltage of the battery cell at 100% state of charge.

In some embodiments, the first voltage is a voltage that is between 101 and 200% of the expected voltage of the battery cell at 100% state of charge.

In some embodiments, the control circuitry is configured to control application of pulses such that the at least one pulse is applied when a state of charge of the battery cell is less than 100%.

In some embodiments, the control circuitry is configured to control application of pulses such that the at least one pulse is applied when a state of charge of the battery cell is less than 80%. The at least one pulse can be at least one first pulse, and the control circuitry can be configured to control application of pulses such that at least one second pulse is applied at a second voltage less than the first voltage when a state of charge of the battery cell is greater than the state of the charge of the battery cell at application of the at least one first pulse, where the second voltage is greater than an expected voltage of the battery cell at 100% state of charge. The control circuitry can be configured to control application of pulses such that the at least one first pulse and the at least one second pulse is applied when a state of charge of the battery cell is less than 80%.

In some embodiments, the control circuitry can be configured to control the application of pulses in a manner sufficient to initiate an electrochemical reaction in the battery cell without substantially driving a side reaction in the battery cell.

In some embodiments, the control circuitry can be configured to control the application of pulses in a manner sufficient to initiate an electrochemical reaction in the battery cell without substantially driving a side reaction in the battery cell while a state of charge of the battery cell does not exceed 80%.

In some embodiments, the control circuitry can be configured to control the application of pulses, where each pulse has a duration of between 0.1 milliseconds and 5 seconds.

In some embodiments, the control circuitry can be configured to control the application of pulses, where each pulse has a duration of between 1 millisecond and 100 milliseconds.

In some embodiments, the control circuitry can be configured to control the application of pulses, where each pulse has a duration of between 5 milliseconds and 25 milliseconds. The battery cell can be a lithium ion battery cell.

In some embodiments, the battery cell includes electrochemical active ions, and the control circuitry can be configured to cause application of a pulse to end at substantially the time when active intercalation of the electrochemical active ions begins. The battery cell can include an electrolyte and an active electrode material, and the control circuitry can be configured to apply a charge pulse substantially upon relaxation of a voltage on an interface between the electrolyte and the active electrode material.

In some embodiments, each of the plurality of converter modules includes monitoring circuitry communicatively coupled to the control circuitry, where the monitoring circuitry is configured to detect a voltage or current response of the battery cell.

In some embodiments, the control circuitry can be configured to cause a pulse to be initiated and/or terminated based upon a response detected by the monitoring circuitry.

In some embodiments, the control circuitry includes: a plurality of local control devices communicatively coupled with the plurality of converter modules such that at least one converter module is associated with each local control device; and a master control device communicatively coupled with the plurality of local control devices. The local control device of a converter module is configured to determine whether to cause initiation and/or termination of a pulse. The local control device can be configured to determine whether to cause initiation and/or termination of the pulse without instruction from the master control device. Each of the plurality of converter modules can have a power port for outputting and receiving energy, and the local control device associated with each converter module can be configured to control the switch circuitry of the converter module such that voltage applied to the power port is used for generation of a pulse for application to the battery cell. The master control device can be configured to control the plurality of local control device to coordinate utilization of a charge voltage applied to the at least one array from an external voltage source.

In some embodiments, each converter module of the plurality of converter modules can include a DC-DC converter electrically coupled between the switch circuitry and the battery cell, where the DC-DC converter is controllable by the control circuitry to adjust a voltage of a signal from the switch circuitry for application to the battery cell.

In some embodiments, the plurality of converter modules can be coupled together in three or more arrays, where each of the three or more arrays is configured to generate an AC voltage waveform having a different phase angle. The plurality of converter modules can include at least one interconnection module coupled to at least two of the three or more arrays.

In some embodiments, each module includes a plurality of battery cells, and the control circuitry is configured to control the application of pulses in a manner sufficient to initiate an electrochemical reaction in the plurality of battery cells.

In many embodiments, a method of charging a modular energy storage system is provided, the system including: a plurality of converter modules coupled together in at least one array, each converter module comprising a battery cell and switch circuitry, where the method includes: applying pulses in a manner sufficient to initiate an electrochemical reaction in the battery cell.

In some embodiments, the method further includes applying at least one pulse at a first voltage greater than an expected voltage of the battery cell at full charge.

In some embodiments, the method further includes applying at least one pulse at a first voltage greater than an expected voltage of the battery cell at 100% state of charge.

In some embodiments, the first voltage is a voltage that is between 101 and 200% of the expected voltage of the battery cell at 100% state of charge.

In some embodiments, the method further includes applying the at least one pulse when a state of charge of the battery cell is less than 100%.

In some embodiments, the method further includes applying the at least one pulse when a state of charge of the battery cell is less than 80%. At least one pulse can be at least one first pulse, and the method can further include applying at least one second pulse at a second voltage less than the first voltage when a state of charge of the battery cell is greater than the state of the charge of the battery cell at application of the at least one first pulse, where the second voltage is greater than an expected voltage of the battery cell at 100% state of charge. The at least one first pulse and the at least one second pulse can be applied when a state of charge of the battery cell is less than 80%.

In some embodiments, the pulses are applied in a manner sufficient to initiate an electrochemical reaction in the battery cell without substantially driving a side reaction in the battery cell.

In some embodiments, the pulses are applied in a manner sufficient to initiate an electrochemical reaction in the battery cell without substantially driving a side reaction in the battery cell while a state of charge of the battery cell does not exceed 80%.

In some embodiments, a plurality of pulses are applied, each having a duration of between 0.1 milliseconds and 5 seconds.

In some embodiments, a plurality of pulses are applied, each having a duration of between 1 millisecond and 100 milliseconds.

In some embodiments, a plurality of pulses are applied, each having a duration of between 5 milliseconds and 25 milliseconds. The battery cell can be a lithium ion battery cell.

In some embodiments, the battery cell includes electrochemical active ions, and application of the pulses ends at substantially the time when active intercalation of the electrochemical active ions begins. The battery cell can include an electrolyte and an active electrode material, and application of the pulses ends substantially upon relaxation of a voltage on an interface between the electrolyte and the active electrode material.

In some embodiments, the method further includes detecting a voltage or current response of the battery cell. The method can further include initiating and/or terminating application of a pulse based upon a detected response in the battery cell.

In some embodiments, the system further includes control circuitry associated with the plurality of converter modules.

In many embodiments a method is provided for charging a modular energy storage system comprising: a plurality of converter modules coupled together in at least one array, each converter module comprising an energy source and switch circuitry coupled with a power connection, where the method includes: measuring a parameter of the energy source; generating a first pulse from the power connection with the switch circuitry; applying a first controlled pulse to the energy source, where the first controlled pulse is generated from the first pulse; and measuring a response of the energy source.

In some embodiments, the method further includes determining if a pulse cutoff condition is satisfied based on the measured response. The method can further include terminating application of the controlled response after satisfaction of the pulse cutoff condition. The pulse cutoff condition can be based on a first derivation and a second derivation of the measured response. The method can further include determining if the energy source is at a sub maximum charge threshold. The method can further include transitioning to a different charge method if the sub maximum charge threshold is reached.

In some embodiments, the method can further include determining whether to adjust a voltage or current of a second controlled pulse. The method can further include adjusting a voltage or current of the second controlled pulse such that the voltage or current is less than that of the first controlled pulse.

In many embodiments, a modular energy storage system is provided, the system including: a plurality of converter modules coupled together in at least one array, each converter module comprising an energy source and switch circuitry coupled with a power connection, where in a discharge state the at least one array is configured to generate at least one AC voltage waveform comprising a superposition of output voltages from the plurality of converter modules; and control circuitry associated with the plurality of converter modules, where the control circuitry is configured to: cause measurement of a parameter of the energy source; cause generation of a first pulse from the power connection with the switch circuitry; cause application of a first controlled pulse to the energy source, where the first controlled pulse is generated from the first pulse; and cause measurement of a response of the energy source.

In some embodiments, the control circuitry can be configured to determine if a pulse cutoff condition is satisfied based on the measured response. The control circuitry can be configured to cause termination of application of the controlled response after satisfaction of the pulse cutoff condition. The pulse cutoff condition is based on a first derivation and a second derivation of the measured response.

In some embodiments, the control circuitry is configured to determine if the energy source is at a sub maximum charge threshold. The control circuitry can be configured to transition to a different charge method if the sub maximum charge threshold is reached.

In some embodiments, the control circuitry can be configured to determine whether to adjust a voltage or current of a second controlled pulse. The control circuitry can be configured to cause adjustment of a voltage or current of the second controlled pulse such that the voltage or current is less than that of the first controlled pulse.

Processing circuitry can include one or more processors, microprocessors, controllers, and/or microcontrollers, each of which can be a discrete chip or distributed amongst (and a portion of) a number of different chips. Processing circuitry can include a digital signal processor, which can be implemented in hardware and/or software. Processing circuitry can execute software instructions stored on memory that cause processing circuitry to take a host of different actions and control other components.

Processing circuitry can also be adapted to execute the operating system and any software applications, and perform those other functions not related to the processing of communications transmitted and received.

Memory can be shared by one or more of the various functional units present, or can be distributed amongst two or more of them (e.g., as separate memories present within different chips). Memory can also be a separate chip of its own. Memory is non-transitory, and can be volatile (e.g., RAM, etc.) and/or non-volatile memory (e.g., ROM, flash memory, F-RAM, etc.).

Computer program instructions for carrying out operations in accordance with the described subject matter may be written in any combination of one or more programming languages, including an object oriented programming language such as Java, JavaScript, Smalltalk, C++, C#, Transact-SQL, XML, PHP or the like and conventional procedural programming languages, such as the "C" programming language or similar programming languages. The program instructions may execute entirely on the user's computing device (e.g., reader) or partly on the user's computing device. The program instructions may reside partly on the user's computing device and partly on a remote computing device or entirely on the remote computing device or server, e.g., for instances where the identified frequency is uploaded to the remote location for processing. In the latter scenario, the remote computing device may be connected to the user's computing device through any type of network, or the connection may be made to an external computer.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and later-developed variants thereof.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. A modular energy storage system, comprising:
a plurality of converter modules coupled together in at least one array, each converter module comprising a battery cell and switch circuitry, wherein in a discharge state the at least one array is configured to generate at least one AC voltage waveform comprising a superposition of output voltages from the plurality of converter modules; and
control circuitry associated with the plurality of converter modules, wherein in a charge state the control circuitry is configured to control application of pulses in a manner sufficient to initiate an electrochemical reaction in a battery cell of the plurality of converter modules without substantially driving a side reaction in the battery cell, wherein, to control the application of the pulses, the control circuitry is configured to:
cause measurement of a parameter of the battery cell;
cause generation of a first pulse from a power connection with switch circuitry associated with the battery cell;
cause application of a first controlled pulse to the battery cell, wherein the first controlled pulse is generated from the first pulse;
cause measurement of a response of the battery cell; and
determine if a pulse cutoff condition is satisfied based on the response and cause termination of application of the first controlled pulse after satisfaction of the pulse cutoff condition, wherein the pulse cutoff condition is based on a first derivation and a second derivation of the response.

2. The modular energy storage system of claim 1, wherein at least one pulse is applied at a first voltage greater than an expected voltage of the battery cell at full charge.

3. The modular energy storage system of claim 1, wherein at least one pulse is applied at a first voltage greater than an expected voltage of the battery cell at 100% state of charge.

4. The modular energy storage system of claim 3, wherein the first voltage is a voltage that is between 101 and 200% of the expected voltage of the battery cell at 100% state of charge.

5. The modular energy storage system of claim 3, wherein the control circuitry is configured to control application of pulses such that the at least one pulse is applied when a state of charge of the battery cell is less than 100%.

6. The modular energy storage system of claim 3, wherein the control circuitry is configured to control application of pulses such that the at least one pulse is applied when a state of charge of the battery cell is less than 80%.

7. The modular energy storage system of claim 5, wherein the at least one pulse is at least one first pulse, and wherein the control circuitry is configured to control the application of pulses such that at least one second pulse is applied at a second voltage less than the first voltage when a state of charge of the battery cell is greater than the state of the charge of the battery cell at application of the at least one first pulse, wherein the second voltage is greater than an expected voltage of the battery cell at 100% state of charge.

8. The modular energy storage system of claim 7, wherein the control circuitry is configured to control application of pulses such that the at least one first pulse and the at least one second pulse is applied when a state of charge of the battery cell is less than 80%.

9. The modular energy storage system of claim 1, wherein the control circuitry is configured to control the application of pulses in a manner sufficient to initiate the electrochemical reaction in the battery cell without substantially driving the side reaction in the battery cell while a state of charge of the battery cell does not exceed 80%.

10. The modular energy storage system of claim 3, wherein the control circuitry is configured to control the application of pulses in a manner sufficient to initiate the electrochemical reaction in the battery cell without substantially driving the side reaction in the battery cell, wherein each pulse has a duration of between 0.1 milliseconds and 5 seconds.

11. The modular energy storage system of claim 3, wherein the control circuitry is configured to control the application of pulses in a manner sufficient to initiate the electrochemical reaction in the battery cell without substantially driving the side reaction in the battery cell, wherein each pulse has a duration of between 1 millisecond and 100 milliseconds.

12. The modular energy storage system of claim 3, wherein the control circuitry is configured to control the application of pulses in a manner sufficient to initiate the electrochemical reaction in the battery cell without substantially driving the side reaction in the battery cell, wherein each pulse has a duration of between 5 milliseconds and 25 milliseconds.

13. The modular energy storage system of claim 2, wherein each module comprises a plurality of battery cells, and the control circuitry is configured to control the application of pulses in a manner sufficient to initiate an electrochemical reaction in the plurality of battery cells without substantially driving a side reaction in the plurality of battery cells.

14. A method of charging a modular energy storage system comprising: a plurality of converter modules coupled together in at least one array, each converter module comprising a battery cell and switch circuitry, the method comprising:

applying pulses in a manner sufficient to initiate an electrochemical reaction in a battery cell of the plurality of converter modules by:
measuring a parameter of the battery cell;
generating a first pulse from a power connection with switch circuitry associated with the battery cell;
applying a first controlled pulse to the battery cell, wherein the first controlled pulse is generated from the first pulse;
measuring a response of the battery cell; and
determining if a pulse cutoff condition is satisfied based on the response and cause termination of application of the first controlled pulse after satisfaction of the pulse cutoff condition, wherein the pulse cutoff condition is based on a first derivation and a second derivation of the response.

15. The method of claim 14, further comprising applying at least one pulse at a first voltage greater than an expected voltage of the battery cell at full charge.

16. The method of claim 14, further comprising applying at least one pulse at a first voltage greater than an expected voltage of the battery cell at 100% state of charge.

17. The method of claim 16, wherein the first voltage is a voltage that is between 101 and 200% of the expected voltage of the battery cell at 100% state of charge.

18. The method of claim 16, further comprising applying the at least one pulse when a state of charge of the battery cell is less than 100%.

19. The method of claim 16, further comprising applying the at least one pulse when a state of charge of the battery cell is less than 80%.

20. The method of claim 19, wherein the at least one pulse is at least one first pulse, the method further comprising applying at least one second pulse at a second voltage less than the first voltage when a state of charge of the battery cell is greater than the state of the charge of the battery cell at application of the at least one first pulse, wherein the second voltage is greater than an expected voltage of the battery cell at 100% state of charge.

21. The method of claim 20, wherein the at least one first pulse and the at least one second pulse are applied when a state of charge of the battery cell is less than 80%.

22. The method of claim 16, wherein the pulses are applied in a manner sufficient to initiate the electrochemical reaction in the battery cell without substantially driving a side reaction in the battery cell.

23. The method of claim 16, wherein the pulses are applied in a manner sufficient to initiate the electrochemical reaction in the battery cell without substantially driving a side reaction in the battery cell while a state of charge of the battery cell does not exceed 80%.

24. A modular energy storage system, comprising:
a plurality of converter modules coupled together in at least one array, each converter module comprising an energy source and switch circuitry coupled with a power connection, wherein in a discharge state the at least one array is configured to generate at least one AC voltage waveform comprising a superposition of output voltages from the plurality of converter modules; and
control circuitry associated with the plurality of converter modules, wherein the control circuitry is configured to:
cause measurement of a parameter of an energy source of the plurality of converter modules;
cause generation of a first pulse from the power connection with switch circuitry associated with the energy source;

cause application of a first controlled pulse to the energy source, wherein the first controlled pulse is generated from the first pulse; and cause measurement of a response of the energy source;

determine if a pulse cutoff condition is satisfied based on the response and cause termination of application of the first controlled pulse after satisfaction of the pulse cutoff condition, wherein the pulse cutoff condition is based on a first derivation and a second derivation of the response.

25. The modular energy storage system of claim 24, wherein the control circuitry is configured to determine if the energy source is at a sub maximum charge threshold.

26. The modular energy storage system of claim 25, wherein the control circuitry is configured to transition to a different charge method if the sub maximum charge threshold is reached.

27. The modular energy storage system of claim 24, wherein the control circuitry is configured to determine whether to adjust a voltage or current of a second controlled pulse.

28. The modular energy storage system of claim 27, wherein the control circuitry is configured to cause adjustment of a voltage or current of the second controlled pulse such that the voltage or current is less than that of the first controlled pulse.

* * * * *